(12) United States Patent
Scaria

(10) Patent No.: US 12,483,047 B2
(45) Date of Patent: Nov. 25, 2025

(54) COMPOSITIONS AND METHODS FOR TREATING AND PREVENTING MACULAR DEGENERATION

(71) Applicant: Genzyme Corporation, Cambridge, MA (US)

(72) Inventor: Abraham Scaria, Framingham, MA (US)

(73) Assignee: Genzyme Corporation, Cambridge, MA (US)

( * ) Notice: Subject to any disclaimer, the term of this patent is extended or adjusted under 35 U.S.C. 154(b) by 67 days.

(21) Appl. No.: 17/681,468

(22) Filed: Feb. 25, 2022

(65) Prior Publication Data
US 2022/0288232 A1 Sep. 15, 2022

Related U.S. Application Data

(63) Continuation of application No. 15/113,720, filed as application No. PCT/US2015/014872 on Feb. 6, 2015, now abandoned.

(Continued)

(51) Int. Cl.
A61K 48/00 (2006.01)
A61K 9/00 (2006.01)
(Continued)

(52) U.S. Cl.
CPC .......... H02J 7/0042 (2013.01); A61K 9/0048 (2013.01); A61K 48/005 (2013.01); C07K 14/71 (2013.01); H02J 7/0013 (2013.01); H02J 7/0045 (2013.01); H02J 7/02 (2013.01); H02J 50/10 (2016.02); H02J 50/40 (2016.02); C07K 2319/02 (2013.01); C07K 2319/30 (2013.01);
(Continued)

(58) Field of Classification Search
CPC ................ A61K 48/005; A61K 9/0048; C12N 2750/14143; C12N 2750/14171; C07K 14/71; C07K 2319/30; C07K 2319/02
See application file for complete search history.

(56) References Cited

U.S. PATENT DOCUMENTS 7,378,095 B2 5/2008 Cao et al.
7,928,072 B2 4/2011 Scaria et al.
(Continued)

FOREIGN PATENT DOCUMENTS

JP 2011/512417 A 4/2011
WO 2004/079332 A2 9/2004
(Continued)

OTHER PUBLICATIONS

Aiello, L.P. et al. (Nov. 7, 1995). "Suppression of Retinal Neovascularization In Vivo by Inhibition of Vascular Endothelial Growth Factor (VEGF) Using Soluble VEGF-Receptor Chimeric Proteins", Proc. Natl. Acad. Sci. 92(23):10457-10461.
(Continued)

Primary Examiner — David W Berke-Schlessel
Assistant Examiner — Trent R Clarke
(74) Attorney, Agent, or Firm — Steptoe LLP; Z. Ying Li; Mauricio Alvarez

(57) ABSTRACT

Compositions and methods for treating macular degeneration are disclosed. The methods utilize gene delivery to human eyes of soluble Flt-1 receptors, as well fusion proteins including a soluble Flt-1 receptor.

22 Claims, 20 Drawing Sheets

Specification includes a Sequence Listing.

Related U.S. Application Data

(60) Provisional application No. 61/936,797, filed on Feb. 6, 2014.

(51) Int. Cl.
| | |
|---|---|
| C07K 14/71 | (2006.01) |
| H02J 7/00 | (2006.01) |
| H02J 7/02 | (2016.01) |
| H02J 50/10 | (2016.01) |
| H02J 50/40 | (2016.01) |

(52) U.S. Cl.
CPC .............. *C12N 2750/14143* (2013.01); *C12N 2750/14171* (2013.01)

(56) References Cited

U.S. PATENT DOCUMENTS

| | | |
|---|---|---|
| 8,658,602 B2 | 2/2014 | Scaria et al. |
| 2002/0194630 A1 | 12/2002 | Manning, Jr. et al. |
| 2004/0077565 A1 | 4/2004 | Pavco et al. |
| 2006/0193830 A1 | 8/2006 | Hauswirth et al. |
| 2006/0234347 A1 | 10/2006 | Harding et al. |
| 2009/0105245 A1 | 4/2009 | Bingaman et al. |
| 2010/0081707 A1 | 4/2010 | Ali et al. |
| 2010/0272719 A1 | 10/2010 | Yu |
| 2011/0052585 A1 | 3/2011 | Scaria et al. |
| 2013/0323302 A1* | 12/2013 | Constable .............. A61K 38/45 435/239 |
| 2014/0193411 A1 | 7/2014 | Scaria et al. |
| 2016/0068844 A1 | 3/2016 | Wadsworth et al. |

FOREIGN PATENT DOCUMENTS

| | | |
|---|---|---|
| WO | 2006/056823 A1 | 1/2006 |
| WO | WO-2006/031689 A2 | 3/2006 |
| WO | 2008/142124 A1 | 11/2008 |
| WO | 2009/073551 A2 | 6/2009 |
| WO | WO-2009/105669 A2 | 8/2009 |
| WO | WO-2010/019263 A2 | 2/2010 |
| WO | 2011/126808 A2 | 10/2011 |
| WO | 2011/137344 A2 | 11/2011 |
| WO | 2013/173129 A2 | 11/2013 |
| WO | 2014/172560 A1 | 10/2014 |
| WO | 2015/120309 A1 | 8/2015 |

OTHER PUBLICATIONS

Augusteyn, R.C. et al. (Jan. 2016). "Nonhuman Primate Ocular Biometry," IOVS 57(1):105-114.
Bainbridge, J.W.B. et al. (Mar. 2002). "Inhibition of Retinal Neovascularisation by Gene Transfer of Soluble VEGF Receptor sFlt-1," *Gene Therapy* 9(5):320-326.
Brown, D.M. et al. (Oct. 5, 2006). "Ranibizumab Versus Verteporfin for Neovascular Age-Related Macular Degeneration," *The New England Journal of Medicine* 355(14):1432-1444.
ClinicalTrials.Gov. No. NCT01024998. (Dec. 3, 2009). "A Phase 1, Open-Label, Multi-Center, Dose-Escalating, Safety and Tolerability Study of a Single Intravitreal Injection of AAV2-sFLT01 in Patients with Neovascular Age-Related Macular Degeneration," Information provided by Genzyme, a Sanofi Company, last updated Aug. 22, 2018, located at <https://clinicaltrials.gov/ct2/show/NCT01024998>, last visited on Sep. 13, 2018, 8 pages.
ClinicalTrials.Gov. No. NCT01494805. (Dec. 19, 2011). "A Phase I/II Controlled Dose-escalating Trial to Establish the Baseline Safety and Efficacy of a Single Subretinal Injection of rAAV.sFlt-1 Into Eyes of Patients With Exudative Age-related Macular Degeneration (AMD)", Information provided by Lions Eye Institute, last updated Sep. 1, 2017, located at <https://clinicaltrials.gov/ct2/show/NCT01494805>, last visited on Sep. 13, 2018, 7 pages.
D'Amico, D.J. et al. (Jun. 2006, e-pub. Apr. 27, 2006). "Pegaptanib Sodium for Neovascular Age-Related Macular Degeneration: Two-Year Safety Results of the Two Prospective, Multicenter, Controlled Clinical Trials," *Ophthalmology* 113(6):992-1001.
Holash, J. et al. (Aug. 20, 2002, e-pub. Aug. 12, 2002). "VEGF-Trap: A VEGF Blocker with Potent Antitumor Effects," *PNAS* 99(17):11393-11398.
Igarashi, T. et al. (May 2010). "Adeno-Associated Vector (Type 8)-Mediated Expression of Soluble Flt-1 Efficiently Inhibits Neovascularization in a Murine Choroidal Neovascularization Model," *Human Gene Therapy* 21:631-637.
Kvanta, A. et al. (Aug. 1996). "Subfoveal Fibrovascular Membranes in Age-Related Macular Degeneration Express Vascular Endothelial Growth Factor," *Investigative Ophthalmology & Visual Science* 37(9):1929-1934.
Lai, C.M. et al. (Oct. 2005). "Long-Term Evaluation of Aa V-Mediated Sflt-1 Gene Therapy for Ocular Neovascularization in Mice and Monkeys," *Molecular Therapy* 12(4):659-668.
Lukason, M. et al. (Feb. 2011, e-pub. Oct. 26, 2010). "Inhibition of Choroidal Neovascularization in a Nonhuman Primate Model by Intravitreal Administration of an AAV2 Vector Expressing a Novel Anti-VEGF Molecule," *Molecular Therapy* 19(2):260-265.
Maclachlan, T.K. et al. (Feb. 2011, e-pub. Nov. 30, 2011). "Preclinical Safety Evaluation of AAV2-sFLT01-A Gene Therapy of Age-Related Macular Degeneration," *Molecular Therapy* 19(2):326-334.
Maximov, V.V. et al. (2012). "Gene and Cell Therapy for Diseases of the Retina," *Genes & Cells*: VII(3):12-20 (English Abstract Only).
NIH (Apr. 5, 2011). "History of Changes for Study NCT01024998: Safety and Tolerability Study of AAV2-sFLT01 in Patients with Neovascular Age-Related Macular Mageneration (AMD)," ClinicalTrials.gov, 9 pages, as retrieved on Aug. 24, 2021 from https://clinicaltrials.gov/ct2/history/NCT01024998?V8=View#StudyPageTop.
Pechan, P. et al. (Jan. 2009, e-pub. Jul. 17, 2008). "Novel anti-VEGF Chimeric Molecules Delivered by AAV Vectors for Inhibition of Retinal Neovascularization," *Gene Therapy* 16(1):10-16.
Rakoczy, E.P. et al. (May 18, 2012). "The First Report on a rAAV.sFlt-1 Phase I/II Trial for Wet Age-Related Macular Degeneration (AMD)", Abstract, *presented at The American Society of Gene & Cell Therapy's 15th Annual Meeting*, May 16-19, 2012, Philadelphia, Pennsylvania, Molecular Therapy 20(9):e1-e63, (No. 800), located at <https://www.ncbi.nlm.nih.gov/pmc/articles/PMC3437784/>, last visited on Aug. 3, 2018, one page.
Rakoczy, E.P. et al. (May 2013). "Gene Therapy for Wet-AMD: Progress Report on a Phase 1/11 Clinical Trial," *Molecular Therapy* 21(Suppl.1):S22, No. 54, 1 page.
Rosenfeld, P.J. et al. (Oct. 5, 2006). "Ranibizumab for Neovascular Age-Related Macular Degeneration," *The New England Journal of Medicine* 355(14):1419-1431.
Chen, E et al. "Use of Nepafenac (Nevanac) In Combination With Intravitreal Anti-VEGF Agents in the Treatment of Recalcitrant Exudative Macular Degeneration Requiring Monthly Injections" Clin Ophthalmol, (2010) 4:1249-1252.
ClinicalTrails.gov A Phase 1/11 Controlled Dose-escalating Trial to Establish the Baseline Safety and Efficacy of a Single Subretinal Injection of rAAV.sFlt-1 Into Eyes of Patients With Exudative Age-related Macular Degeneration (AMD). Lions Eye Institute, Clinical Trials.gov Identifier No. NCT01494805 [online]. Dec. 16, 2011 [retrieved on Apr. 14, 2023). Retrieved from the Internet: <URL:http://clinicaltrials.gov/show/NCT01494805>.
Genzyme, "A phase 1, open-label, multi-center, dose-escalating, safety and tolerability study of a single intravitreal injection of AAV2-sFLT01 in patients with neovascular age-related macular degeneration", NCT01024998 Study Update, Apr. 5, 2011 (Apr. 5, 2011).
Heier et al., "Intravitreous injection of AAV2-sFLT01 in patients with advanced neovascular age-related macular degeneration: a phase 1, open-label trial," (2017) 390:50-61.
Lai et al., "rAAV.sFlt-1 Gene Therapy Achieves Lasting Reversal of Retinal Neovascularization in the Absence of a Strong Immune Response to the Viral Vector," Invest Ophthalmol Vis Sci, (2009) 50,(9):4279-4287.
Lai et al., "Preclinical Safety Evaluation of Subretinal AAV2.sFlt-1 in Non-Human Primates," Gen. Ther. (2011) 19 (10):999-1009.

(56) References Cited

OTHER PUBLICATIONS

Lalwani et al., "A Variable-Dosing Regimen With Intravitreal Ranizumab for Neovascular Age-Related Macular Degeneration: Year 2 of the PrONTO Study," Am. J. Ophthalmol (2009) 148:1, 43-58.
Li et al., "The recent advancement of intravitreal Avastin for neovascular age-related macular degeneration" Chin. J. Ophthal., (2009) 11(4):309-317. (English abstract).
Lions Eye Institute, ClinicalTrials.Gov "A Phase I/II Controlled dose-escalating trial to establish the baseline safety and efficacy of a single subretinal injection of rAAV.sFlt into eyes of patients with exudative age-related macular degeneration(AMD)" Dec. 18, 2013.
Salam, A et al., "Treatment of Proliferative Diabetic Retinopathy With Anti-VEGF Agents. Acta Opthalologica," Hum. Gene Ther. (2011) 89(5):405-411.
Stout, JT et al. Surgical Approaches to Gene and Stem Cell Therapy for Retinal Disease. Hum. Gene Ther. (2011) 22(5):531-535.
Wykoff, CC et al., "Perioperative Management of Patients With Reported Povidone-Iodine or Penicillin/Cephalosporin Allergies," Presented at the Annual Meeting for the Association for Research in Vision and Ophthalmology, Fort Lauderdale , FL. May 5, 2011; Abstract. No. 6416/D880.
Xiao et al. "Function and application of soluble vascular endothelial growth factor receptor-1 in age-related macular degeneration" (2017) Journal of Shanghai Jiaotong University (Medical Science), vol. 09. (English abstract).
Zhang et al. "Research progress in gene therapy for wet age-related macular degeneration," (2020) International Eye Science, vol. 03 . (English abstract).
Au et al., "Gene Therapy Advances: A Meta-Analysis of AAV Usage in Clinical Settings," Front Med. (2022) 8; doi: 10.3389/fmed.2021. 809118.
Bastola et al., "Adeno-Associated Virus Mediated Gene Therapy for Corneal Diseases," Pharmaceutics (2020) 12:767.
Bower et al., "Subconjunctival Administration of Adeno-associated Virus Vectors in Small Animal Models," J. Vis. Exp. (2022) 181:e63532.
Krohne et al., "Intraocular Pharmacokinetics of Ranibizumab Following a Single Intravitreal Injection in Humans," Am J Ophthalmol (2012) 154(4):682-86.
Daya et al., "Gene Therapy Using Adeno-associated Virus Vectors," Clinical Microbiology Reviews (2008) 583-93.
Davis-Smyth et al., "The Second Immunoglobulin-like Domain of the VEGF Tyrosine Kinase Receptor Flt-1 Determines Ligand Binding and may Initiate a Signal Transduction Cascade," The EMBO Journal (1996) 18:4919-27.
Eylea (aflibercept) label Injection for Intravitreal Infjection; Initial U.S. Approval: 2011; URL: https://www.accessdata.fda.gov/drugsatfda_docs/label/2017/125387s054lbl.pdf.
Lai et al., "Potential Long-term Inhibition of Ocular Neovascularisation by Recombinant adeno-associated Virus-mediated Secretion Gene Therapy," Gene Ther. (2002) 9:804-13.
Lee et al., "Relationship Between Neutralizing Antibodies Against Adeno-Associated Virus in the Vitreous and Serum: Effects on Retinal Gene Therapy," TVST (2019) 8(2): Article 14 (9 pages).
Lucentis (ranibizumab injection) label; Initial U.S> Approval: 2006; URL: https://www.accessdata.fda.gov/drugsatfda_docs/label/2006/125156lbl.pdf.
Garcia-Quintanilla et al., "Pharmacokinetics of Intravitreal Anti-VEGF Drugs in Age-Related Macular Degeneration," Pham. (2019) 11:365.
Rakoczy et al., Gene Therapy with Recombinant Adeno-associated Vectors for Neovascular Age-related Macular Degeneration: 1 year Follow-up of a Phase 1 Randomised Clinical Trial. Lancet (2015) 386:2395-403.
Sanofi, ClinicalTrials.Gov, "A Phase 1, Open-Label, Multi-Center, Dose-Escalating, Safety and Tolerability Study of a Single Intravitreal Injection of AAV2-sFLT01 in Patients With Neovascular Age-Related Macular Degeneration", (Jan. 28, 2014), Sanofi, URL: https://clinicaltrials.gov/ct2/show/NCT01024998, (May 13, 2015).
Sarra et al., "Kinetics of Transgene Expression in Mouse Retina Following Sub-retinal Injection of Recombinant Adeno-associated Virus," Vision Res. (2002) 42(4):541-9.
Weber et al., "Recombinant Adeno-associated Virus Serotype 4 Mediates Unique and Exclusive Long-term Transduction of Retinal Pigmented Epithelium in Rat, Dog, and Nonhuman Primate after Subretinal Delivery," Mol. Ther. (2003) 7(6):774-81.

\* cited by examiner

```
atggtcagct actgggacac cggggtcctg ctgtgcgcgc tgctcagctg tctgcttctc      60
acaggatctg gtagaccttt cgtagagatg tacagtgaaa tccccgaaat tatacacatg     120
actgaaggaa gggagctcgt cattccctgc cgggttacgt cacctaacat cactgttact     180
ttaaaaaagt ttccacttga cactttgatc cctgatggaa aacgcataat ctgggacagt     240
agaaagggct tcatcatatc aaatgcaacg tacaaagaaa tagggcttct gacctgtgaa     300
gcaacagtca atgggcattt gtataagaca aactatctca cacatcgaca aaccgtgga     360
ggtggaggtg gaggtggagg tcctaaatct tgtgacaaaa ctcacacatg cccaccgtgc     420
ccagcacctg aactcctggg gggaccgtca gtcttcctct tccccccaaa acccaaggac     480
accctcatga tctcccggac ccctgaggtc acatgcgtgg tggtggacgt gagccacgaa     540
gaccctgagg tcaagttcaa ctggtacgtg gacggcgtgg aggtgcataa tgccaagaca     600
aagccgcggg aggagcagta caacagcacg taccgtgtgg tcagcgtcct caccgtcctg     660
caccaggact ggctgaatgg caaggagtac aagtgcaagg tctccaacaa agccctccca     720
gcccccatcg agaaaaccat ctccaaagcc aaagggcagc ccgagaacc acaggtgtac     780
accctgcccc catcccggga tgagctgacc aagaaccagg tcagcctgac ctgcctggtc     840
aaaggcttct atcccagcga catcgccgtg gagtgggaga gcaatgggca gccggagaac     900
aactacaaga ccacgcctcc cgtgctggac tccgacggct ccttcttcct ctacagcaag     960
ctcaccgtgg acaagagcag gtggcagcag gggaacgtct tctcatgctc cgtgatgcat    1020
gaggctctgc acaaccacta cacgcagaag agcctctccc tgtctccggg taaatag       1077
```

FIGURE 1

```
Met Val Ser Tyr Trp Asp Thr Gly Val Leu Leu Cys Ala Leu Leu Ser
1               5                   10                  15

Cys Leu Leu Leu Thr Gly Ser Gly Arg Pro Phe Val Glu Met Tyr Ser
            20                  25              30

Glu Ile Pro Glu Ile Ile His Met Thr Glu Gly Arg Glu Leu Val Ile
        35              40                  45

Pro Cys Arg Val Thr Ser Pro Asn Ile Thr Val Thr Leu Lys Lys Phe
    50              55              60

Pro Leu Asp Thr Leu Ile Pro Asp Gly Lys Arg Ile Ile Trp Asp Ser
65                  70              75                      80

Arg Lys Gly Phe Ile Ile Ser Asn Ala Thr Tyr Lys Glu Ile Gly Leu
                85              90                  95

Leu Thr Cys Glu Ala Thr Val Asn Gly His Leu Tyr Lys Thr Asn Tyr
            100             105             110

Leu Thr His Arg Gln Thr Gly Gly Gly Gly Gly Gly Gly Gly Gly Pro
        115             120             125

Lys Ser Cys Asp Lys Thr His Thr Cys Pro Pro Cys Pro Ala Pro Glu
    130             135             140

Leu Leu Gly Gly Pro Ser Val Phe Leu Phe Pro Pro Lys Pro Lys Asp
145             150             155             160

Thr Leu Met Ile Ser Arg Thr Pro Glu Val Thr Cys Val Val Val Asp
            165             170             175

Val Ser His Glu Asp Pro Glu Val Lys Phe Asn Trp Tyr Val Asp Gly
        180             185             190

Val Glu Val His Asn Ala Lys Thr Lys Pro Arg Glu Glu Gln Tyr Asn
    195             200             205

Ser Thr Tyr Arg Val Val Ser Val Leu Thr Val Leu His Gln Asp Trp
    210             215             220
```

FIGURE 2A

```
Leu Asn Gly Lys Glu Tyr Lys Cys Lys Val Ser Asn Lys Ala Leu Pro
225                 230                 235                 240

Ala Pro Ile Glu Lys Thr Ile Ser Lys Ala Lys Gly Gln Pro Arg Glu
                245                 250                 255

Pro Gln Val Tyr Thr Leu Pro Pro Ser Arg Asp Glu Leu Thr Lys Asn
                260                 265                 270

Gln Val Ser Leu Thr Cys Leu Val Lys Gly Phe Tyr Pro Ser Asp Ile
        275                 280                 285

Ala Val Glu Trp Glu Ser Asn Gly Gln Pro Glu Asn Asn Tyr Lys Thr
        290                 295                 300

Thr Pro Pro Val Leu Asp Ser Asp Gly Ser Phe Phe Leu Tyr Ser Lys
305                 310                 315                 320

Leu Thr Val Asp Lys Ser Arg Trp Gln Gln Gly Asn Val Phe Ser Cys
                325                 330                 335

Ser Val Met His Glu Ala Leu His Asn His Tyr Thr Gln Lys Ser Leu
            340                 345                 350

Ser Leu Ser Pro Gly Lys
        355
```

FIGURE 2B

```
CTGACGGACAGACAGACAGACACCGCCCCCAGCCCCAGCTACCACCTCCTCCCCGGCCGGCGGCG
GACAGTGGACGCGGCGGCGAGCCGCGGGCAGGGGCCGGAGCCCGCGCCCGGAGGCGGGGTGGAGG
GGGTCGGGGCTCGCGGCGTCGCACTGAAACTTTTCGTCCAACTTCTGGGCTGTTCTCGCTTCGGA
GGAGCCGTGGTCCGCGCGGGGGAAGCCGAGCCGAGCGGAGCCGCGAGAAGTGCTAGCTCGGGCCG
GGAGGAGCCGCAGCCGGAGGAGGGGGAGGAGGAAGAAGAGAAGGAAGAGGAGAGGGGCCGCAGT
GGCGACTCGGCGCTCGGAAGCCGGGCTCATGGACGGGTGAGGCGGCGGTGTGCGCAGACAGTGCT
CCAGCCGCGCGCGCTCCCCAGGCCCTGGCCCGGGCCTCGGGCCGGGGAGGAAGAGTAGCTCGCCG
AGGCGCCGAGGAGAGCGGGCCGCCCCACAGCCCGAGCCGGAGAGGGAGCGCGAGCCGCGCCGGCC
CCGGTCGGGCCTCCGAAACCATGAACTTTCTGCTGTCTTGGGTGCATTGGAGCCTTGCCTTGCTG
CTCTACCTCCACCATGCCAAGTGGTCCCAGGCTGCACCCATGGCAGAAGGAGGAGGGCAGAATCA
TCACGAAGTGGTGAAGTTCATGGATGTCTATCAGCGCAGCTACTGCCATCCAATCGAGACCCTGG
TGGACATCTTCCAGGAGTACCCTGATGAGATCGAGTACATCTTCAAGCCATCCTGTGTGCCCCTG
ATGCGATGCGGGGGCTGCTGCAATGACGAGGGCCTGGAGTGTGTGCCCACTGAGGAGTCCAACAT
CACCATGCAGATTATGCGGATCAAACCTCACCAAGGCCAGCACATAGGAGAGATGAGCTTCCTAC
AGCACAACAAATGTGAATGCAGACCAAAGAAAGATAGAGCAAGACAAGAAAAAAAATCAGTTCGA
GGAAAGGGAAAGGGGCAAAAACGAAAGCGCAAGAAATCCCGGTATAAGTCCTGGAGCGTTCCCTG
TGGGCCTTGCTCAGAGCGGAGAAAGCATTTGTTTGTACAAGATCCGCAGACGTGTAAATGTTCCT
GCAAAAACACAGACTCGCGTTGCAAGGCGAGGCAGCTTGAGTTAAACGAACGTACTTGCAGATGT
GACAAGCCGAGGCGGTGA
```

FIGURE 3

```
MTDRQTDTAPSPSYHLLPGRRRTVDAAASRGQGPEPAPGGGVEGVGARGVALKLFVQLLGCSRFG
GAVVRAGEAEPSGAARSASSGREEPQPEEGEEEEEKEEERGPQWRLGARKPGSWTGEAAVCADSA
PAARAPQALARASGRGGRVARRGAEESGPPHSPSRRGSASRAGPGRASETMNFLLSWVHWSLALL
LYLHHAKWSQAAPMAEGGGQNHHEVVKFMDVYQRSYCHPIETLVDIFQEYPDEIEYIFKPSCVPL
MRCGGCCNDEGLECVPTEESNITMQIMRIKPHQGQHIGEMSFLQHNKCECRPKKDRARQEKKSVR
GKGKGQKRKRKKSRYKSWSVPCGPCSERRKHLFVQDPQTCKCSCKNTDSRCKARQLELNERTCRC
DKPRR
```

FIGURE 4

```
atggtcagct actgggacac cggggtcctg ctgtgcgcgc tgctcagctg tctgcttctc       60
acaggatctg gtagaccttt cgtagagatg tacagtgaaa tccccgaaat tatacacatg      120
actgaaggaa gggagctcgt cattccctgc cgggttacgt cacctaacat cactgttact      180
ttaaaaaagt tccacttga cactttgatc cctgatggaa aacgcataat ctgggacagt      240
agaaagggct tcatcatatc aaatgcaacg tacaaagaaa tagggcttct gacctgtgaa      300
gcaacagtca atgggcattt gtataagaca aactatctca cacatcgaca aaccggtgga      360
ggtggaggtg gaggtggagg tccttcctgt gtgcccctga tgcgatgcgg gggctgctgc      420
aattag                                                                 426
```

FIGURE 5

```
Met Val Ser Tyr Trp Asp Thr Gly Val Leu Leu Cys Ala Leu Leu Ser
1               5                   10                  15

Cys Leu Leu Leu Thr Gly Ser Gly Arg Pro Phe Val Glu Met Tyr Ser
                20                  25                  30

Glu Ile Pro Glu Ile Ile His Met Thr Glu Gly Arg Glu Leu Val Ile
            35                  40                  45

Pro Cys Arg Val Thr Ser Pro Asn Ile Thr Val Thr Leu Lys Lys Phe
        50                  55                  60

Pro Leu Asp Thr Leu Ile Pro Asp Gly Lys Arg Ile Ile Trp Asp Ser
65                  70                  75                  80

Arg Lys Gly Phe Ile Ile Ser Asn Ala Thr Tyr Lys Glu Ile Gly Leu
                85                  90                  95

Leu Thr Cys Glu Ala Thr Val Asn Gly His Leu Tyr Lys Thr Asn Tyr
            100                 105                 110

Leu Thr His Arg Gln Thr Gly Gly Gly Gly Gly Gly Gly Gly Gly Pro
        115                 120                 125

Ser Cys Val Pro Leu Met Arg Cys Gly Gly Cys Cys Asn
    130                 135                 140
```

FIGURE 6

```
atggtcagct actgggacac cggggtcctg ctgtgcgcgc tgctcagctg tctgcttctc      60
acaggatctg gtagaccttt cgtagagatg tacagtgaaa tccccgaaat tatacacatg     120
actgaaggaa gggagctcgt cattccctgc cgggttacgt cacctaacat cactgttact     180
ttaaaaaagt ttccacttga cactttgatc cctgatggaa aacgcataat ctgggacagt     240
agaaagggct tcatcatatc aaatgcaacg tacaaagaaa tagggcttct gacctgtgaa     300
gcaacagtca atgggcattt gtataagaca aactatctca cacatcgaca aaccggtgga     360
ggtggaggtg gaggtggagg tccttcctgt gtgcccctga tgcgatgcgg gggctgctgc     420
aatcagcccc gagaaccaca ggtgtacacc ctgcccccat cccgggatga gctgaccaag     480
aaccaggtca gcctgacctg cctggtcaaa ggcttctatc cagcgacat cgccgtggag      540
tgggagagca atgggcagcc ggagaacaac tacaagacca cgcctcccgt gctggactcc     600
gacggctcct tcttcctcta cagcaagctc accgtggaca gagcaggtg gcagcagggg      660
aacgtcttct catgctccgt gatgcatgag gctctgcaca ccactacac gcagaagagc      720
ctctccctgt ctccgggtaa atag                                            744
```

FIGURE 7

```
Met Val Ser Tyr Trp Asp Thr Gly Val Leu Leu Cys Ala Leu Leu Ser
1               5                   10                  15
Cys Leu Leu Leu Thr Gly Ser Gly Arg Pro Phe Val Glu Met Tyr Ser
            20                  25              30
Glu Ile Pro Glu Ile Ile His Met Thr Glu Gly Arg Glu Leu Val Ile
        35                  40                  45
Pro Cys Arg Val Thr Ser Pro Asn Ile Thr Val Thr Leu Lys Lys Phe
    50                  55                  60
Pro Leu Asp Thr Leu Ile Pro Asp Gly Lys Arg Ile Ile Trp Asp Ser
65                  70                  75                  80
Arg Lys Gly Phe Ile Ile Ser Asn Ala Thr Tyr Lys Glu Ile Gly Leu
            85                  90                  95
Leu Thr Cys Glu Ala Thr Val Asn Gly His Leu Tyr Lys Thr Asn Tyr
            100                 105                 110
Leu Thr His Arg Gln Thr Gly Gly Gly Gly Gly Gly Gly Gly Gly Pro
            115                 120                 125
Ser Cys Val Pro Leu Met Arg Cys Gly Gly Cys Cys Asn Gln Pro Arg
    130                 135                 140
Glu Pro Gln Val Tyr Thr Leu Pro Pro Ser Arg Asp Glu Leu Thr Lys
145                 150                 155                 160
Asn Gln Val Ser Leu Thr Cys Leu Val Lys Gly Phe Tyr Pro Ser Asp
                165                 170                 175
Ile Ala Val Glu Trp Glu Ser Asn Gly Gln Pro Glu Asn Asn Tyr Lys
            180                 185                 190
Thr Thr Pro Pro Val Leu Asp Ser Asp Gly Ser Phe Phe Leu Tyr Ser
        195                 200                 205
Lys Leu Thr Val Asp Lys Ser Arg Trp Gln Gln Gly Asn Val Phe Ser
    210                 215                 220
Cys Ser Val Met His Glu Ala Leu His Asn His Tyr Thr Gln Lys Ser
225                 230                 235                 240
Leu Ser Leu Ser Pro Gly Lys
            245
```

FIGURE 8

```
ATCGAGGTCCGCGGGAGGCTCGGAGCGCGCCAGGCGGACACTCCTCTCGGCTCCTCCCCGGCAGC
GGCGGCGGCTCGGAGCGGGCTCCGGGGCTCGGGTGCAGCGGCCAGCGGGCGCCTGGCGGCGAGGA
TTACCCGGGGAAGTGGTTGTCTCCTGGCTGGAGCCGCGAGACGGGCGCTCAGGGCGCGGGGCCGG
CGGCGGCGAACGAGAGGACGGACTCTGGCGGCCGGGTCGTTGGCCGCGGGGAGCGCGGGCACCGG
GCGAGCAGGCCGCGTCGCGCTCACCATGGTCAGCTACTGGGACACCGGGGTCCTGCTGTGCGCGC
TGCTCAGCTGTCTGCTTCTCACAGGATCTAGTTCAGGTTCAAAATTAAAGATCCTGAACTGAGT
TTAAAAGGCACCCAGCACATCATGCAAGCAGGCCAGACACTGCATCTCCAATGCAGGGGGAAGC
AGCCCATAAATGGTCTTTGCCTGAAATGGTGAGTAAGGAAAGCGAAAGGCTGAGCATAACTAAAT
CTGCCTGTGGAAGAAATGGCAAACAATTCTGCAGTACTTTAACCTTGAACACAGCTCAAGCAAAC
CACACTGGCTTCTACAGCTGCAAATATCTAGCTGTACCTACTTCAAAGAAGAAGGAAACAGAATC
TGCAATCTATATATTTATTAGTGATACAGGTAGACCTTTCGTAGAGATGTACAGTGAAATCCCCG
AAATTATACACATGACTGAAGGAAGGGAGCTCGTCATTCCCTGCCGGGTTACGTCACCTAACATC
ACTGTTACTTTAAAAAAGTTTCCACTTGACACTTTGATCCCTGATGGAAAACGCATAATCTGGGA
CAGTAGAAAGGGCTTCATCATATCAAATGCAACGTACAAAGAAATAGGGCTTCTGACCTGTGAAG
CAACAGTCAATGGGCATTTGTATAAGACAAACTATCTCACACATCGACAAACCAATACAATCATA
GATGTCCAAATAAGCACACCACGCCCAGTCAAATTACTTAGAGGCCATACTCTTGTCCTCAATTG
TACTGCTACCACTCCCTTGAACACGAGAGTTCAAATGACCTGGAGTTACCCTGATGAAAAAAATA
AGAGAGCTTCCGTAAGGCGACGAATTGACCAAAGCAATTCCCATGCCAACATATTCTACAGTGTT
CTTACTATTGACAAAATGCAGAACAAAGACAAAGGACTTTATACTTGTCGTGTAAGGAGTGGACC
ATCATTCAAATCTGTTAACACCCTCAGTGCATATATATGATAAAGCATTCATCACTGTGAAACATC
GAAAACAGCAGGTGCTTGAAACCGTAGCTGGCAAGCGGTCTTACCGGCTCTCTATGAAAGTGAAG
GCATTTCCCTCGCCGGAAGTTGTATGGTTAAAAGATGGGTTACCTGCGACTGAGAAATCTGCTCG
CTATTTGACTCGTGGCTACTCGTTAATTATCAAGGACGTAACTGAAGAGGATGCAGGGAATTATA
CAATCTTGCTGAGCATAAAACAGTCAAATGTGTTTAAAAACCTCACTGCCACTCTAATTGTCAAT
GTGAAACCCCAGATTTACGAAAAGGCCGTGTCATCGTTTCCAGACCCGGCTCTCTACCCACTGGG
CAGCAGACAAATCCTGACTTGTACCGCATATGGTATCCCTCAACCTACAATCAAGTGGTTCTGGC
ACCCCTGTAACCATAATCATTCCGAAGCAAGGTGTGACTTTTGTTCCAATAATGAAGAGTCCTTT
ATCCTGGATGCTGACAGCAACATGGGAAACAGAATTGAGAGCATCACTCAGCGCATGGCAATAAT
AGAAGGAAAGAATAAGATGGCTAGCACCTTGGTTGTGGCTGACTCTAGAATTTCTGGAATCTACA
TTTGCATAGCTTCCAATAAAGTTGGGACTGTGGGAAGAAACATAAGCTTTTATATCACAGATGTG
CCAAATGGGTTTCATGTTAACTTGGAAAAAATGCCGACGGAAGGAGAGGACCTGAAACTGTCTTG
CACAGTTAACAAGTTCTTATACAGAGACGTTACTTGGATTTTACTGCGGACAGTTAATAACAGAA
CAATGCACTACAGTATTAGCAAGCAAAAAATGGCCATCACTAAGGAGCACTCCATCACTCTTAAT
CTTACCATCATGAATGTTTCCCTGCAAGATTCAGGCACCTATGCCTGCAGAGCCAGGAATGTATA
CACAGGGGAAGAAATCCTCCAGAAGAAAGAAATTACAATCAGAGATCAGGAAGCACCATACCTCC
TGCGAAACCTCAGTGATCACACAGTGGCCATCAGCAGTTCCACCACTTTAGACTGTCATGCTAAT
GGTGTCCCCGAGCCTCAGATCACTTGGTTTAAAAACAACCACAAAATACAACAAGAGCCTGGAAT
TATTTTAGGACCAGGAAGCAGCACGCTGTTTATTGAAAGAGTCACAGAAGAGGATGAAGGTGTCT
ATCACTGCAAAGCCACCAACCAGAAGGGCTCTGTGGAAAGTTCAGCATACCTCACTGTTCAAGGA
ACCTCGGACAAGTCTAATCTGGAGCTGATCACTCTAACATGCACCTGTGTGGCTGCGACTCTCTT
CTGGCTCCTATTAACCCTCTTTATCCGAAAAATGAAAAGGTCTTCTTCTGAAATAAAGACTGACT
ACCTATCAATTATAATGGACCCAGATGAAGTTCCTTTGGATGAGCAGTGTGAGCGGCTCCCTTAT
GATGCCAGCAAGTGGGAGTTTGCCCGGGAGAGACTTAAACTGGGCAAATCACTTGGAAGAGGGGC
TTTTGGAAAAGTGGTTCAAGCATCAGCATTTGGCATTAAGAAATCACCTACGTGCCGGACTGTGG
CTGTGAAAATGCTGAAAGAGGGGGCCACGGCCAGCGAGTACAAAGCTCTGATGACTGAGCTAAAA
ATCTTGACCCACATTGGCCACCATCTGAACGTGGTTAACCTGCTGGGAGCCTGCACCAAGCAAGG
AGGGCCTCTGATGGTGATTGTTGAATACTGCAAATATGGAAATCTCTCCAACTACCTCAAGAGCA
AACGTGACTTATTTTTCTCAACAAGGATGCAGCACTACACATGGAGCCTAAGAAAGAAAAAATG
GAGCCAGGCCTGGAACAAGGCAAGAAACCAAGACTAGATAGCGTCACCAGCAGCGAAAGCTTTGC
GAGCTCCGGCTTTCAGGAAGATAAAAGTCTGAGTGATGTTGAGGAAGAGGAGGATTCTGACGGTT
TCTACAAGGAGCCCATCACTATGGAAGATCTGATTTCTTACAGTTTTCAAGTGGCCAGAGGCATG
GAGTTCCTGTCTTCCAGAAAGTGCATTCATCGGGACCTGGCAGCGAGAAACATTCTTTTATCTGA
GAACAACGTGGTGAAGATTTGTGATTTTGGCCTTGCCCGGGATATTTATAAGAACCCCGATTATG
TGAGAAAGGAGATACTCGACTTCCTCTGAAATGGATGGCTCCTGAATCTATCTTTGACAAAATC
TACAGCACCAAGAGCGACGTGTGGTCTTACGGAGTATTGCTGTGGGAAATCTTCTCCTTAGGTGG
```

FIGURE 9A

```
GTCTCCATACCCAGGAGTACAAATGGATGAGGACTTTTGCAGTCGCCTGAGGGAAGGCATGAGGA
TGAGAGCTCCTGAGTACTCTACTCCTGAAATCTATCAGATCATGCTGGACTGCTGGCACAGAGAC
CCAAAAGAAAGGCCAAGATTTGCAGAACTTGTGGAAAAACTAGGTGATTTGCTTCAAGCAAATGT
ACAACAGGATGGTAAAGACTACATCCCAATCAATGCCATACTGACAGGAAATAGTGGGTTTACAT
ACTCAACTCCTGCCTTCTCTGAGGACTTCTTCAAGGAAAGTATTTCAGCTCCGAAGTTTAATTCA
GGAAGCTCTGATGATGTCAGATACGTAAATGCTTTCAAGTTCATGAGCCTGGAAAGAATCAAAAC
CTTTGAAGAACTTTTACCGAATGCCACCTCCATGTTTGATGACTACCAGGGCGACAGCAGCACTC
TGTTGGCCTCTCCCATGCTGAAGCGCTTCACCTGGACTGACAGCAAACCCAAGGCCTCGCTCAAG
ATTGACTTGAGAGTAACCAGTAAAAGTAAGGAGTCGGGGCTGTCTGATGTCAGCAGGCCCAGTTT
CTGCCATTCCAGCTGTGGGCACGTCAGCGAAGGCAAGCGCAGGTTCACCTACGACCACGCTGAGC
TGGAAAGGAAAATCGCGTGCTGCTCCCCGCCCCAGACTACAACTCGGTGGTCCTGTACTCCACC
CCACCCATCTAGAGTTTGACACGAAGCCTTATTTCTAGAAGCACATGTGTATTTATACCCCAGG
AAACTAGCTTTTGCCAGTATTATGCATATATAAGTTTACACCTTTATCTTTCCATGGGAGCCAGC
TGCTTTTTGTGATTTTTTAATAGTGCTTTTTTTTTTGACTAACAAGAATGTAACTCCAGATA
GAGAAATAGTGACAAGTGAAGAACACTACTGCTAAATCCTCATGTTACTCAGTGTTAGAGAAATC
CTTCCTAAACCCAATGACTTCCCTGCTCCAACCCCGCCACCTCAGGGCACGCAGGACCAGTTTG
ATTGAGGAGCTGCACTGATCACCCAATGCATCACGTACCCCACTGGGCCAGCCCTGCAGCCCAAA
ACCCAGGGCAACAAGCCCGTTAGCCCCAGGGATCACTGGCTGGCCTGAGCAACATCTCGGGAGTC
CTCTAGCAGGCCTAAGACATGTGAGGAGGAAAAGGAAAAAAAGCAAAAAGCAAGGGAGAAAAGAG
AAACCGGGAGAAGGCATGAGAAAGAATTTGAGACGCACCATGTGGGCACGGAGGGGGACGGGGCT
CAGCAATGCCATTTCAGTGGCTTCCCAGCTCTGACCCTTCTACATTTGAGGGCCCAGCCAGGAGC
AGATGGACAGCGATGAGGGGACATTTTCTGGATTCTGGGAGGCAAGAAAAGGACAAATATCTTTT
TTGGAACTAAAGCAAATTTTAGAACTTTACCTATGGAAGTGGTTCTATGTCCATTCTCATTCGTG
GCATGTTTTGATTTGTAGCACTGAGGGTGGCACTCAACTCTGAGCCCATACTTTTGGCTCCTCTA
GTAAGATGCACTGAAAACTTAGCCAGAGTTAGGTTGTCTCCAGGCCATGATGGCCTTACACTGAA
AATGTCACATTCTATTTTGGGTATTAATATATAGTCCAGACACTTAACTCAATTTCTTGGTATTA
TTCTGTTTTGCACAGTTAGTTGTGAAAGAAAGCTGAGAAGAATGAAAATGCAGTCCTGAGGAGAG
GAGTTTTCTCCATATCAAAACGAGGGCTGATGGAGGAAAAAGGTCAATAAGGTCAAGGGAAAACC
CCGTCTCTATACCAACCAAACCAATTCACCAACACAGTTGGGACCCAAAACACAGGAAGTCAGTC
ACGTTTCCTTTTCATTTAATGGGGATTCCACTATCTCACACTAATCTGAAAGGATGTGGAAGAGC
ATTAGCTGGCGCATATTAAGCACTTTAAGCTCCTTGAGTAAAAAGGTGGTATGTAATTTATGCAA
GGTATTTCTCCAGTTGGGACTCAGGATATTAGTTAATGAGCCATCACTAGAAGAAAAGCCCATTT
TCAACTGCTTTGAAACTTGCCTGGGGTCTGAGCATGATGGGAATAGGGAGACAGGGTAGGAAAGG
GCGCCTACTCTTCAGGGTCTAAAGATCAAGTGGGCCTTGGATCGCTAAGCTGGCTCTGTTTGATG
CTATTTATGCAAGTTAGGGTCTATGTATTTATGATGTCTGCACCTTCTGCAGCCAGTCAGAAGCT
GGAGAGGCAACAGTGGATTGCTGCTTCTTGGGGAGAAGAGTATGCTTCCTTTTATCCATGTAATT
TAACTGTAGAACCTGAGCTCTAAGTAACCGAAGAATGTATGCCTCTGTTCTTATGTGCCACATCC
TTGTTTAAAGGCTCTCTGTATGAAGAGATGGGACCGTCATCAGCACATTCCCTAGTGAGCCTACT
GGCTCCTGGCAGCGGCTTTTGTGGAAGACTCACTAGCCAGAAGAGAGGAGTGGGACAGTCCTCTA
CCAAGATCTAAATCCAAACAAAAGCAGGCTAGAGCCAGAAGAGAGGACAAATCTTTGTTCTTCCT
CTTCTTTACATACGCAAACCACCTGTGACAGCTGGCAATTTTATAAATCAGGTAACTGGAAGGAG
GTTAAACACAGAAAAAAGAAGACCTCAGTCAATTCTCTACTTTTTTTTTTTTCCAAATCAGAT
AATAGCCCAGCAAATAGTGATAACAAATAAAACCTTAGCTATTCATGTCTTGATTTCAATAATTA
ATTCTTAATCATTAAGAGACCATAATAAATACTCCTTTTCAAGAGAAAAGCAAAACCATTAGAAT
TGTTACTCAGCTCCTTCAAACTCAGGTTTGTAGCATACATGAGTCCATCCATCAGTCAAAGAATG
GTTCCATCTGGAGTCTTAATGTAGAAAGAAAATGGAGACTTGTAATAATGAGCTAGTTACAAAG
TGCTTGTTCATTAAAATAGCACTGAAAATTGAAACATGAATTAACTGATAATATTCCAATCATTT
GCCATTTATGACAAAAATGGTTGGCACTAACAAAGAACGAGCACTTCCTTTCAGAGTTTCTGAGA
TAATGTACGTGGAACAGTCTGGGTGGAATGGGGCTGAAACCATGTGCAAGTCTGTGTCTTGTCAG
TCCAAGAAGTGACACCGAGATGTTAATTTTAGGGACCCGTGCCTTGTTTCCTAGCCCACAAGAAT
GCAAACATCAAACAGATACTCGCTAGCCTCATTTAAATTGATTAAAGGAGGAGTGCATCTTTGGC
CGACAGTGGTGTAACTGTATGTGTGTGTGTGTGTGTGTGTGTGTGTGTGTGTGGGTGTATGTG
TGTTTTGTGCATAACTATTTAAGGAAACTGGAATTTTAAAGTTACTTTTATACAAACCAAGAATA
TATGCTACAGATATAAGACAGACATGGTTTGGTCCTATATTTCTAGTCATGATGAATGTATTTTG
TATACCATCTTCATATAATAAACTTCCAAAACACA
```

FIGURE 9B

```
Met Val Ser Tyr Trp Asp Thr Gly Val Leu Leu Cys Ala Leu Leu Ser
1               5                   10                      15
Cys Leu Leu Leu Thr Gly Ser Ser Ser Gly Ser Lys Leu Lys Asp Pro
            20              25                  30
Glu Leu Ser Leu Lys Gly Thr Gln His Ile Met Gln Ala Gly Gln Thr
            35              40              45
Leu His Leu Gln Cys Arg Gly Glu Ala Ala His Lys Trp Ser Leu Pro
    50              55                  60
Glu Met Val Ser Lys Glu Ser Glu Arg Leu Ser Ile Thr Lys Ser Ala
65              70                  75                      80
Cys Gly Arg Asn Gly Lys Gln Phe Cys Ser Thr Leu Thr Leu Asn Thr
                85              90                  95
Ala Gln Ala Asn His Thr Gly Phe Tyr Ser Cys Lys Tyr Leu Ala Val
            100             105             110
Pro Thr Ser Lys Lys Lys Glu Thr Glu Ser Ala Ile Tyr Ile Phe Ile
        115             120             125
Ser Asp Thr Gly Arg Pro Phe Val Glu Met Tyr Ser Glu Ile Pro Glu
    130             135             140
Ile Ile His Met Thr Glu Gly Arg Glu Leu Val Ile Pro Cys Arg Val
145             150             155                     160
Thr Ser Pro Asn Ile Thr Val Thr Leu Lys Lys Phe Pro Leu Asp Thr
            165             170             175
Leu Ile Pro Asp Gly Lys Arg Ile Ile Trp Asp Ser Arg Lys Gly Phe
            180             185             190
Ile Ile Ser Asn Ala Thr Tyr Lys Glu Ile Gly Leu Leu Thr Cys Glu
        195             200             205
Ala Thr Val Asn Gly His Leu Tyr Lys Thr Asn Tyr Leu Thr His Arg
    210             215             220
Gln Thr Asn Thr Ile Ile Asp Val Gln Ile Ser Thr Pro Arg Pro Val
225             230             235                     240
Lys Leu Leu Arg Gly His Thr Leu Val Leu Asn Cys Thr Ala Thr Thr
            245             250             255
Pro Leu Asn Thr Arg Val Gln Met Thr Trp Ser Tyr Pro Asp Glu Lys
            260             265             270
Asn Lys Arg Ala Ser Val Arg Arg Arg Ile Asp Gln Ser Asn Ser His
        275             280             285
Ala Asn Ile Phe Tyr Ser Val Leu Thr Ile Asp Lys Met Gln Asn Lys
    290             295             300
Asp Lys Gly Leu Tyr Thr Cys Arg Val Arg Ser Gly Pro Ser Phe Lys
305             310             315                     320
```

FIGURE 10A

```
Ser Val Asn Thr Ser Val His Ile Tyr Asp Lys Ala Phe Ile Thr Val
            325             330                 335
Lys His Arg Lys Gln Gln Val Leu Glu Thr Val Ala Gly Lys Arg Ser
            340             345                 350
Tyr Arg Leu Ser Met Lys Val Lys Ala Phe Pro Ser Pro Glu Val Val
            355             360                 365
Trp Leu Lys Asp Gly Leu Pro Ala Thr Glu Lys Ser Ala Arg Tyr Leu
            370             375                 380
Thr Arg Gly Tyr Ser Leu Ile Ile Lys Asp Val Thr Glu Glu Asp Ala
385                 390             395                     400
Gly Asn Tyr Thr Ile Leu Leu Ser Ile Lys Gln Ser Asn Val Phe Lys
                405             410                 415
Asn Leu Thr Ala Thr Leu Ile Val Asn Val Lys Pro Gln Ile Tyr Glu
            420             425                 430
Lys Ala Val Ser Ser Phe Pro Asp Pro Ala Leu Tyr Pro Leu Gly Ser
            435             440                 445
Arg Gln Ile Leu Thr Cys Thr Ala Tyr Gly Ile Pro Gln Pro Thr Ile
    450             455                 460
Lys Trp Phe Trp His Pro Cys Asn His Asn His Ser Glu Ala Arg Cys
465             470                 475                     480
Asp Phe Cys Ser Asn Asn Glu Glu Ser Phe Ile Leu Asp Ala Asp Ser
            485                 490                 495
Asn Met Gly Asn Arg Ile Glu Ser Ile Thr Gln Arg Met Ala Ile Ile
            500             505                 510
Glu Gly Lys Asn Lys Met Ala Ser Thr Leu Val Val Ala Asp Ser Arg
    515                 520                 525
Ile Ser Gly Ile Tyr Ile Cys Ile Ala Ser Asn Lys Val Gly Thr Val
    530             535                 540
Gly Arg Asn Ile Ser Phe Tyr Ile Thr Asp Val Pro Asn Gly Phe His
545                 550             555                     560
Val Asn Leu Glu Lys Met Pro Thr Glu Gly Glu Asp Leu Lys Leu Ser
            565                 570                 575
Cys Thr Val Asn Lys Phe Leu Tyr Arg Asp Val Thr Trp Ile Leu Leu
            580             585                 590
Arg Thr Val Asn Asn Arg Thr Met His Tyr Ser Ile Ser Lys Gln Lys
        595             600                 605
Met Ala Ile Thr Lys Glu His Ser Ile Thr Leu Asn Leu Thr Ile Met
    610             615                 620
Asn Val Ser Leu Gln Asp Ser Gly Thr Tyr Ala Cys Arg Ala Arg Asn
625             630                 635                     640
```

FIGURE 10B

Val Tyr Thr Gly Glu Glu Ile Leu Gln Lys Lys Glu Ile Thr Ile Arg
            645             650             655
Asp Gln Glu Ala Pro Tyr Leu Leu Arg Asn Leu Ser Asp His Thr Val
            660             665             670
Ala Ile Ser Ser Ser Thr Thr Leu Asp Cys His Ala Asn Gly Val Pro
        675             680             685
Glu Pro Gln Ile Thr Trp Phe Lys Asn Asn His Lys Ile Gln Gln Glu
    690             695             700
Pro Gly Ile Ile Leu Gly Pro Gly Ser Ser Thr Leu Phe Ile Glu Arg
705             710             715             720
Val Thr Glu Glu Asp Glu Gly Val Tyr His Cys Lys Ala Thr Asn Gln
            725             730             735
Lys Gly Ser Val Glu Ser Ser Ala Tyr Leu Thr Val Gln Gly Thr Ser
            740             745             750
Asp Lys Ser Asn Leu Glu Leu Ile Thr Leu Thr Cys Thr Cys Val Ala
            755             760             765
Ala Thr Leu Phe Trp Leu Leu Leu Thr Leu Leu Ile Arg Lys Met Lys
    770             775             780
Arg Ser Ser Ser Glu Ile Lys Thr Asp Tyr Leu Ser Ile Ile Met Asp
785             790             795             800
Pro Asp Glu Val Pro Leu Asp Glu Gln Cys Glu Arg Leu Pro Tyr Asp
            805             810             815
Ala Ser Lys Trp Glu Phe Ala Arg Glu Arg Leu Lys Leu Gly Lys Ser
            820             825             830
Leu Gly Arg Gly Ala Phe Gly Lys Val Val Gln Ala Ser Ala Phe Gly
        835             840             845
Ile Lys Lys Ser Pro Thr Cys Arg Thr Val Ala Val Lys Met Leu Lys
    850             855             860
Glu Gly Ala Thr Ala Ser Glu Tyr Lys Ala Leu Met Thr Glu Leu Lys
865             870             875             880
Ile Leu Thr His Ile Gly His His Leu Asn Val Val Asn Leu Leu Gly
            885             890             895
Ala Cys Thr Lys Gln Gly Gly Pro Leu Met Val Ile Val Glu Tyr Cys
            900             905             910
Lys Tyr Gly Asn Leu Ser Asn Tyr Leu Lys Ser Lys Arg Asp Leu Phe
        915             920             925
Phe Leu Asn Lys Asp Ala Ala Leu His Met Glu Pro Lys Lys Glu Lys
    930             935             940

FIGURE 10C

```
Met Glu Pro Gly Leu Glu Gln Gly Lys Lys Pro Arg Leu Asp Ser Val
945             950                 955                 960

Thr Ser Ser Glu Ser Phe Ala Ser Ser Gly Phe Gln Glu Asp Lys Ser
            965             970                 975

Leu Ser Asp Val Glu Glu Glu Glu Asp Ser Asp Gly Phe Tyr Lys Glu
            980             985                 990

Pro Ile Thr Met Glu Asp Leu Ile Ser Tyr Ser Phe Gln Val Ala Arg
        995             1000                1005

Gly Met Glu Phe Leu Ser Ser Arg Lys Cys Ile His Arg Asp Leu
    1010            1015            1020

Ala Ala Arg Asn Ile Leu Leu Ser Glu Asn Asn Val Val Lys Ile
    1025            1030            1035

Cys Asp Phe Gly Leu Ala Arg Asp Ile Tyr Lys Asn Pro Asp Tyr
    1040            1045            1050

Val Arg Lys Gly Asp Thr Arg Leu Pro Leu Lys Trp Met Ala Pro
    1055            1060            1065

Glu Ser Ile Phe Asp Lys Ile Tyr Ser Thr Lys Ser Asp Val Trp
    1070            1075            1080

Ser Tyr Gly Val Leu Leu Trp Glu Ile Phe Ser Leu Gly Gly Ser
    1085            1090            1095

Pro Tyr Pro Gly Val Gln Met Asp Glu Asp Phe Cys Ser Arg Leu
    1100            1105            1110

Arg Glu Gly Met Arg Met Arg Ala Pro Glu Tyr Ser Thr Pro Glu
    1115            1120            1125

Ile Tyr Gln Ile Met Leu Asp Cys Trp His Arg Asp Pro Lys Glu
    1130            1135            1140

Arg Pro Arg Phe Ala Glu Leu Val Glu Lys Leu Gly Asp Leu Leu
    1145            1150            1155

Gln Ala Asn Val Gln Gln Asp Gly Lys Asp Tyr Ile Pro Ile Asn
    1160            1165            1170

Ala Ile Leu Thr Gly Asn Ser Gly Phe Thr Tyr Ser Thr Pro Ala
    1175            1180            1185

Phe Ser Glu Asp Phe Phe Lys Glu Ser Ile Ser Ala Pro Lys Phe
    1190            1195            1200

Asn Ser Gly Ser Ser Asp Asp Val Arg Tyr Val Asn Ala Phe Lys
    1205            1210            1215

Phe Met Ser Leu Glu Arg Ile Lys Thr Phe Glu Glu Leu Leu Pro
    1220            1225            1230

Asn Ala Thr Ser Met Phe Asp Asp Tyr Gln Gly Asp Ser Ser Thr
    1235            1240            1245
```

FIGURE 10D

```
Leu Leu Ala Ser Pro Met Leu Lys Arg Phe Thr Trp Thr Asp Ser
    1250            1255               1260

Lys Pro Lys Ala Ser Leu Lys Ile Asp Leu Arg Val Thr Ser Lys
    1265            1270              1275

Ser Lys Glu Ser Gly Leu Ser Asp Val Ser Arg Pro Ser Phe Cys
    1280            1285              1290

His Ser Ser Cys Gly His Val Ser Glu Gly Lys Arg Arg Phe Thr
    1295            1300              1305

Tyr Asp His Ala Glu Leu Glu Arg Lys Ile Ala Cys Cys Ser Pro
    1310            1315              1320

Pro Pro Asp Tyr Asn Ser Val Val Leu Tyr Ser Thr Pro Pro Ile
    1325            1330              1335
```

FIGURE 10E

```
atggtcagct actgggacac cggggtcctg ctgtgcgcgc tgctcagctg tctgcttctc    60
acaggatctg gtagaccttt cgtagagatg tacagtgaaa tccccgaaat tatacacatg   120
actgaaggaa gggagctcgt cattccctgc cgggttacgt cacctaacat cactgttact   180
ttaaaaaagt ttccacttga cactttgatc cctgatggaa aacgcataat ctgggacagt   240
agaaagggct tcatcatatc aaatgcaacg tacaaagaaa tagggcttct gacctgtgaa   300
gcaacagtca atggcatttt gtataagaca aactatctca cacatcgaca aaccggtgga   360
ggtggaggtg gaggtggagg tcagccccga gaaccacagg tgtacaccct gcccccatcc   420
cgggatgagc tgaccaagaa ccaggtcagc ctgacctgcc tggtcaaagg cttctatccc   480
agcgacatcg ccgtggagtg ggagagcaat gggcagccgg agaacaacta caagaccacg   540
cctcccgtgc tggactccga cggctccttc ttcctctaca gcaagctcac cgtggacaag   600
agcaggtggc agcagggaa cgtcttctca tgctccgtga tgcatgaggc tctgcacaac   660
cactacacgc agaagagcct ctccctgtct ccgggtaaat ag                      702
```

FIGURE 11

```
Met Val Ser Tyr Trp Asp Thr Gly Val Leu Leu Cys Ala Leu Leu Ser
1               5                   10                  15
Cys Leu Leu Leu Thr Gly Ser Gly Arg Pro Phe Val Glu Met Tyr Ser
            20                  25                  30
Glu Ile Pro Glu Ile Ile His Met Thr Glu Gly Arg Glu Leu Val Ile
        35              40                  45
Pro Cys Arg Val Thr Ser Pro Asn Ile Thr Val Thr Leu Lys Lys Phe
    50              55                  60
Pro Leu Asp Thr Leu Ile Pro Asp Gly Lys Arg Ile Ile Trp Asp Ser
65              70                  75                      80
Arg Lys Gly Phe Ile Ile Ser Asn Ala Thr Tyr Lys Glu Ile Gly Leu
            85                  90                  95
Leu Thr Cys Glu Ala Thr Val Asn Gly His Leu Tyr Lys Thr Asn Tyr
            100                 105                 110
Leu Thr His Arg Gln Thr Gly Gly Gly Gly Gly Gly Gly Gly Gly Gln
        115             120                 125
Pro Arg Glu Pro Gln Val Tyr Thr Leu Pro Pro Ser Arg Asp Glu Leu
    130             135                 140
Thr Lys Asn Gln Val Ser Leu Thr Cys Leu Val Lys Gly Phe Tyr Pro
145             150                 155                     160
Ser Asp Ile Ala Val Glu Trp Glu Ser Asn Gly Gln Pro Glu Asn Asn
            165                 170                 175
Tyr Lys Thr Thr Pro Pro Val Leu Asp Ser Asp Gly Ser Phe Phe Leu
            180                 185                 190
Tyr Ser Lys Leu Thr Val Asp Lys Ser Arg Trp Gln Gln Gly Asn Val
        195                 200                 205
Phe Ser Cys Ser Val Met His Glu Ala Leu His Asn His Tyr Thr Gln
    210                 215                 220
Lys Ser Leu Ser Leu Ser Pro Gly Lys
225                 230
```

FIGURE 12

```
atggagtttg ggctgagctg ggttttcctc gttgctcttt taagaggtgt ccagtgtcag    60
gtgcagctgg tggagtctgg gggaggcgtg gtccagcctg ggaggtccct gagactctcc   120
tgtgcagcgt ctggattcac cttcagtaat tatggcatgc actgggtccg ccaggctcca   180
ggcaagggc tggagtgggt ggcagctata tggtatgatg aagtaataa atactatgca    240
gactccgtga agggccgatt caccatctcc agagacaatt ccaagaacac gttgtatatg   300
caaatgaaca gcctgagagc cgaggacacg gctgtgtatt attgtgcgag agagggtcgg   360
tgggtacgat atactacggt gactactatc ggatactact tgactactg gggccaggga   420
accctggtca ccgtctcctc agcctccacc aagggcccat cggtcttccc cctggcaccc   480
tcctccaaga gcacctctgg gggcacagcg gccctgggct gctggtcaa ggactacttc    540
cccgaaccgg tgacggtgtc gtggaactca ggcgccctga ccagcggcgt gcacaccttc   600
ccggctgtcc tacagtcctc aggactctac tccctcagca gcgtggtgac cgtgccctcc   660
agcagcttgg gcacccagac ctacatctgc aacgtgaatc acaagcccag caacaccaag   720
gtggacaaga gagttgagcc caaatcttgt gacaaaactc acacatgccc accgtgccca   780
gcacctgaac tcctgggggg accgtcagtc ttcctcttcc cccaaaacc caaggacacc    840
ctcatgatct cccggacccc tgaggtcaca tgcgtggtgg tggacgtgag ccacgaagac   900
cctgaggtca agttcaactg gtacgtggac ggcgtggagg tgcataatgc caagacaaag   960
ccgcgggagg agcagtacaa cagcacgtac cgtgtggtca gcgtcctcac cgtcctgcac  1020
caggactggc tgaatggcaa ggagtacaag tgcaaggtct ccaacaaagc cctcccagcc  1080
cccatcgaga aaaccatctc caaagccaaa gggcagcccc gagaaccaca ggtgtacacc  1140
ctgcccccat cccgggagga gatgaccaag aaccaggtca gcctgacctg cctggtcaaa  1200
ggcttctatc ccagcgacat cgccgtggag tgggagagca atgggcagcc ggagaacaac  1260
tacaagacca cgcctcccgt gctggactcc gacggctcct tcttcctcta tagcaagctc  1320
accgtggaca gagcaggtg gcagcagggg aacgtcttct catgctccgt gatgcatgag  1380
gctctgcaca accactacac gcagaagagc ctctccctgt ccccgggtaa atga        1434
```

FIGURE 13

```
Met Glu Phe Gly Leu Ser Trp Val Phe Leu Val Ala Leu Leu Arg Gly
1               5                   10                  15
Val Gln Cys Gln Val Gln Leu Val Glu Ser Gly Gly Gly Val Val Gln
            20                  25                  30
Pro Gly Arg Ser Leu Arg Leu Ser Cys Ala Ala Ser Gly Phe Thr Phe
            35                  40                  45
Ser Asn Tyr Gly Met His Trp Val Arg Gln Ala Pro Gly Lys Gly Leu
        50                  55                  60
Glu Trp Val Ala Ala Ile Trp Tyr Asp Gly Ser Asn Lys Tyr Tyr Ala
65                      70                  75                  80
Asp Ser Val Lys Gly Arg Phe Thr Ile Ser Arg Asp Asn Ser Lys Asn
                85                  90                  95
Thr Leu Tyr Met Gln Met Asn Ser Leu Arg Ala Glu Asp Thr Ala Val
            100                 105                 110
Tyr Tyr Cys Ala Arg Glu Gly Arg Trp Val Arg Tyr Thr Thr Val Thr
            115                 120                 125
Thr Ile Gly Tyr Tyr Phe Asp Tyr Trp Gly Gln Gly Thr Leu Val Thr
        130                 135                 140
Val Ser Ser Ala Ser Thr Lys Gly Pro Ser Val Phe Pro Leu Ala Pro
145                 150                 155                 160
Ser Ser Lys Ser Thr Ser Gly Gly Thr Ala Ala Leu Gly Cys Leu Val
            165                 170                 175
Lys Asp Tyr Phe Pro Glu Pro Val Thr Val Ser Trp Asn Ser Gly Ala
            180                 185                 190
Leu Thr Ser Gly Val His Thr Phe Pro Ala Val Leu Gln Ser Ser Gly
        195                 200                 205
Leu Tyr Ser Leu Ser Ser Val Val Thr Val Pro Ser Ser Ser Leu Gly
    210                 215                 220
Thr Gln Thr Tyr Ile Cys Asn Val Asn His Lys Pro Ser Asn Thr Lys
225                 230                 235                 240
Val Asp Lys Arg Val Glu Pro Lys Ser Cys Asp Lys Thr His Thr Cys
            245                 250                 255
Pro Pro Cys Pro Ala Pro Glu Leu Leu Gly Gly Pro Ser Val Phe Leu
            260                 265                 270
Phe Pro Pro Lys Pro Lys Asp Thr Leu Met Ile Ser Arg Thr Pro Glu
        275                 280                 285
Val Thr Cys Val Val Val Asp Val Ser His Glu Asp Pro Glu Val Lys
    290                 295                 300
Phe Asn Trp Tyr Val Asp Gly Val Glu Val His Asn Ala Lys Thr Lys
305                 310                 315                 320
```

FIGURE 14A

```
Pro Arg Glu Glu Gln Tyr Asn Ser Thr Tyr Arg Val Val Ser Val Leu
            325                 330                 335

Thr Val Leu His Gln Asp Trp Leu Asn Gly Lys Glu Tyr Lys Cys Lys
            340                 345                 350

Val Ser Asn Lys Ala Leu Pro Ala Pro Ile Glu Lys Thr Ile Ser Lys
        355                 360                 365

Ala Lys Gly Gln Pro Arg Glu Pro Gln Val Tyr Thr Leu Pro Pro Ser
    370                 375                 380

Arg Glu Glu Met Thr Lys Asn Gln Val Ser Leu Thr Cys Leu Val Lys
385                 390                 395                 400

Gly Phe Tyr Pro Ser Asp Ile Ala Val Glu Trp Glu Ser Asn Gly Gln
            405                 410                 415

Pro Glu Asn Asn Tyr Lys Thr Thr Pro Pro Val Leu Asp Ser Asp Gly
            420                 425                 430

Ser Phe Phe Leu Tyr Ser Lys Leu Thr Val Asp Lys Ser Arg Trp Gln
        435                 440                 445

Gln Gly Asn Val Phe Ser Cys Ser Val Met His Glu Ala Leu His Asn
    450                 455                 460

His Tyr Thr Gln Lys Ser Leu Ser Leu Ser Pro Gly Lys
465                 470                 475
```

FIGURE 14B

FIGURE 15A
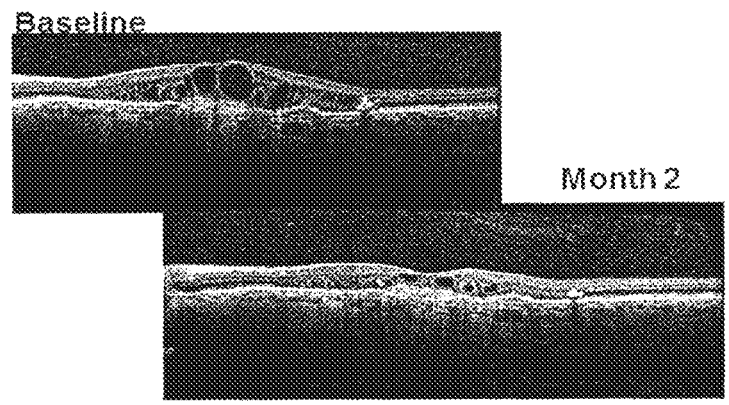
FIGURE 15B
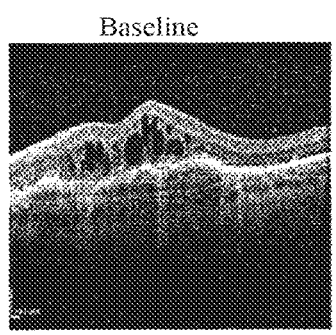 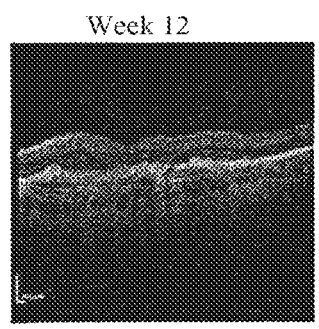
FIGURE 16A      FIGURE 16B

SEQUENCE LISTING

```
<160> NUMBER OF SEQ ID NOS: 23

<210> SEQ ID NO 1
<211> LENGTH: 9
<212> TYPE: PRT
<213> ORGANISM: Artificial Sequence
<220> FEATURE:
<223> OTHER INFORMATION: Synthetic

<400> SEQUENCE: 1

Gly Gly Gly Gly Gly Gly Gly Gly Gly
1               5

<210> SEQ ID NO 2
<211> LENGTH: 9
<212> TYPE: PRT
<213> ORGANISM: Artificial Sequence
<220> FEATURE:
<223> OTHER INFORMATION: Synthetic

<400> SEQUENCE: 2

Glu Glu Glu Glu Glu Glu Glu Glu Glu
1               5

<210> SEQ ID NO 3
<211> LENGTH: 9
<212> TYPE: PRT
<213> ORGANISM: Artificial Sequence
<220> FEATURE:
<223> OTHER INFORMATION: Synthetic

<400> SEQUENCE: 3

Ser Ser Ser Ser Ser Ser Ser Ser Ser
1               5

<210> SEQ ID NO 4
<211> LENGTH: 9
<212> TYPE: PRT
<213> ORGANISM: Artificial Sequence
<220> FEATURE:
<223> OTHER INFORMATION: Synthetic
```

```
<400> SEQUENCE: 4

Gly Gly Gly Gly Gly Cys Pro Pro Cys
1               5

<210> SEQ ID NO 5
<211> LENGTH: 15
<212> TYPE: PRT
<213> ORGANISM: Artificial Sequence
<220> FEATURE:
<223> OTHER INFORMATION: Synthetic

<400> SEQUENCE: 5

Gly Gly Gly Gly Ser Gly Gly Gly Gly Ser Gly Gly Gly Gly Ser
1               5                   10                  15

<210> SEQ ID NO 6
<211> LENGTH: 13
<212> TYPE: PRT
<213> ORGANISM: Artificial Sequence
<220> FEATURE:
<223> OTHER INFORMATION: Synthetic

<400> SEQUENCE: 6

Ser Cys Val Pro Leu Met Arg Cys Gly Gly Cys Cys Asn
1               5                   10

<210> SEQ ID NO 7
<211> LENGTH: 14
<212> TYPE: PRT
<213> ORGANISM: Artificial Sequence
<220> FEATURE:
<223> OTHER INFORMATION: Synthetic

<400> SEQUENCE: 7

Pro Ser Cys Val Pro Leu Met Arg Cys Gly Gly Cys Cys Asn
1               5                   10

<210> SEQ ID NO 8
<211> LENGTH: 9
<212> TYPE: PRT
<213> ORGANISM: Artificial Sequence
<220> FEATURE:
<223> OTHER INFORMATION: Synthetic

<400> SEQUENCE: 8

Gly Asp Leu Ile Tyr Arg Asn Gln Lys
1               5

<210> SEQ ID NO 9
<211> LENGTH: 23
<212> TYPE: PRT
<213> ORGANISM: Artificial Sequence
<220> FEATURE:
<223> OTHER INFORMATION: Synthetic

<400> SEQUENCE: 9

Gly Gly Gly Gly Gly Gly Gly Gly Pro Ser Cys Val Pro Leu Met
1               5                   10                  15

Arg Cys Gly Gly Cys Cys Asn
            20

<210> SEQ ID NO 10
<211> LENGTH: 1077
<212> TYPE: DNA
<213> ORGANISM: Artificial Sequence
```

<220> FEATURE:
<223> OTHER INFORMATION: sFLT01 protein: DNA sequence for a fusion
      protein including Flt-1

<400> SEQUENCE: 10

```
atggtcagct actgggacac cggggtcctg ctgtgcgcgc tgctcagctg tctgcttctc      60
acaggatctg gtagaccttt cgtagagatg tacagtgaaa tccccgaaat tatacacatg     120
actgaaggaa gggagctcgt cattccctgc cgggttacgt cacctaacat cactgttact     180
ttaaaaaagt ttccacttga cactttgatc cctgatggaa aacgcataat ctgggacagt     240
agaaagggct tcatcatatc aaatgcaacg tacaaagaaa tagggcttct gacctgtgaa     300
gcaacagtca atgggcattt gtataagaca aactatctca cacatcgaca aaccggtgga     360
ggtggaggtg gaggtggagg tcctaaatct tgtgacaaaa ctcacacatg cccaccgtgc     420
ccagcacctg aactcctggg gggaccgtca gtcttcctct tccccccaaa acccaaggac     480
accctcatga tctcccggac ccctgaggtc acatgcgtgg tggtggacgt gagccacgaa     540
gaccctgagg tcaagttcaa ctggtacgtg gacggcgtgg aggtgcataa tgccaagaca     600
aagccgcggg aggagcagta caacagcacg taccgtgtgg tcagcgtcct caccgtcctg     660
caccaggact ggctgaatgg caaggagtac aagtgcaagg tctccaacaa agccctccca     720
gcccccatcg agaaaaccat ctccaaagcc aaagggcagc cccgagaacc acaggtgtac     780
accctgcccc catcccggga tgagctgacc aagaaccagg tcagcctgac ctgcctggtc     840
aaaggcttct atcccagcga catcgccgtg gagtgggaga gcaatgggca gccggagaac     900
aactacaaga ccacgcctcc cgtgctggac tccgacggct ccttcttcct ctacagcaag     960
ctcaccgtgg acaagagcag gtggcagcag gggaacgtct tctcatgctc cgtgatgcat    1020
gaggctctgc acaaccacta cacgcagaag agcctctccc tgtctccggg taaatag      1077
```

<210> SEQ ID NO 11
<211> LENGTH: 358
<212> TYPE: PRT
<213> ORGANISM: Artificial Sequence
<220> FEATURE:
<223> OTHER INFORMATION: amino acid sequence for the sFLT01 protein

<400> SEQUENCE: 11

```
Met Val Ser Tyr Trp Asp Thr Gly Val Leu Leu Cys Ala Leu Leu Ser
1               5                   10                  15

Cys Leu Leu Leu Thr Gly Ser Gly Arg Pro Phe Val Glu Met Tyr Ser
            20                  25                  30

Glu Ile Pro Glu Ile Ile His Met Thr Glu Gly Arg Glu Leu Val Ile
        35                  40                  45

Pro Cys Arg Val Thr Ser Pro Asn Ile Thr Val Thr Leu Lys Lys Phe
    50                  55                  60

Pro Leu Asp Thr Leu Ile Pro Asp Gly Lys Arg Ile Ile Trp Asp Ser
65                  70                  75                  80

Arg Lys Gly Phe Ile Ile Ser Asn Ala Thr Tyr Lys Glu Ile Gly Leu
                85                  90                  95

Leu Thr Cys Glu Ala Thr Val Asn Gly His Leu Tyr Lys Thr Asn Tyr
            100                 105                 110

Leu Thr His Arg Gln Thr Gly Gly Gly Gly Gly Gly Gly Gly Gly Pro
        115                 120                 125

Lys Ser Cys Asp Lys Thr His Thr Cys Pro Pro Cys Pro Ala Pro Glu
    130                 135                 140
```

```
Leu Leu Gly Gly Pro Ser Val Phe Leu Phe Pro Lys Pro Lys Asp
145                 150                 155                 160

Thr Leu Met Ile Ser Arg Thr Pro Glu Val Thr Cys Val Val Asp
                165                 170                 175

Val Ser His Glu Asp Pro Glu Val Lys Phe Asn Trp Tyr Val Asp Gly
            180                 185                 190

Val Glu Val His Asn Ala Lys Thr Lys Pro Arg Glu Glu Gln Tyr Asn
        195                 200                 205

Ser Thr Tyr Arg Val Val Ser Val Leu Thr Val Leu His Gln Asp Trp
    210                 215                 220

Leu Asn Gly Lys Glu Tyr Lys Cys Lys Val Ser Asn Lys Ala Leu Pro
225                 230                 235                 240

Ala Pro Ile Glu Lys Thr Ile Ser Lys Ala Lys Gly Gln Pro Arg Glu
                245                 250                 255

Pro Gln Val Tyr Thr Leu Pro Pro Ser Arg Asp Glu Leu Thr Lys Asn
            260                 265                 270

Gln Val Ser Leu Thr Cys Leu Val Lys Gly Phe Tyr Pro Ser Asp Ile
        275                 280                 285

Ala Val Glu Trp Glu Ser Asn Gly Gln Pro Glu Asn Asn Tyr Lys Thr
    290                 295                 300

Thr Pro Pro Val Leu Asp Ser Asp Gly Ser Phe Phe Leu Tyr Ser Lys
305                 310                 315                 320

Leu Thr Val Asp Lys Ser Arg Trp Gln Gln Gly Asn Val Phe Ser Cys
                325                 330                 335

Ser Val Met His Glu Ala Leu His Asn His Tyr Thr Gln Lys Ser Leu
            340                 345                 350

Ser Leu Ser Pro Gly Lys
            355

<210> SEQ ID NO 12
<211> LENGTH: 1188
<212> TYPE: DNA
<213> ORGANISM: Homo sapiens
<220> FEATURE:
<223> OTHER INFORMATION: DNA sequence encoding VEGF

<400> SEQUENCE: 12
ctgacggaca gacagacaga caccgccccc agcccagct accacctcct ccccggccgg      60
cggcggacag tggacgcggc ggcgagccgc gggcaggggc cggagcccgc gcccggaggc    120
ggggtggagg gggtcgggc tcgcggcgtc gcactgaaac ttttcgtcca acttctgggc    180
tgttctcgct tcggaggagc cgtggtccgc gcggggaag ccgagccgag cggagccgcg    240
agaagtgcta gctcgggccg ggaggagccg cagccggagg aggggagga ggaagaagag    300 aaggaagagg agaggggcc gcagtggcga ctcggcgctc ggaagccggg ctcatggacg    360
ggtgaggcgg cggtgtgcgc agacagtgct ccagccgcgc gcgctcccca ggccctggcc    420
cgggcctcgg gccggggagg aagagtagct cgccgaggcg ccgaggagag cgggccgccc    480
cacagcccga gccggagagg gagcgcgagc cgcgccggcc ccgtcgggc tccgaaacc    540 atgaacttc tgctgtcttg ggtgcattgg agccttgcct tgctgctcta cctccaccat    600
gccaagtggt cccaggctgc acccatggca gaaggaggag ggcagaatca tcacgaagtg    660
gtgaagttca tggatgtcta tcagcgcagc tactgccatc aatcgagac cctggtggac    720 atcttccagg agtaccctga tgagatcgag tacatcttca gccatcctg tgtgccctg    780 atgcgatgcg ggggctgctg caatgacgag ggcctggagt gtgtgcccac tgaggagtcc    840
```

-continued

```
aacatcacca tgcagattat gcggatcaaa cctcaccaag gccagcacat aggagagatg    900
agcttcctac agcacaacaa atgtgaatgc agaccaaaga aagatagagc aagacaagaa    960
aaaaaatcag ttcgaggaaa gggaaagggg caaaaacgaa agcgcaagaa atcccggtat   1020
aagtcctgga gcgttccctg tgggccttgc tcagagcgga gaaagcattt gtttgtacaa   1080
gatccgcaga cgtgtaaatg ttcctgcaaa aacacagact cgcgttgcaa ggcgaggcag   1140
cttgagttaa cgaacgtac ttgcagatgt gacaagccga ggcggtga              1188
```

<210> SEQ ID NO 13
<211> LENGTH: 395
<212> TYPE: PRT
<213> ORGANISM: Homo sapiens
<220> FEATURE:
<223> OTHER INFORMATION: amino acid sequence for VEGF

<400> SEQUENCE: 13

```
Met Thr Asp Arg Gln Thr Asp Thr Ala Pro Ser Pro Ser Tyr His Leu
  1               5                  10                  15

Leu Pro Gly Arg Arg Thr Val Asp Ala Ala Ala Ser Arg Gly Gln
             20                  25                  30

Gly Pro Glu Pro Ala Pro Gly Gly Gly Val Glu Gly Val Gly Ala Arg
         35                  40                  45

Gly Val Ala Leu Lys Leu Phe Val Gln Leu Leu Gly Cys Ser Arg Phe
     50                  55                  60

Gly Gly Ala Val Val Arg Ala Gly Glu Ala Glu Pro Ser Gly Ala Ala
 65                  70                  75                  80

Arg Ser Ala Ser Ser Gly Arg Glu Glu Pro Gln Pro Glu Glu Gly Glu
                 85                  90                  95

Glu Glu Glu Glu Lys Glu Glu Arg Gly Pro Gln Trp Arg Leu Gly
            100                 105                 110

Ala Arg Lys Pro Gly Ser Trp Thr Gly Glu Ala Ala Val Cys Ala Asp
        115                 120                 125

Ser Ala Pro Ala Ala Arg Ala Pro Gln Ala Leu Ala Arg Ala Ser Gly
    130                 135                 140

Arg Gly Gly Arg Val Ala Arg Arg Gly Ala Glu Glu Ser Gly Pro Pro
145                 150                 155                 160

His Ser Pro Ser Arg Arg Gly Ser Ala Ser Arg Ala Gly Pro Gly Arg
                165                 170                 175

Ala Ser Glu Thr Met Asn Phe Leu Leu Ser Trp Val His Trp Ser Leu
            180                 185                 190

Ala Leu Leu Leu Tyr Leu His His Ala Lys Trp Ser Gln Ala Ala Pro
        195                 200                 205

Met Ala Glu Gly Gly Gln Asn His His Glu Val Val Lys Phe Met
    210                 215                 220

Asp Val Tyr Gln Arg Ser Tyr Cys His Pro Ile Glu Thr Leu Val Asp
225                 230                 235                 240

Ile Phe Gln Glu Tyr Pro Asp Glu Ile Glu Tyr Ile Phe Lys Pro Ser
                245                 250                 255

Cys Val Pro Leu Met Arg Cys Gly Gly Cys Cys Asn Asp Glu Gly Leu
            260                 265                 270

Glu Cys Val Pro Thr Glu Glu Ser Asn Ile Thr Met Gln Ile Met Arg
        275                 280                 285

Ile Lys Pro His Gln Gly Gln His Ile Gly Glu Met Ser Phe Leu Gln
    290                 295                 300
```

-continued

```
His Asn Lys Cys Glu Cys Arg Pro Lys Asp Arg Ala Arg Gln Glu
305                 310                 315                 320

Lys Lys Ser Val Arg Gly Lys Gly Gln Lys Arg Lys Arg Lys Lys
                325                 330                 335

Lys Ser Arg Tyr Lys Ser Trp Ser Val Pro Cys Gly Pro Cys Ser Glu
                340                 345                 350

Arg Arg Lys His Leu Phe Val Gln Asp Pro Gln Thr Cys Lys Cys Ser
            355                 360                 365

Cys Lys Asn Thr Asp Ser Arg Cys Lys Ala Arg Gln Leu Glu Leu Asn
        370                 375                 380

Glu Arg Thr Cys Arg Cys Asp Lys Pro Arg Arg
385                 390                 395
```

<210> SEQ ID NO 14
<211> LENGTH: 426
<212> TYPE: DNA
<213> ORGANISM: Artificial Sequence
<220> FEATURE:
<223> OTHER INFORMATION: DNA sequence for an additional fusion protein
      including a soluble Flt-1 linked by a Gly9 linker to the VEGF
      multimerization domain, Ex3

<400> SEQUENCE: 14

```
atggtcagct actgggacac cggggtcctg ctgtgcgcgc tgctcagctg tctgcttctc      60
acaggatctg gtagaccttt cgtagagatg tacagtgaaa tccccgaaat tatacacatg     120
actgaaggaa gggagctcgt cattccctgc cgggttacgt cacctaacat cactgttact     180
ttaaaaaagt ttccacttga cactttgatc cctgatggaa aacgcataat ctgggacagt     240
agaaagggct tcatcatatc aaatgcaacg tacaaagaaa tagggcttct gacctgtgaa     300
gcaacagtca atgggcattt gtataagaca aactatctca cacatcgaca aaccggtgga     360
ggtggaggtg gaggtggagg tccttcctgt gtgccectga tgcgatgcgg gggctgctgc     420
aattag                                                                426
```

<210> SEQ ID NO 15
<211> LENGTH: 141
<212> TYPE: PRT
<213> ORGANISM: Artificial Sequence
<220> FEATURE:
<223> OTHER INFORMATION: Synthetic amino acid sequence encoded by the
      DNA sequence of Figure 5

<400> SEQUENCE: 15

```
Met Val Ser Tyr Trp Asp Thr Gly Val Leu Leu Cys Ala Leu Leu Ser
1               5                   10                  15

Cys Leu Leu Leu Thr Gly Ser Gly Arg Pro Phe Val Glu Met Tyr Ser
                20                  25                  30

Glu Ile Pro Glu Ile Ile His Met Thr Glu Gly Arg Glu Leu Val Ile
            35                  40                  45

Pro Cys Arg Val Thr Ser Pro Asn Ile Thr Val Leu Lys Lys Phe
        50                  55                  60

Pro Leu Asp Thr Leu Ile Pro Asp Gly Lys Arg Ile Ile Trp Asp Ser
65                  70                  75                  80

Arg Lys Gly Phe Ile Ile Ser Asn Ala Thr Tyr Lys Glu Ile Gly Leu
                85                  90                  95

Leu Thr Cys Glu Ala Thr Val Asn Gly His Leu Tyr Lys Thr Asn Tyr
                100                 105                 110
```

Leu Thr His Arg Gln Thr Gly Gly Gly Gly Gly Gly Gly Gly Pro
                115                 120                 125

Ser Cys Val Pro Leu Met Arg Cys Gly Gly Cys Cys Asn
        130                 135                 140

<210> SEQ ID NO 16
<211> LENGTH: 744
<212> TYPE: DNA
<213> ORGANISM: Artificial Sequence
<220> FEATURE:
<223> OTHER INFORMATION: DNA sequence for an additional fusion protein
      including a soluble Flt-1 linked by Gly9 to the VEGF
      multimerization domain, Ex3 and a sequence from the IgG1 CH3
      region

<400> SEQUENCE: 16

```
atggtcagct actgggacac cggggtcctg ctgtgcgcgc tgctcagctg tctgcttctc     60
acaggatctg gtagaccttt cgtagagatg tacagtgaaa tccccgaaat tatacacatg    120
actgaaggaa gggagctcgt cattccctgc cgggttacgt cacctaacat cactgttact    180
ttaaaaaagt ttccacttga cactttgatc cctgatggaa aacgcataat ctgggacagt    240
agaaagggct tcatcatatc aaatgcaacg tacaaagaaa tagggcttct gacctgtgaa    300
gcaacagtca atgggcattt gtataagaca aactatctca cacatcgaca aaccggtgga    360
ggtggaggtg gaggtggagg tccttcctgt gtgcccctga tgcgatgcgg gggctgctgc    420
aatcagcccc gagaaccaca ggtgtacacc ctgcccccat cccgggatga gctgaccaag    480
aaccaggtca gcctgacctg cctggtcaaa ggcttctatc ccagcgacat cgccgtggag    540
tgggagagca atgggcagcc ggagaacaac tacaagacca cgcctcccgt gctggactcc    600
gacggctcct tcttcctcta cagcaagctc accgtggaca agagcaggtg gcagcagggg    660
aacgtcttct catgctccgt gatgcatgag gctctgcaca accactacac gcagaagagc    720
ctctccctgt ctccgggtaa atag                                           744
```

<210> SEQ ID NO 17
<211> LENGTH: 247
<212> TYPE: PRT
<213> ORGANISM: Artificial Sequence
<220> FEATURE:
<223> OTHER INFORMATION: Synthetic amino acid sequence encoded by the
      DNA sequence of Figure 7

<400> SEQUENCE: 17

Met Val Ser Tyr Trp Asp Thr Gly Val Leu Leu Cys Ala Leu Leu Ser
1               5                   10                  15

Cys Leu Leu Leu Thr Gly Ser Gly Arg Pro Phe Val Glu Met Tyr Ser
                20                  25                  30

Glu Ile Pro Glu Ile Ile His Met Thr Glu Gly Arg Glu Leu Val Ile
            35                  40                  45

Pro Cys Arg Val Thr Ser Pro Asn Ile Thr Val Thr Leu Lys Lys Phe
        50                  55                  60

Pro Leu Asp Thr Leu Ile Pro Asp Gly Lys Arg Ile Ile Trp Asp Ser
65                  70                  75                  80

Arg Lys Gly Phe Ile Ile Ser Asn Ala Thr Tyr Lys Glu Ile Gly Leu
                85                  90                  95

Leu Thr Cys Glu Ala Thr Val Asn Gly His Leu Tyr Lys Thr Asn Tyr
                100                 105                 110

Leu Thr His Arg Gln Thr Gly Gly Gly Gly Gly Gly Gly Gly Pro
            115                 120                 125

```
Ser Cys Val Pro Leu Met Arg Cys Gly Gly Cys Cys Asn Gln Pro Arg
130                 135                 140

Glu Pro Gln Val Tyr Thr Leu Pro Pro Ser Arg Asp Glu Leu Thr Lys
145                 150                 155                 160

Asn Gln Val Ser Leu Thr Cys Leu Val Lys Gly Phe Tyr Pro Ser Asp
                165                 170                 175

Ile Ala Val Glu Trp Glu Ser Asn Gly Gln Pro Glu Asn Asn Tyr Lys
                180                 185                 190

Thr Thr Pro Pro Val Leu Asp Ser Asp Gly Ser Phe Phe Leu Tyr Ser
        195                 200                 205

Lys Leu Thr Val Asp Lys Ser Arg Trp Gln Gln Gly Asn Val Phe Ser
        210                 215                 220

Cys Ser Val Met His Glu Ala Leu His Asn His Tyr Thr Gln Lys Ser
225                 230                 235                 240

Leu Ser Leu Ser Pro Gly Lys
                245

<210> SEQ ID NO 18
<211> LENGTH: 7120
<212> TYPE: DNA
<213> ORGANISM: Homo Sapiens
<220> FEATURE:
<223> OTHER INFORMATION: DNA sequence encoding for a representative
      Flt-1 receptor protein

<400> SEQUENCE: 18
atcgaggtcc gcgggaggct cggagcgcgc caggcggaca ctcctctcgg ctcctccccg      60
gcagcggcgg cggctcggag cgggctccgg ggctcgggtg cagcggccag cgggcgcctg    120
gcggcgagga ttacccgggg aagtggttgt ctcctggctg gagccgcgag acgggcgctc    180
agggcgcggg gccggcggcg gcgaacgaga ggacggactc tggcggccgg gtcgttggcc    240
gcggggagcg cgggcaccgg gcgagcaggc gcgtcgcgc tcaccatggt cagctactgg    300
gacaccgggg tcctgctgtg cgcgctgctc agctgtctgc ttctcacagg atctagttca    360
ggttcaaaat taaagatcc tgaactgagt ttaaaaggca cccagcacat catgcaagca    420
ggccagacac tgcatctcca atgcagggg gaagcagccc ataaatggtc tttgcctgaa    480
atggtgagta aggaaagcga aaggctgagc ataactaaat ctgcctgtgg aagaaatggc    540
aaacaattct gcagtacttt aaccttgaac acagctcaag caaaccacac tggcttctac    600
agctgcaaat atctagctgt acctacttca aagaagaagg aaacagaatc tgcaatctat    660
atatttatta gtgatacagg tagaccttc gtagagatgt acagtgaaat ccccgaaatt    720
atacacatga ctgaaggaag ggagctcgtc attccctgcc gggttacgtc acctaacatc    780
actgttactt taaaaaagtt tccacttgac actttgatcc ctgatggaaa acgcataatc    840
tgggacagta aagggctt catcatatca atgcaacgt acaaagaaat agggcttctg    900
acctgtgaag caacagtcaa tgggcatttg tataagacaa actatctcac acatcgacaa    960
accaatacaa tcatagatgt ccaaataagc acaccacgcc cagtcaaatt acttagaggc    1020
catactcttg tcctcaattg tactgctacc actcccttga acacgagagt tcaaatgacc    1080
tggagttacc ctgatgaaaa aaataagaga gcttccgtaa ggcgacgaat tgaccaaagc    1140
aattcccatg ccaacatatt ctacagtgtt cttactattg acaaaatgca gaacaaagac    1200
aaaggacttt atacttgtcg tgtaaggagt ggaccatcat tcaaatctgt taacacctca    1260
gtgcatatat atgataaagc attcatcact gtgaaacatc gaaaacagca ggtgcttgaa    1320
```

```
accgtagctg gcaagcggtc ttaccggctc tctatgaaag tgaaggcatt tccctcgccg   1380
gaagttgtat ggttaaaaga tgggttacct gcgactgaga atctgctcg ctatttgact    1440
cgtggctact cgttaattat caaggacgta actgaagagg atgcaggaa ttatacaatc    1500
ttgctgagca taaaacagtc aaatgtgttt aaaaacctca ctgccactct aattgtcaat   1560
gtgaaacccc agatttacga aaaggccgtg tcatcgtttc cagacccggc tctctaccca   1620
ctgggcagca gacaaatcct gacttgtacc gcatatggta tccctcaacc tacaatcaag   1680
tggttctggc acccctgtaa ccataatcat tccgaagcaa ggtgtgactt tgttccaat    1740
aatgaagagt cctttatcct ggatgctgac agcaacatgg aaacagaat tgagagcatc    1800
actcagcgca tggcaataat agaaggaaag aataagatgg ctagcaccct ggttgtggct   1860
gactctagaa tttctggaat ctacatttgc atagcttcca ataaagttgg gactgtggga   1920
agaaacataa gcttttatat cacagatgtg ccaaatgggt ttcatgttaa cttggaaaaa   1980
atgccgacgg aaggagagga cctgaaactg tcttgcacag ttaacaagtt cttatacaga   2040
gacgttactt ggattttact gcggacagtt aataacagaa caatgcacta cagtattagc   2100
aagcaaaaaa tggccatcac taaggagcac tccatcactc ttaatcttac catcatgaat   2160
gtttccctgc aagattcagg cacctatgcc tgcagagcca ggaatgtata cacaggggaa   2220
gaaatcctcc agaagaaaga aattacaatc agagatcagg aagcaccata cctcctgcga   2280
aacctcagtg atcacacagt ggccatcagc agttccacca ctttagactg tcatgctaat   2340
ggtgtccccg agcctcagat cacttggttt aaaaacaacc acaaaataca acaagagcct   2400
ggaattattt taggaccagg aagcagcacg ctgtttattg aaagagtcac agaagaggat   2460
gaaggtgtct atcactgcaa agccaccaac cagaagggct ctgtggaaag ttcagcatac   2520
ctcactgttc aaggaacctc ggacaagtct aatctggagc tgatcactct aacatgcacc   2580
tgtgtggctg cgactctctt ctggctccta ttaaccctct ttatccgaaa atgaaaagg    2640
tcttcttctg aaataaagac tgactaccta tcaattataa tggacccaga tgaagttcct   2700
ttggatgagc agtgtgagcg gctcccttat gatgccagca gtgggagtt tgcccgggag    2760
agacttaaac tgggcaaatc acttggaaga ggggcttttg aaaagtggt tcaagcatca    2820
gcatttggca ttaagaaatc acctacgtgc cggactgtgg ctgtgaaaat gctgaaagag   2880
ggggccacgg ccagcgagta caaagctctg atgactgagc taaaaatctt gacccacatt   2940
ggccaccatc tgaacgtggt taacctgctg ggagcctgca ccaagcaagg agggcctctg   3000
atggtgattg ttgaatactg caaatatgga aatctctcca actacctcaa gagcaaacgt   3060
gacttatttt ttctcaacaa ggatgcagca ctacacatgg agcctaagaa agaaaaaatg   3120
gagccaggcc tggaacaagg caagaaacca agactagata gcgtcaccag cagcgaaagc   3180
tttgcgagct ccggctttca ggaagataaa agtctgagtg atgttgagga agaggaggat   3240
tctgacggtt tctacaagga gcccatcact atggaagatc tgatttctta cagtttttcaa   3300
gtggccagag gcatggagtt cctgtcttcc agaaagtgca ttcatcggga cctggcagcg   3360
agaaacattc ttttatctga gaacaacgtg gtgaagattt gtgattttgg ccttgcccgg   3420
gatatttata agaaccccga ttatgtgaga aaggagata ctcgacttcc tctgaaatgg   3480
atggctcctg aatctatctt tgacaaaatc tacagcacca gagcgacgt gtggtcttac   3540
ggagtattgc tgtgggaaat cttctcctta ggtgggtctc catacccagg agtacaaatg   3600
gatgaggact tttgcagtcg cctgagggaa ggcatgagga tgagagctcc tgagtactct   3660
```

```
actcctgaaa tctatcagat catgctggac tgctggcaca gagacccaaa agaaaggcca    3720
agatttgcag aacttgtgga aaaactaggt gatttgcttc aagcaaatgt acaacaggat    3780
ggtaaagact acatcccaat caatgccata ctgacaggaa atagtgggtt tacatactca    3840
actcctgcct tctctgagga cttcttcaag gaaagtattt cagctccgaa gtttaattca    3900
ggaagctctg atgatgtcag atacgtaaat gctttcaagt tcatgagcct ggaaagaatc    3960
aaaacctttg aagaactttt accgaatgcc acctccatgt ttgatgacta ccagggcgac    4020
agcagcactc tgttggcctc tcccatgctg aagcgcttca cctggactga cagcaaaccc    4080
aaggcctcgc tcaagattga cttgagagta accagtaaaa gtaaggagtc ggggctgtct    4140
gatgtcagca ggcccagttt ctgccattcc agctgtgggc acgtcagcga aggcaagcgc    4200
aggttcacct acgaccacgc tgagctggaa aggaaaatcg cgtgctgctc ccgcccccca    4260
gactacaact cggtggtcct gtactccacc ccacccatct agagtttgac acgaagcctt    4320
atttctagaa gcacatgtgt atttataccc ccaggaaact agcttttgcc agtattatgc    4380
atatataagt ttacaccttt atctttccat gggagccagc tgcttttttgt gattttttta    4440 atagtgcttt ttttttttttg actaacaaga atgtaactcc agatagagaa atagtgacaa    4500
gtgaagaaca ctactgctaa atcctcatgt tactcagtgt tagagaaatc cttcctaaac    4560
ccaatgactt ccctgctcca accccccgcca cctcagggca cgcaggacca gtttgattga    4620
ggagctgcac tgatcaccca atgcatcacg tacccccactg gccagcccct gcagcccaaa    4680
acccagggca caagcccgt tagccccagg gatcactggc tggcctgagc aacatctcgg    4740
gagtcctcta gcaggcctaa gacatgtgag gaggaaaagg aaaaaaagca aaaagcaagg    4800
gagaaaagag aaaccgggag aaggcatgag aaagaatttg agacgcacca tgtgggcacg    4860 gaggggggacg gggctcagca atgccattc agtggcttcc cagctctgac ccttctacat    4920
ttgagggccc agccaggagc agatggacag cgatgagggg acattttctg gattctggga    4980
ggcaagaaaa ggacaaatat cttttttgga actaaagcaa attttagaac tttacctatg    5040
gaagtggttc tatgtccatt tcattcgtg gcatgttttg atttgtagca ctgagggtgg    5100
cactcaactc tgagcccata cttttggctc ctctagtaag atgcactgaa aacttagcca    5160
gagttaggtt gtctccaggc catgatggcc ttacactgaa aatgtcacat tctatttttgg    5220 gtattaatat atagtccaga cacttaactc aatttcttgg tattattctg ttttgcacag    5280
ttagttgtga agaaagctg agaagaatga aaatgcagtc ctgaggagag gagttttctc    5340
catatcaaaa cgagggctga tggaggaaaa aggtcaataa ggtcaaggga aaaccccgtc    5400
tctataccaa ccaaaccaat tcaccaacac agttgggacc caaaacacag gaagtcagtc    5460
acgtttcctt ttcatttaat ggggattcca ctatctcaca ctaatctgaa aggatgtgga    5520
agagcattag ctggcgcata ttaagcactt taagctcctt gagtaaaaag gtggtatgta    5580
atttatgcaa ggtatttctc cagttgggac tcaggatatt agttaatgag ccatcactag    5640
aagaaaagcc cattttcaac tgctttgaaa cttgcctggg gtctgagcat gatgggaata    5700
gggagacagg gtaggaaagg gcgcctactc ttcagggtct aaagatcaag tgggccttgg    5760
atcgctaagc tggctctgtt tgatgctatt tatgcaagtt agggtctatg tatttatgat    5820
gtctgcacct tctgcagcca gtcagaagct ggagaggcaa cagtggattg ctgcttcttg    5880
gggagaagag tatgcttcct tttatccatg taatttaact gtagaacctg agctctaagt    5940
aaccgaagaa tgtatgcctc tgttcttatg tgccacatcc ttgtttaaag gctctctgta    6000
tgaagagatg ggaccgtcat cagcacattc cctagtgagc ctactggctc ctggcagcgg    6060
```

```
cttttgtgga agactcacta gccagaagag aggagtggga cagtcctcta ccaagatcta    6120
aatccaaaca aaagcaggct agagccagaa gagaggacaa atctttgttc ttcctcttct    6180
ttacatacgc aaaccacctg tgacagctgg caattttata aatcaggtaa ctggaaggag    6240
gttaaacaca gaaaaagaa gacctcagtc aattctctac ttttttttt ttttccaaat     6300 cagataatag cccagcaaat agtgataaca aataaaacct tagctattca tgtcttgatt    6360
tcaataatta attcttaatc attaagagac cataataaat actccttttc aagagaaaag    6420
caaaaccatt agaattgtta ctcagctcct tcaaactcag gtttgtagca tacatgagtc    6480
catccatcag tcaaagaatg gttccatctg gagtcttaat gtagaaagaa aaatggagac    6540
ttgtaataat gagctagtta caaagtgctt gttcattaaa atagcactga aaattgaaac    6600
atgaattaac tgataatatt ccaatcattt gccatttatg acaaaaatgg ttggcactaa    6660
caaagaacga gcacttcctt tcagagtttc tgagataatg tacgtggaac agtctgggtg    6720
gaatggggct gaaaccatgt gcaagtctgt gtcttgtcag tccaagaagt gacaccgaga    6780 tgttaattt agggacccgt gccttgtttc ctagcccaca agaatgcaaa catcaaacag     6840
atactcgcta gcctcattta aattgattaa aggaggagtg catctttggc cgacagtggt    6900
gtaactgtat gtgtgtgtgt gtgtgtgt gtgtgtgt gtgtgggtgt atgtgtgttt        6960
tgtgcataac tatttaagga aactggaatt ttaaagttac ttttatacaa accaagaata    7020
tatgctacag atataagaca gacatggttt ggtcctatat ttctagtcat gatgaatgta    7080
ttttgtatac catcttcata taataaactt ccaaaacaca                          7120
```

```
<210> SEQ ID NO 19
<211> LENGTH: 1338
<212> TYPE: PRT
<213> ORGANISM: Homo sapiens
<220> FEATURE:
<223> OTHER INFORMATION: amino acid sequence of a representative Flt-1
      receptor protein

<400> SEQUENCE: 19

Met Val Ser Tyr Trp Asp Thr Gly Val Leu Leu Cys Ala Leu Leu Ser
1               5                   10                  15

Cys Leu Leu Leu Thr Gly Ser Ser Ser Gly Ser Lys Leu Lys Asp Pro
                20                  25                  30

Glu Leu Ser Leu Lys Gly Thr Gln His Ile Met Gln Ala Gly Gln Thr
            35                  40                  45

Leu His Leu Gln Cys Arg Gly Glu Ala Ala His Lys Trp Ser Leu Pro
        50                  55                  60

Glu Met Val Ser Lys Glu Ser Glu Arg Leu Ser Ile Thr Lys Ser Ala
65                  70                  75                  80

Cys Gly Arg Asn Gly Lys Gln Phe Cys Ser Thr Leu Thr Leu Asn Thr
                85                  90                  95

Ala Gln Ala Asn His Thr Gly Phe Tyr Ser Cys Lys Tyr Leu Ala Val
            100                 105                 110

Pro Thr Ser Lys Lys Lys Glu Thr Glu Ser Ala Ile Tyr Ile Phe Ile
        115                 120                 125

Ser Asp Thr Gly Arg Pro Phe Val Glu Met Tyr Ser Glu Ile Pro Glu
    130                 135                 140

Ile Ile His Met Thr Glu Gly Arg Glu Leu Val Ile Pro Cys Arg Val
145                 150                 155                 160

Thr Ser Pro Asn Ile Thr Val Thr Leu Lys Lys Phe Pro Leu Asp Thr
```

```
                    165                 170                 175
Leu Ile Pro Asp Gly Lys Arg Ile Ile Trp Asp Ser Arg Lys Gly Phe
                180                 185                 190
Ile Ile Ser Asn Ala Thr Tyr Lys Glu Ile Gly Leu Leu Thr Cys Glu
                195                 200                 205
Ala Thr Val Asn Gly His Leu Tyr Lys Thr Asn Tyr Leu Thr His Arg
210                 215                 220
Gln Thr Asn Thr Ile Ile Asp Val Gln Ile Ser Thr Pro Arg Pro Val
225                 230                 235                 240
Lys Leu Leu Arg Gly His Thr Leu Val Leu Asn Cys Thr Ala Thr Thr
                245                 250                 255
Pro Leu Asn Thr Arg Val Gln Met Thr Trp Ser Tyr Pro Asp Glu Lys
                260                 265                 270
Asn Lys Arg Ala Ser Val Arg Arg Ile Asp Gln Ser Asn Ser His
                275                 280                 285
Ala Asn Ile Phe Tyr Ser Val Leu Thr Ile Asp Lys Met Gln Asn Lys
                290                 295                 300
Asp Lys Gly Leu Tyr Thr Cys Arg Val Arg Ser Gly Pro Ser Phe Lys
305                 310                 315                 320
Ser Val Asn Thr Ser Val His Ile Tyr Asp Lys Ala Phe Ile Thr Val
                325                 330                 335
Lys His Arg Lys Gln Gln Val Leu Glu Thr Val Ala Gly Lys Arg Ser
                340                 345                 350
Tyr Arg Leu Ser Met Lys Val Lys Ala Phe Pro Ser Pro Glu Val Val
                355                 360                 365
Trp Leu Lys Asp Gly Leu Pro Ala Thr Glu Lys Ser Ala Arg Tyr Leu
                370                 375                 380
Thr Arg Gly Tyr Ser Leu Ile Ile Lys Asp Val Thr Glu Glu Asp Ala
385                 390                 395                 400
Gly Asn Tyr Thr Ile Leu Leu Ser Ile Lys Gln Ser Asn Val Phe Lys
                405                 410                 415
Asn Leu Thr Ala Thr Leu Ile Val Asn Val Lys Pro Gln Ile Tyr Glu
                420                 425                 430
Lys Ala Val Ser Ser Phe Pro Asp Pro Ala Leu Tyr Pro Leu Gly Ser
                435                 440                 445
Arg Gln Ile Leu Thr Cys Thr Ala Tyr Gly Ile Pro Gln Pro Thr Ile
                450                 455                 460
Lys Trp Phe Trp His Pro Cys Asn His Asn His Ser Glu Ala Arg Cys
465                 470                 475                 480
Asp Phe Cys Ser Asn Asn Glu Glu Ser Phe Ile Leu Asp Ala Asp Ser
                485                 490                 495
Asn Met Gly Asn Arg Ile Glu Ser Ile Thr Gln Arg Met Ala Ile Ile
                500                 505                 510
Glu Gly Lys Asn Lys Met Ala Ser Thr Leu Val Val Ala Asp Ser Arg
                515                 520                 525
Ile Ser Gly Ile Tyr Ile Cys Ile Ala Ser Asn Lys Val Gly Thr Val
                530                 535                 540
Gly Arg Asn Ile Ser Phe Tyr Ile Thr Asp Val Pro Asn Gly Phe His
545                 550                 555                 560
Val Asn Leu Glu Lys Met Pro Thr Glu Gly Glu Asp Leu Lys Leu Ser
                565                 570                 575
Cys Thr Val Asn Lys Phe Leu Tyr Arg Asp Val Thr Trp Ile Leu Leu
                580                 585                 590
```

```
Arg Thr Val Asn Asn Arg Thr Met His Tyr Ser Ile Ser Lys Gln Lys
            595                 600                 605

Met Ala Ile Thr Lys Glu His Ser Ile Thr Leu Asn Leu Thr Ile Met
    610                 615                 620

Asn Val Ser Leu Gln Asp Ser Gly Thr Tyr Ala Cys Arg Ala Arg Asn
625                 630                 635                 640

Val Tyr Thr Gly Glu Glu Ile Leu Gln Lys Lys Glu Ile Thr Ile Arg
                645                 650                 655

Asp Gln Glu Ala Pro Tyr Leu Leu Arg Asn Leu Ser Asp His Thr Val
                660                 665                 670

Ala Ile Ser Ser Thr Thr Leu Asp Cys His Ala Asn Gly Val Pro
            675                 680                 685

Glu Pro Gln Ile Thr Trp Phe Lys Asn Asn His Lys Ile Gln Gln Glu
    690                 695                 700

Pro Gly Ile Ile Leu Gly Pro Gly Ser Ser Thr Leu Phe Ile Glu Arg
705                 710                 715                 720

Val Thr Glu Glu Asp Glu Gly Val Tyr His Cys Lys Ala Thr Asn Gln
                725                 730                 735

Lys Gly Ser Val Glu Ser Ser Ala Tyr Leu Thr Val Gln Gly Thr Ser
            740                 745                 750

Asp Lys Ser Asn Leu Glu Leu Ile Thr Leu Thr Cys Thr Cys Val Ala
    755                 760                 765

Ala Thr Leu Phe Trp Leu Leu Leu Thr Leu Leu Ile Arg Lys Met Lys
770                 775                 780

Arg Ser Ser Ser Glu Ile Lys Thr Asp Tyr Leu Ser Ile Ile Met Asp
785                 790                 795                 800

Pro Asp Glu Val Pro Leu Asp Glu Gln Cys Glu Arg Leu Pro Tyr Asp
                805                 810                 815

Ala Ser Lys Trp Glu Phe Ala Arg Glu Arg Leu Lys Leu Gly Lys Ser
            820                 825                 830

Leu Gly Arg Gly Ala Phe Gly Lys Val Val Gln Ala Ser Ala Phe Gly
    835                 840                 845

Ile Lys Lys Ser Pro Thr Cys Arg Thr Val Ala Val Lys Met Leu Lys
850                 855                 860

Glu Gly Ala Thr Ala Ser Glu Tyr Lys Ala Leu Met Thr Glu Leu Lys
865                 870                 875                 880

Ile Leu Thr His Ile Gly His His Leu Asn Val Val Asn Leu Leu Gly
                885                 890                 895

Ala Cys Thr Lys Gln Gly Gly Pro Leu Met Val Ile Val Glu Tyr Cys
            900                 905                 910

Lys Tyr Gly Asn Leu Ser Asn Tyr Leu Lys Ser Lys Arg Asp Leu Phe
    915                 920                 925

Phe Leu Asn Lys Asp Ala Ala Leu His Met Glu Pro Lys Lys Glu Lys
930                 935                 940

Met Glu Pro Gly Leu Glu Gln Gly Lys Lys Pro Arg Leu Asp Ser Val
945                 950                 955                 960

Thr Ser Ser Glu Ser Phe Ala Ser Ser Gly Phe Gln Glu Asp Lys Ser
                965                 970                 975

Leu Ser Asp Val Glu Glu Glu Asp Ser Asp Gly Phe Tyr Lys Glu
            980                 985                 990

Pro Ile Thr Met Glu Asp Leu Ile Ser Tyr Ser Phe Gln Val Ala Arg
    995                 1000                1005
```

-continued

| | | | | | | | | | | | |
|---|---|---|---|---|---|---|---|---|---|---|---|
|Gly|Met|Glu|Phe|Leu|Ser|Ser|Arg|Lys|Cys|Ile|His|Arg|Asp|Leu|
|1010| | | | |1015| | | | |1020| | | | |

Ala Ala Arg Asn Ile Leu Leu Ser Glu Asn Asn Val Val Lys Ile
    1025                1030                1035

Cys Asp Phe Gly Leu Ala Arg Asp Ile Tyr Lys Asn Pro Asp Tyr
    1040                1045                1050

Val Arg Lys Gly Asp Thr Arg Leu Pro Leu Lys Trp Met Ala Pro
    1055                1060                1065

Glu Ser Ile Phe Asp Lys Ile Tyr Ser Thr Lys Ser Asp Val Trp
    1070                1075                1080

Ser Tyr Gly Val Leu Leu Trp Glu Ile Phe Ser Leu Gly Gly Ser
    1085                1090                1095

Pro Tyr Pro Gly Val Gln Met Asp Glu Asp Phe Cys Ser Arg Leu
    1100                1105                1110

Arg Glu Gly Met Arg Met Arg Ala Pro Glu Tyr Ser Thr Pro Glu
    1115                1120                1125

Ile Tyr Gln Ile Met Leu Asp Cys Trp His Arg Asp Pro Lys Glu
    1130                1135                1140

Arg Pro Arg Phe Ala Glu Leu Val Glu Lys Leu Gly Asp Leu Leu
    1145                1150                1155

Gln Ala Asn Val Gln Gln Asp Gly Lys Asp Tyr Ile Pro Ile Asn
    1160                1165                1170

Ala Ile Leu Thr Gly Asn Ser Gly Phe Thr Tyr Ser Thr Pro Ala
    1175                1180                1185

Phe Ser Glu Asp Phe Phe Lys Glu Ser Ile Ser Ala Pro Lys Phe
    1190                1195                1200

Asn Ser Gly Ser Ser Asp Val Arg Tyr Val Asn Ala Phe Lys
    1205                1210                1215

Phe Met Ser Leu Glu Arg Ile Lys Thr Phe Glu Glu Leu Leu Pro
    1220                1225                1230

Asn Ala Thr Ser Met Phe Asp Asp Tyr Gln Gly Asp Ser Ser Thr
    1235                1240                1245

Leu Leu Ala Ser Pro Met Leu Lys Arg Phe Thr Trp Thr Asp Ser
    1250                1255                1260

Lys Pro Lys Ala Ser Leu Lys Ile Asp Leu Arg Val Thr Ser Lys
    1265                1270                1275

Ser Lys Glu Ser Gly Leu Ser Asp Val Ser Arg Pro Ser Phe Cys
    1280                1285                1290

His Ser Ser Cys Gly His Val Ser Glu Gly Lys Arg Arg Phe Thr
    1295                1300                1305

Tyr Asp His Ala Glu Leu Glu Arg Lys Ile Ala Cys Cys Ser Pro
    1310                1315                1320

Pro Pro Asp Tyr Asn Ser Val Val Leu Tyr Ser Thr Pro Pro Ile
    1325                1330                1335

<210> SEQ ID NO 20
<211> LENGTH: 702
<212> TYPE: DNA
<213> ORGANISM: Artificial Sequence
<220> FEATURE:
<223> OTHER INFORMATION: DNA sequence for a fusion protein including
      Flt-1, termed "sFLT02 protein" herein which includes a soluble
      Flt-1 linked by Gly9 to the a sequence from the IgG1 CH3 region

<400> SEQUENCE: 20
atggtcagct actgggacac cggggtcctg ctgtgcgcgc tgctcagctg tctgcttctc    60

```
acaggatctg gtagaccttt cgtagagatg tacagtgaaa tccccgaaat tatacacatg    120
actgaaggaa gggagctcgt cattccctgc cgggttacgt cacctaacat cactgttact    180
ttaaaaaagt ttccacttga cactttgatc cctgatggaa aacgcataat ctgggacagt    240
agaaagggct tcatcatatc aaatgcaacg tacaaagaaa tagggcttct gacctgtgaa    300
gcaacagtca atgggcattt gtataagaca aactatctca cacatcgaca aaccggtgga    360
ggtggaggtg gaggtggagg tcagccccga gaaccacagg tgtacaccct gcccccatcc    420
cgggatgagc tgaccaagaa ccaggtcagc ctgacctgcc tggtcaaagg cttctatccc    480
agcgacatcg ccgtggagtg ggagagcaat gggcagccgg agaacaacta caagaccacg    540
cctcccgtgc tggactccga cggctccttc ttcctctaca gcaagctcac cgtggacaag    600
agcaggtggc agcaggggaa cgtcttctca tgctccgtga tgcatgaggc tctgcacaac    660
cactacacgc agaagagcct ctccctgtct ccgggtaaat ag                       702
```

```
<210> SEQ ID NO 21
<211> LENGTH: 233
<212> TYPE: PRT
<213> ORGANISM: Artificial Sequence
<220> FEATURE:
<223> OTHER INFORMATION: amino acid sequence for the sFLT02 protein

<400> SEQUENCE: 21

Met Val Ser Tyr Trp Asp Thr Gly Val Leu Leu Cys Ala Leu Leu Ser
1               5                   10                  15

Cys Leu Leu Leu Thr Gly Ser Gly Arg Pro Phe Val Glu Met Tyr Ser
            20                  25                  30

Glu Ile Pro Glu Ile Ile His Met Thr Glu Gly Arg Glu Leu Val Ile
        35                  40                  45

Pro Cys Arg Val Thr Ser Pro Asn Ile Thr Val Thr Leu Lys Lys Phe
    50                  55                  60

Pro Leu Asp Thr Leu Ile Pro Asp Gly Lys Arg Ile Ile Trp Asp Ser
65                  70                  75                  80

Arg Lys Gly Phe Ile Ile Ser Asn Ala Thr Tyr Lys Glu Ile Gly Leu
                85                  90                  95

Leu Thr Cys Glu Ala Thr Val Asn Gly His Leu Tyr Lys Thr Asn Tyr
            100                 105                 110

Leu Thr His Arg Gln Thr Gly Gly Gly Gly Gly Gly Gly Gly Gly Gln
        115                 120                 125

Pro Arg Glu Pro Gln Val Tyr Thr Leu Pro Pro Ser Arg Asp Glu Leu
    130                 135                 140

Thr Lys Asn Gln Val Ser Leu Thr Cys Leu Val Lys Gly Phe Tyr Pro
145                 150                 155                 160

Ser Asp Ile Ala Val Glu Trp Glu Ser Asn Gly Gln Pro Glu Asn Asn
                165                 170                 175

Tyr Lys Thr Thr Pro Pro Val Leu Asp Ser Asp Gly Ser Phe Phe Leu
            180                 185                 190

Tyr Ser Lys Leu Thr Val Asp Lys Ser Arg Trp Gln Gln Gly Asn Val
        195                 200                 205

Phe Ser Cys Ser Val Met His Glu Ala Leu His Asn His Tyr Thr Gln
    210                 215                 220

Lys Ser Leu Ser Leu Ser Pro Gly Lys
225                 230
```

```
<210> SEQ ID NO 22
<211> LENGTH: 1434
<212> TYPE: DNA
<213> ORGANISM: Homo sapiens
<220> FEATURE:
<223> OTHER INFORMATION: nucleotide sequence of the IgG1 lambda heavy
      chain

<400> SEQUENCE: 22
atggagtttg ggctgagctg ggttttcctc gttgctcttt taagaggtgt ccagtgtcag    60
gtgcagctgg tggagtctgg gggaggcgtg gtccagcctg gaggtccct gagactctcc    120 tgtgcagcgt ctggattcac cttcagtaat tatggcatgc actgggtccg ccaggctcca    180
ggcaaggggc tggagtgggt ggcagctata tggtatgatg gaagtaataa atactatgca    240
gactccgtga agggccgatt caccatctcc agagacaatt ccaagaacac gttgtatatg    300
caaatgaaca gcctgagagc cgaggacacg gctgtgtatt attgtgcgag agaggtcgg    360 tgggtacgat atactacggt gactactatc ggatactact ttgactactg gggccaggga    420
accctggtca ccgtctcctc agcctccacc aagggcccat cggtcttccc cctggcaccc    480
tcctccaaga gcacctctgg gggcacagcg gccctgggct gcctggtcaa ggactacttc    540
cccgaaccgg tgacggtgtc gtggaactca ggcgccctga ccagcggcgt gcacaccttc    600
ccggctgtcc tacagtcctc aggactctac tccctcagca gcgtggtgac cgtgccctcc    660
agcagcttgg gcacccagac ctacatctgc aacgtgaatc acaagcccag caacaccaag    720
gtggacaaga gagttgagcc caaatcttgt gacaaaactc acacatgccc accgtgccca    780
gcacctgaac tcctgggggg accgtcagtc ttcctcttcc ccccaaaacc caaggacacc    840
ctcatgatct cccggacccc tgaggtcaca tgcgtggtgg tggacgtgag ccacgaagac    900
cctgaggtca agttcaactg gtacgtggac ggcgtggagg tgcataatgc caagacaaag    960
ccgcgggagg agcagtacaa cagcacgtac cgtgtggtca gcgtcctcac cgtcctgcac   1020
caggactggc tgaatggcaa ggagtacaag tgcaaggtct ccaacaaagc cctcccagcc   1080
cccatcgaga aaaccatctc caaagccaaa gggcagcccc gagaaccaca ggtgtacacc   1140
ctgcccccat cccgggagga gatgaccaag aaccaggtca gcctgacctg cctggtcaaa   1200
ggcttctatc ccagcgacat cgccgtggag tgggagagca atgggcagcc ggagaacaac   1260
tacaagacca cgcctcccgt gctggactcc gacggctcct tcttcctcta tagcaagctc   1320
accgtggaca agagcaggtg gcagcagggg aacgtcttct catgctccgt gatgcatgag   1380
gctctgcaca accactacac gcagaagagc ctctccctgt ccccgggtaa atga         1434

<210> SEQ ID NO 23
<211> LENGTH: 477
<212> TYPE: PRT
<213> ORGANISM: Homo sapiens
<220> FEATURE:
<223> OTHER INFORMATION: amino acid sequence of the IgG1 lambda heavy
      chain

<400> SEQUENCE: 23

Met Glu Phe Gly Leu Ser Trp Val Phe Leu Val Ala Leu Leu Arg Gly
1               5                   10                  15

Val Gln Cys Gln Val Gln Leu Val Glu Ser Gly Gly Gly Val Val Gln
            20                  25                  30

Pro Gly Arg Ser Leu Arg Leu Ser Cys Ala Ala Ser Gly Phe Thr Phe
        35                  40                  45

Ser Asn Tyr Gly Met His Trp Val Arg Gln Ala Pro Gly Lys Gly Leu
```

```
            50                  55                  60
Glu Trp Val Ala Ala Ile Trp Tyr Asp Gly Ser Asn Lys Tyr Tyr Ala
 65                  70                  75                  80

Asp Ser Val Lys Gly Arg Phe Thr Ile Ser Arg Asp Asn Ser Lys Asn
                 85                  90                  95

Thr Leu Tyr Met Gln Met Asn Ser Leu Arg Ala Glu Asp Thr Ala Val
                100                 105                 110

Tyr Tyr Cys Ala Arg Glu Gly Arg Trp Val Arg Tyr Thr Thr Val Thr
                115                 120                 125

Thr Ile Gly Tyr Tyr Phe Asp Tyr Trp Gly Gln Gly Thr Leu Val Thr
                130                 135                 140

Val Ser Ser Ala Ser Thr Lys Gly Pro Ser Val Phe Pro Leu Ala Pro
145                 150                 155                 160

Ser Ser Lys Ser Thr Ser Gly Gly Thr Ala Ala Leu Gly Cys Leu Val
                165                 170                 175

Lys Asp Tyr Phe Pro Glu Pro Val Thr Val Ser Trp Asn Ser Gly Ala
                180                 185                 190

Leu Thr Ser Gly Val His Thr Phe Pro Ala Val Leu Gln Ser Ser Gly
                195                 200                 205

Leu Tyr Ser Leu Ser Ser Val Val Thr Val Pro Ser Ser Ser Leu Gly
210                 215                 220

Thr Gln Thr Tyr Ile Cys Asn Val Asn His Lys Pro Ser Asn Thr Lys
225                 230                 235                 240

Val Asp Lys Arg Val Glu Pro Lys Ser Cys Asp Lys Thr His Thr Cys
                245                 250                 255

Pro Pro Cys Pro Ala Pro Glu Leu Leu Gly Gly Pro Ser Val Phe Leu
                260                 265                 270

Phe Pro Pro Lys Pro Lys Asp Thr Leu Met Ile Ser Arg Thr Pro Glu
                275                 280                 285

Val Thr Cys Val Val Val Asp Val Ser His Glu Asp Pro Glu Val Lys
                290                 295                 300

Phe Asn Trp Tyr Val Asp Gly Val Glu Val His Asn Ala Lys Thr Lys
305                 310                 315                 320

Pro Arg Glu Glu Gln Tyr Asn Ser Thr Tyr Arg Val Val Ser Val Leu
                325                 330                 335

Thr Val Leu His Gln Asp Trp Leu Asn Gly Lys Glu Tyr Lys Cys Lys
                340                 345                 350

Val Ser Asn Lys Ala Leu Pro Ala Pro Ile Glu Lys Thr Ile Ser Lys
                355                 360                 365

Ala Lys Gly Gln Pro Arg Glu Pro Gln Val Tyr Thr Leu Pro Pro Ser
                370                 375                 380

Arg Glu Glu Met Thr Lys Asn Gln Val Ser Leu Thr Cys Leu Val Lys
385                 390                 395                 400

Gly Phe Tyr Pro Ser Asp Ile Ala Val Glu Trp Glu Ser Asn Gly Gln
                405                 410                 415

Pro Glu Asn Asn Tyr Lys Thr Thr Pro Pro Val Leu Asp Ser Asp Gly
                420                 425                 430

Ser Phe Phe Leu Tyr Ser Lys Leu Thr Val Asp Lys Ser Arg Trp Gln
                435                 440                 445
```

```
Gln Gly Asn Val Phe Ser Cys Ser Val Met His Glu Ala Leu His Asn
    450                 455             460

His Tyr Thr Gln Lys Ser Leu Ser Leu Ser Pro Gly Lys
465                 470             475
```

COMPOSITIONS AND METHODS FOR TREATING AND PREVENTING MACULAR DEGENERATION

CROSS REFERENCE TO RELATED APPLICATIONS

This application is a continuation of U.S. patent application Ser. No. 15/113,720, which adopts the international filing date of Feb. 6, 2015, which is a National Phase application under 35 U.S.C. § 371 of International Application No. PCT/US2015/014872, filed Feb. 6, 2015, which claims the priority benefit of U.S. Provisional Application No. 61/936,797, filed Feb. 6, 2014, the disclosure of each of which is hereby incorporated by reference in its entirety.

SUBMISSION OF SEQUENCE LISTING ON ASCII TEXT FILE

The content of the following submission on ASCII text file is incorporated herein by reference in its entirety: a computer readable form (CRF) of the Sequence Listing (file name: 159792016301SEQLIST.TXT, date recorded: Feb. 8, 2022, size: 48,821 bytes).

TECHNICAL FIELD

The present invention relates generally to methods for treating and preventing macular degeneration in humans. In particular, the present invention pertains to methods for treating or preventing macular degeneration using the vascular endothelial growth factor (VEGF) receptor, Flt-1.

SUMMARY OF THE INVENTION

Age-related macular degeneration (AMD) is the primary cause of central irreversible blindness in the elderly. Early clinical presentation of AMD involves subretinal accumulation of debris (drusen). Patients who progress develop either geographic atrophy (GA), with significant degeneration and atrophy of the macular cells, or neovascular AMD (nAMD), with choroidal neovascularization occurring in the end stage of the disease process in an attempt to save the degenerating retina. Blindness results when photoreceptors atrophy following macular retinal pigment epithelial (RPE) degeneration.

Pathogenesis is contingent on aging, environmental and genetic risk factors but the molecular mechanism responsible for disease onset remains largely unknown. The most prominent known genetic factor is a missense mutation residing within the immunoregulatory complement factor H (CFH) gene.

Pathological neovascularization associated with ocular disorders such as nAMD is mediated through the up-regulation of vascular endothelial growth factor (VEGF). Inhibition of VEGF using antibodies, soluble receptors or aptamers has proven to be a promising clinical approach for managing these diseases. While profound improvements in AMD management have been realized, the current anti-VEGF antagonists require repeated intravitreal administrations that can burden both the patient and the treating physician.

Accordingly, there remains a need for developing methods for treating macular degeneration in humans that are less burdensome and commercially viable.

The present invention is based on the discovery that soluble Flt-1 receptors are able to treat macular degeneration in human subjects. Therapeutic results are seen with a wide range of doses when the soluble receptors are delivered using rAAV-mediated gene delivery. High doses were tolerated and yielded therapeutic benefits. In addition, the inventors herein have demonstrated that intravitreal delivery of a single dose as low as $2 \times 10^8$ vector genomes (vg), as well as $2 \times 10^{10}$ vg, resulted in a significant reduction of subretinal and intraretinal fluid two months after injection.

Accordingly, in one embodiment, the invention is directed to a method of treating macular degeneration in a human subject comprising administering to the diseased eye of the subject a composition comprising a recombinant adeno-associated virus (rAAV) virion comprising a polynucleotide encoding a soluble protein comprising at least one domain of vascular endothelial growth factor receptor-1 (VEGFR-1 or Flt-1) capable of modulating VEGF activity, wherein from about $1 \times 10^7$ to about $1 \times 10^{13}$ rAAV virions are delivered to the eye.

In further embodiments, the invention is directed to a method of treating macular edema in a human subject comprising administering to the diseased eye of the subject a composition comprising a recombinant adeno-associated virus (rAAV) virion comprising a polynucleotide encoding a soluble protein comprising at least one domain of VEGFR-1 (Flt-1) capable of modulating VEGF activity, wherein from about $1 \times 10^7$ to about $1 \times 10^{13}$ rAAV virions are delivered to the eye.

In embodiments of the above methods, from about $1 \times 10^7$ to about $1 \times 10^{12}$; $1 \times 10^8$ to about $1 \times 10^{12}$; about $1 \times 10^8$ to about $1 \times 10^{11}$; about $1 \times 10^8$ to about $1 \times 10^{10}$; about $1 \times 10^8$ to about $1 \times 10^9$; about $2 \times 10^7$ to about $2 \times 10^{12}$; about $2 \times 10^8$ to about $2 \times 10^{12}$; about $2 \times 10^8$ to about $2 \times 10^{11}$; about $2 \times 10^8$ to about $2 \times 10^{10}$; about $2 \times 10^8$ to about $2 \times 10^9$; $2 \times 10^9$ to about $2 \times 10^{10}$; about $1 \times 10^{10}$ to about $1 \times 10^{13}$; about $1 \times 10^{10}$ to about $1 \times 10^{12}$; about $1 \times 10^{10}$ to about $1 \times 10^{11}$; about $2 \times 10^{10}$ to about $1 \times 10^{13}$; $2 \times 10^{10}$ to about $1 \times 10^{12}$; about $2 \times 10^{10}$ to about $2 \times 10^{12}$; about $2 \times 10^{10}$ to about $1 \times 10^{11}$; or about $2 \times 10^{10}$ to about $2 \times 10^{11}$ rAAV virions are administered to the eye. In some embodiments, about $1 \times 10^7$, about $2 \times 10^7$, about $6 \times 10^7$, about $1 \times 10^8$, about $2 \times 10^8$, about $6 \times 10^8$, about $1 \times 10^9$, about $2 \times 10^9$, about $6 \times 10^9$, about $1 \times 10^{10}$, about $2 \times 10^{10}$, about $6 \times 10^{10}$, about $1 \times 10^{11}$, about $2 \times 10^{11}$, about $6 \times 10^{11}$, about $1 \times 10^{12}$, about $2 \times 10^{12}$, about $6 \times 10^{12}$, or about $1 \times 10^{13}$ rAAV virions are administered to the eye.

In additional embodiments, the invention is directed to a method of treating macular degeneration in a human subject comprising administering to the diseased eye of the subject a composition comprising a recombinant adeno-associated virus (rAAV) virion comprising a polynucleotide encoding a soluble protein comprising at least one domain of VEGFR-1 (Flt-1) capable of modulating VEGF activity, wherein less than about $2 \times 10^{10}$ rAAV virions are delivered to the eye.

In further embodiments, the invention is directed to a method of treating macular edema in a human subject comprising administering to the diseased eye of the subject a composition comprising a recombinant adeno-associated virus (rAAV) virion comprising a polynucleotide encoding a soluble protein comprising at least one domain of VEGFR-1 (Flt-1) capable of modulating VEGF activity, wherein less than about $2 \times 10^{10}$ rAAV virions are delivered to the eye.

In any of the methods above, the composition may further comprise an ophthalmologically acceptable vehicle.

In additional embodiments of the above methods, a single intravitreal injection of rAAV virions is administered to the eye.

In further embodiments, the soluble protein comprises:
(a) the at least one domain of Flt-1;
(b) a multimerization domain derived from an immunoglobulin heavy chain; and
(c) a linker 5-25 amino acid residues in length linking (a) to (b), wherein when the soluble protein is expressed, a multimer of the soluble protein is produced.

In any of the methods above, the at least one domain comprises domain 2 of Flt-1.

In further embodiments, the multimer is a homodimer.

In additional embodiments, the multimerization domain comprises the Fc region of an IgG, or an active fragment thereof.

In certain embodiments of the methods above, the multimerization domain comprises the CH3 domain of an IgG, or an active fragment thereof.

In further embodiments, the multimerization domain is from an IgG1, an IgG2, an IgG3 or an IgG4, such as from the constant region of an IgG1 heavy chain.

In additional embodiments, the linker is selected from the group consisting of:

$gly_9$;                                                                (SEQ ID NO: 1)

$glu_9$;                                                                (SEQ ID NO: 2)

$ser_9$;                                                                (SEQ ID NO: 3)

$gly_5cyspro_2cys$;                                                     (SEQ ID NO: 4)

$(gly_4ser)_3$;                                                         (SEQ ID NO: 5)

SerCysValProLeuMetArgCysGlyGlyCysCysAsn;                                (SEQ ID NO: 6)

ProSerCysValProLeuMetArgCysGlyGlyCysCysAsn;                             (SEQ ID NO: 7)

GlyAspLeuIleTyrArgAsnGlnLys;                                            (SEQ ID NO: 8)
and $Gly_9$ProSerCysValProLeuMetArgCysGlyGlyCysCysAsn.                      (SEQ ID NO: 9)

In other embodiments, the soluble protein has the formula X—Y—Z, wherein X comprises the IgG-like domain 2 of Flt-1, wherein Y is $Gly_9$ (SEQ ID NO:1), and wherein Z is an IgG Fc region or an IgG CH3 region.

In additional embodiments, the multimerization domain is humanized.

In further embodiments, the soluble protein comprises an amino acid sequence selected from the group consisting of (a) the amino acid sequence depicted in FIGS. 2A-2B (SEQ ID NO:11); (b) the amino acid sequence depicted in FIG. 6 (SEQ ID NO:15); (c) the amino acid sequence depicted in FIG. 8 (SEQ ID NO:17); (d) the amino acid sequence depicted in FIG. 12 (SEQ ID NO:21); and (e) an active variant of (a), (b), (c) or (d) having at least 90% sequence identity thereto.

In embodiments of any of the methods above for treating macular degeneration, the macular degeneration is age-related macular degeneration (AMD), such as wet AMD.

In further embodiments of the methods above, the method comprises reducing intraocular pressure, retinal thickness, subretinal fluids, intraretinal fluids, or the like.

In additional embodiments of any of the methods above, the rAAV virion is derived from an AAV serotype selected from AAV1, AAV2, AAV3, AAV4, AAV5, AAV6, AAV7, AAV8, AAV9, AAVAAVrh8, AAVrh8R, AAV10, AAVrh10, AAV11 or AAV12.

In embodiments of any of the methods above, from about $2\times10^8$ to less than $2\times10^{10}$ rAAV virions are delivered to the eye, such as up to about $2\times10^8$ rAAV virions, or up to about $2\times10^9$ rAAV virions.

These and other embodiments of the subject invention will readily occur to those of skill in the art in view of the disclosure herein.

BRIEF DESCRIPTION OF THE FIGURES

FIG. 1 (SEQ ID NO:10) shows the DNA sequence for a fusion protein including Flt-1, termed "sFLT01 protein" herein.

FIGS. 2A-2B (SEQ ID NO:11) show the amino acid sequence for the sFLT01 protein.

FIG. 3 (Genbank accession no. NM003376) (SEQ ID NO: 12) shows a DNA sequence encoding VEGF.

FIG. 4 (Genbank accession no. CAC19513) (SEQ ID NO:13) shows an amino acid sequence for VEGF.

FIG. 5 (SEQ ID NO:14) shows the DNA sequence for an additional fusion protein including a soluble Flt-1 linked by a $Gly_9$ linker to the VEGF multimerization domain, Ex3.

FIG. 6 (SEQ ID NO:15) shows the amino acid sequence encoded by the DNA sequence of FIG. 5 (SEQ ID NO: 14).

FIG. 7 (SEQ ID NO:16) shows the DNA sequence for an additional fusion protein including a soluble Flt-1 linked by $Gly_9$ to the VEGF multimerization domain, Ex3 and a sequence from the IgG1 CH3 region.

FIG. 8 (SEQ ID NO: 17) shows the amino acid sequence encoded by the DNA sequence of FIG. 7 (SEQ ID NO:16).

FIGS. 9A-9B (Genbank Accession no. NM_002019) (SEQ ID NO: 18) show the DNA sequence encoding for a representative Flt-1 receptor protein.

FIGS. 10A-10E (Genbank accession no. P17948) (SEQ ID NO:19) show the amino acid sequence, of a representative Flt-1 receptor protein.

FIG. 11 (SEQ ID NO:20) shows the DNA sequence for a fusion protein including Flt-1, termed "sFLT02 protein" herein which includes a soluble Flt-1 linked by $Gly_9$ (SEQ ID NO:1) to a sequence from the IgG1 CH3 region.

FIG. 12 (SEQ ID NO:21) shows the amino acid sequence for the sFLT02 protein.

FIG. 13 (Genbank accession no Y14737) (SEQ ID NO:22) shows the nucleotide sequence of the IgG1 lambda heavy chain.

FIGS. 14A-14B (SEQ ID NO:23) shows the amino acid sequence of the IgG1 lambda heavy chain.

FIGS. 15A-15B show the changes from baseline (FIG. 15A) (as measured by optical coherence tomography) in subretinal and intraretinal fluid in a human eye treated with a single dose of $2\times10^8$ rAAV2-sFLT01 (FIG. 15B).

FIGS. 16A-16B show the changes from baseline (FIG. 16A) (as measured by optical coherence tomography) in subretinal and intraretinal fluid in a human eye treated with a single dose of $2\times10^{10}$ rAAV2-sFLT01 (FIG. 16B).

DETAILED DESCRIPTION OF THE INVENTION

The practice of the present invention will employ, unless otherwise indicated, conventional methods of chemistry, biochemistry, recombinant DNA techniques and immunology, within the skill of the art. Such techniques are explained fully in the literature. See, e.g., *Fundamental Virology*, 2nd Edition, vol. I & II (B. N. Fields and D. M. Knipe, eds.); *Handbook of Experimental Immunology*, Vols. I-IV (D. M. Weir and C. C. Blackwell eds., Blackwell Scientific Publications); T. E. Creighton, *Proteins: Structures and Molecular Properties* (W.H. Freeman and Company, 1993); A. L. Lehninger, *Biochemistry* (Worth Publishers, Inc., current addition); *Methods In Enzymology* (S. Colowick and N. Kaplan eds., Academic Press, Inc.); *Molecular Cloning: A Laboratory Manual* (Sambrook et al., 4th ed., Cold Spring Harbor Laboratory Press, Cold Spring Harbor, N. Y., 2012); *Current Protocols in Molecular Biology* (F. M. Ausubel, et al. eds., 2003); the series *Methods in Enzymology* (Academic Press, Inc.); PCR 2: A Practical Approach (M. J. MacPherson, B. D. Hames and G. R. Taylor eds., 1995); *Antibodies, A Laboratory Manual* (Harlow and Lane, eds., 1988); *Culture of Animal Cells: A Manual of Basic Technique and Specialized Applications* (R. I. Freshney, 6th ed., J. Wiley and Sons, 2010); *Oligonucleotide Synthesis* (M. J. Gait, ed., 1984); *Methods in Molecular Biology*, Humana Press; *Cell Biology: A Laboratory Notebook* (J. E. Cellis, ed., Academic Press, 1998); *Introduction to Cell and Tissue Culture* (J. P. Mather and P. E. Roberts, Plenum Press, 1998); *Cell and Tissue Culture: Laboratory Procedures* (A. Doyle, J. B. Griffiths, and D. G. Newell, eds., J. Wiley and Sons, 1993-8); *Gene Transfer Vectors for Mammalian Cells* (J. M. Miller and M. P. Calos, eds., 1987); *PCR: The Polymerase Chain Reaction*, (Mullis et al., eds., 1994); *Current Protocols in Immunology* (J. E. Coligan et al., eds., 1991); *Short Protocols in Molecular Biology* (Ausubel et al., eds., J. Wiley and Sons, 2002); *Immunobiology* (C. A. Janeway et al., 2004); *Antibodies* (P. Finch, 1997); *Antibodies: A Practical Approach* (D. Catty, ed., IRL Press, 1988-1989); *Monoclonal Antibodies: A Practical Approach* (P. Shepherd and C. Dean, eds., Oxford University Press, 2000); *Using Antibodies: A Laboratory Manual* (E. Harlow and D. Lane, Cold Spring Harbor Laboratory Press, 1999); *The Antibodies* (M. Zanetti and J. D. Capra, eds., Harwood Academic Publishers, 1995); and *Cancer: Principles and Practice of Oncology* (V. T. DeVita et al., eds., J. B. Lippincott Company, 2011).

All publications, patents and patent applications, and accession numbers cited herein, whether supra or infra, are hereby incorporated by reference in their entirety.

1. DEFINITIONS

In describing the present invention, the following terms will be employed, and are intended to be defined as indicated below.

It must be noted that, as used in this specification and the appended claims, the singular forms "a", "an" and "the" include plural referents unless the content clearly dictates otherwise. Thus, for example, reference to "an Flt-1 receptor" includes a mixture of two or more such receptors, and the like.

As used herein, "age-related macular degeneration" or "AMD" includes early, intermediate, and advanced AMD and includes both dry AMD such as geographic atrophy and wet AMD, also known as neovascular or exudative AMD. These conditions are described more fully below.

As used herein, "macular edema" refers to the accumulation of fluid within the retina that can cause swelling or thickening of the macular area of the eye. Macular edema develops when blood vessels in the retina leak fluids. Pathophysiology typically involves vascular instability and a breakdown of the blood-retinal barrier. Cystoid macular edema (CME), the most common type observed, involves fluid accumulation in the outer plexiform layer secondary to abnormal perifoveal retinal capillary permeability. The macula does not function properly when it is swollen. Vision loss may be mild to severe, but in some cases, peripheral vision remains.

The terms "Flt-1 protein" and "VEGF-R1 protein" are used interchangeably herein and denote a receptor protein known to bind VEGF. The terms "Flt-1 protein" and "VEGF-R1 protein" or a nucleotide sequence encoding the same, refer to a protein or nucleotide sequence, respectively, that is derived from any Flt-1 protein, regardless of source. The terms, as used herein, refer to molecules capable of binding to and modulating activity of VEGF, as measured in any of the known VEGF activity tests, including those described further herein. The full-length nucleotide sequence and corresponding amino acid sequence of a representative Flt-1 protein are shown in FIGS. 9A-9B (SEQ ID NO:18) and 10A-10E (SEQ ID NO: 19), respectively. However, an Flt-1 protein as defined herein is not limited to the depicted sequences as several such receptors are known and variations in these receptors will occur between species. Non-limiting examples of additional Flt-1 protein sequences can be found in GenBank Accession Nos. AF063657.2; BC039007.1; U01134.1; HD077716.1; X51602.1; EU360600.1; AK300392.1; EU826561.1; EU368830.1; AB385191.1; AK292936.1; AK309901.1; AB209050.1; BC029849.1; BC039007.1; NM_001160031.1; NM_001160030.1; NM_002019.4; NM_001159920.1.

The full-length proteins, with or without the signal sequence, and fragments thereof, as well as proteins with modifications, such as deletions, additions and substitutions (either conservative or non-conservative in nature), to the native sequence, are intended for use herein, so long as the protein maintains the desired activity. Such active variants and fragments are considered VEGF1 receptors in the context of the present invention. Modifications may be deliberate, as through site-directed mutagenesis, or may be accidental, such as through mutations of hosts which produce the proteins or errors due to PCR amplification. Accordingly, active proteins substantially homologous to the parent sequence, e.g., proteins with 70 . . . 80 . . . 85 . . . 90 . . . 95 . . . 98 . . . 99% etc. identity that retain the ability to modulate activity of the corresponding ligand, are contemplated for use herein.

A "native" polypeptide, such as an Flt-1 receptor, refers to a polypeptide having the same amino acid sequence as the corresponding molecule derived from nature. Such native sequences can be isolated from nature or can be produced by recombinant or synthetic means. The term "native" sequence specifically encompasses naturally-occurring truncated or secreted forms of the specific molecule (e.g., an extracellular domain sequence), naturally-occurring variant forms (e.g., alternatively spliced forms) and naturally-occurring allelic variants of the polypeptide. In various embodiments of the invention, the native molecules disclosed herein are mature or full-length native sequences comprising the full-length amino acids sequences shown in the accompanying figures. However, while some of the molecules disclosed in the accompanying figures begin with methionine residues designated as amino acid position 1 in the figures, other methionine residues located either upstream or downstream from amino acid position 1 in the figures may be employed as the starting amino acid residue for the particular molecule. Alternatively, depending on the expression system used, the molecules described herein may lack an N-terminal methionine.

By "extracellular domain" is meant a form of the receptor polypeptide which includes all or a fragment of the extracellular domain and lacks all or a portion of the transmembrane domain and may also be devoid of the cytoplasmic domain. Typically, when used in the present invention, the extracellular domain is essentially free of both the transmembrane and cytoplasmic domains. Ordinarily, an extracellular domain includes less than 10% of such transmembrane and/or cytoplasmic domains, less than 5% of these domains, less than 1%, or less than 0.5% of such domains. Transmembrane domains for the receptors described herein can be identified pursuant to criteria routinely employed in the art for identifying hydrophobic domains, for example, using standard hydropathy plots, such as those calculated using the Kyte-Doolittle technique, Kyte et al., *J. Mol. Biol.* (1982) 157:105-132.

As explained above, the receptors for use with the present invention may or may not include the native signal sequence. The approximate location of the signal peptides of the receptors described herein are described in the specification and in the accompanying figures. It is noted, however, that the C-terminal boundary of a signal peptide may vary, typically by no more than about 5 amino acids on either side of the signal peptide C-terminal boundary as described herein. The C-terminal boundary of the signal peptide may be identified pursuant to criteria routinely employed in the art, such as described in Nielsen et al., *Prot. Eng.* (1997) 10:1-6 and von Heinje et al., *Nucl. Acids. Res.* (1986) 14:4683-4690. Moreover, it is also recognized that, in some cases, cleavage of a signal sequence from a secreted polypeptide is not entirely uniform, resulting in more than one secreted species. These mature polypeptides, where the signal peptide is cleaved within no more than about 5 amino acids on either side of the C-terminal boundary of the signal peptide as identified herein, and the polynucleotides encoding them, are contemplated by the present invention.

By "variant" is meant an active polypeptide as defined herein having at least about 80% amino acid sequence identity with the corresponding full-length native sequence, a polypeptide lacking the signal peptide, an extracellular domain of a polypeptide, with or without a signal peptide, or any other fragment of a full-length polypeptide sequence as disclosed herein. Such polypeptide variants include, for instance, polypeptides wherein one or more amino acid residues are added, or deleted, at the N- and/or C-terminus of the full-length native amino acid sequence. In embodiments, a variant will have at least about 80% amino acid sequence identity, alternatively at least about 81% amino acid sequence identity, alternatively at least about 82% amino acid sequence identity, alternatively at least about 83% amino acid sequence identity, alternatively at least about 84% amino acid sequence identity, alternatively at least about 85% amino acid sequence identity, alternatively at least about 86% amino acid sequence identity, alternatively at least about 87% amino acid sequence identity, alternatively at least about 88% amino acid sequence identity, alternatively at least about 89% amino acid sequence identity, alternatively at least about 90% amino acid sequence identity, alternatively at least about 91% amino acid sequence identity, alternatively at least about 92% amino acid sequence identity, alternatively at least about 93% amino acid sequence identity, alternatively at least about 94% amino acid sequence identity, alternatively at least about 95% amino acid sequence identity, alternatively at least about 96% amino acid sequence identity, alternatively at least about 97% amino acid sequence identity, alternatively at least about 98% amino acid sequence identity and alternatively at least about 99% amino acid sequence identity to the corresponding full-length native sequence. In embodiments, variant polypeptides are at least about 10 amino acids in length, such as at least about 20 amino acids in length, e.g., at least about 30 amino acids in length, alternatively at least about 40 amino acids in length, alternatively at least about 50 amino acids in length, alternatively at least about 60 amino acids in length, alternatively at least about 70 amino acids in length, alternatively at least about 80 amino acids in length, alternatively at least about 90 amino acids in length, alternatively at least about 100 amino acids in length, alternatively at least about 150 amino acids in length, alternatively at least about 200 amino acids in length, alternatively at least about 300 amino acids in length, or more. Variants include substitutions that are conservative or non-conservative in nature. For example, the polypeptide of interest may include up to about 5-10 conservative or non-conservative amino acid substitutions, or even up to about 15-25 or 50 conservative or non-conservative amino acid substitutions, or any number between 5-50, so long as the desired function of the molecule remains intact.

"Homology" refers to the percent identity between two polynucleotide or two polypeptide moieties. Two DNA, or two polypeptide sequences are "substantially homologous" to each other when the sequences exhibit at least about 50%, at least about 75%, at least about 80%-85%, at least about 90%, at least about 95%-98% sequence identity, at least about 99%, or any percent therebetween over a defined length of the molecules. As used herein, substantially homologous also refers to sequences showing complete identity to the specified DNA or polypeptide sequence.

In general, "identity" refers to an exact nucleotide-to-nucleotide or amino acid-to-amino acid correspondence of two polynucleotides or polypeptide sequences, respectively. Methods for determining percent identity are well known in the art. For example, percent identity can be determined by a direct comparison of the sequence information between two molecules by aligning the sequences, counting the exact number of matches between the two aligned sequences, dividing by the length of the shorter sequence, and multiplying the result by 100. Readily available computer programs can be used to aid in the analysis, such as ALIGN, Dayhoff, M. O. in *Atlas of Protein Sequence and Structure* M. O. Dayhoff ed., 5 Suppl. 3:353-358, National Biomedical Research Foundation, Washington, DC, which adapts the local homology algorithm of Smith and Waterman *Advances in Appl. Math.* 2:482-489, 1981 for peptide analysis. Programs for determining nucleotide sequence identity are available in the Wisconsin Sequence Analysis Package, Version 8 (available from Genetics Computer Group, Madison, WI) for example, the BESTFIT, FASTA and GAP programs, which also rely on the Smith and Waterman algorithm. These programs are readily utilized with the default parameters recommended by the manufacturer and described in the Wisconsin Sequence Analysis Package referred to above. For example, percent identity of a particular nucleotide sequence to a reference sequence can be determined using the homology algorithm of Smith and Waterman with a default scoring table and a gap penalty of six nucleotide positions.

Another method of establishing percent identity in the context of the present invention is to use the MPSRCH package of programs copyrighted by the University of Edinburgh, developed by John F. Collins and Shane S.

Sturrok, and distributed by IntelliGenetics, Inc. (Mountain View, CA). From this suite of packages the Smith-Waterman algorithm can be employed where default parameters are used for the scoring table (for example, gap open penalty of 12, gap extension penalty of one, and a gap of six). From the data generated the "Match" value reflects "sequence identity." Other suitable programs for calculating the percent identity or similarity between sequences are generally known in the art, for example, another alignment program is BLAST, used with default parameters. For example, BLASTN and BLASTP can be used using the following default parameters: genetic code=standard; filter=none; strand=both; cutoff=60; expect=10; Matrix=BLOSUM62; Descriptions=50 sequences; sort by=HIGH SCORE; Databases=non-redundant, GenBank+EMBL+DDBJ+ PDB+GenBank CDS translations+Swiss protein+Spupdate+ PIR. Details of these programs are well known in the art.

Alternatively, homology can be determined by hybridization of polynucleotides under conditions which form stable duplexes between homologous regions, followed by digestion with single-stranded-specific nuclease(s), and size determination of the digested fragments. DNA sequences that are substantially homologous can be identified in a Southern hybridization experiment under, for example, stringent conditions, as defined for that particular system. Defining appropriate hybridization conditions is within the skill of the art. See, e.g., Sambrook et al., supra; *DNA Cloning*, supra; *Nucleic Acid Hybridization*, supra.

By the term "degenerate variant" is intended a polynucleotide containing changes in the nucleic acid sequence thereof, that encodes a polypeptide having the same amino acid sequence as the polypeptide encoded by the polynucleotide from which the degenerate variant is derived.

A "coding sequence" or a sequence which "encodes" a selected polypeptide, is a nucleic acid molecule which is transcribed (in the case of DNA) and translated (in the case of mRNA) into a polypeptide when placed under the control of appropriate regulatory sequences. The boundaries of the coding sequence are determined by a start codon at the 5' (amino) terminus and a translation stop codon at the 3' (carboxy) terminus. A transcription termination sequence may be located 3' to the coding sequence.

By "vector" is meant any genetic element, such as a plasmid, phage, transposon, cosmid, chromosome, virus, virion, etc., which is capable of replication when associated with the proper control elements and which can transfer gene sequences to cells. Thus, the term includes cloning and expression vehicles, as well as viral vectors.

By "recombinant vector" is meant a vector that includes a heterologous nucleic acid sequence which is capable of expression in a cell.

A "recombinant viral vector" refers to a recombinant polynucleotide vector comprising one or more heterologous sequences (i.e., nucleic acid sequence not of viral origin). In the case of recombinant AAV vectors, the recombinant nucleic acid is flanked by at least one, in embodiments two, inverted terminal repeat sequences (ITRs).

A "recombinant AAV vector (rAAV vector)" refers to a polynucleotide vector comprising one or more heterologous sequences (i.e., nucleic acid sequence not of AAV origin) that are flanked by at least one, in embodiments two, AAV inverted terminal repeat sequences (ITRs). Such rAAV vectors can be replicated and packaged into infectious viral particles when present in a host cell that has been infected with a suitable helper virus (or that is expressing suitable helper functions) and that is expressing AAV rep and cap gene products (i.e. AAV Rep and Cap proteins). When a rAAV vector is incorporated into a larger polynucleotide (e.g., in a chromosome or in another vector such as a plasmid used for cloning or transfection), then the rAAV vector may be referred to as a "pro-vector" which can be "rescued" by replication and encapsidation in the presence of AAV packaging functions and suitable helper functions. A rAAV vector can be in any of a number of forms, including, but not limited to, plasmids, linear artificial chromosomes, complexed with lipids, encapsulated within liposomes, and encapsidated in a viral particle, particularly an AAV particle. A rAAV vector can be packaged into an AAV virus capsid to generate a "recombinant adeno-associated viral particle (rAAV particle)".

By "recombinant virus" is meant a virus that has been genetically altered, e.g., by the addition or insertion of a heterologous nucleic acid construct into the particle.

The term "transfection" is used to refer to the uptake of foreign DNA by a cell, and a cell has been "transfected" when exogenous DNA has been introduced inside the cell membrane. A number of transfection techniques are generally known in the art. See, e.g., Graham et al. (1973) *Virology*, 52:456, Sambrook et al. (1989) *Molecular Cloning, a laboratory manual*, Cold Spring Harbor Laboratories, New York, Davis et al. (1986) *Basic Methods in Molecular Biology*, Elsevier, and Chu et al. (1981) *Gene* 13:197. Such techniques can be used to introduce one or more exogenous molecules into suitable host cells.

The term "heterologous" as it relates to nucleic acid sequences such as coding sequences and control sequences, denotes sequences that are not normally joined together, and/or are not normally associated with a particular cell. Thus, a "heterologous" region of a nucleic acid construct or a vector is a segment of nucleic acid within or attached to another nucleic acid molecule that is not found in association with the other molecule in nature. For example, a heterologous region of a nucleic acid construct could include a coding sequence flanked by sequences not found in association with the coding sequence in nature. Another example of a heterologous coding sequence is a construct where the coding sequence itself is not found in nature (e.g., synthetic sequences having codons different from the native gene). Similarly, a cell transformed with a construct which is not normally present in the cell would be considered heterologous for purposes of this invention. Allelic variation or naturally occurring mutational events do not give rise to heterologous DNA, as used herein.

A "nucleic acid" sequence refers to a DNA or RNA sequence. The term captures sequences that include any of the known base analogues of DNA and RNA such as, but not limited to 4-acetylcytosine, 8-hydroxy-N6-methyladenosine, aziridinylcytosine, pseudoisocytosine, 5-(carboxyhydroxyl-methyl) uracil, 5-fluorouracil, 5-bromouracil, 5-carboxymethylaminomethyl-2-thiouracil, 5-carboxymethylaminomethyluracil, dihydrouracil, inosine, N6-isopentenyladenine, 1-methyladenine, 1-methylpseudouracil, 1-methylguanine, 1-methylinosine, 2,2-dimethylguanine, 2-methyladenine, 2-methylguanine, 3-methyl-cytosine, 5-methylcytosine, N6-methyladenine, 7-methylguanine, 5-methylaminomethyluracil, 5-methoxyamino-methyl-2-thiouracil, beta-D-mannosylqueosine, 5'-methoxycarbonylmethyluracil, 5-methoxyuracil, 2-methylthio-N6-isopentenyladenine, uracil-5-oxyacetic acid methylester, uracil-5-oxyacetic acid, oxybutoxosine, pseudouracil, queosine, 2-thiocytosine, 5-methyl-2-thiouracil, 2-thiouracil, 4-thiouracil, 5-methyluracil, -uracil-5-oxyacetic acid methylester, uracil-5-oxyacetic acid, pseudouracil, queosine, 2-thiocytosine, and 2,6-diaminopurine.

The term DNA "control sequences" refers collectively to promoter sequences, polyadenylation signals, transcription termination sequences, upstream regulatory domains, origins of replication, internal ribosome entry sites ("IRES"), enhancers, and the like, which collectively provide for the replication, transcription and translation of a coding sequence in a recipient cell. Not all of these control sequences need always be present so long as the selected coding sequence is capable of being replicated, transcribed and translated in an appropriate host cell.

The term "promoter" is used herein in its ordinary sense to refer to a nucleotide region comprising a DNA regulatory sequence, wherein the regulatory sequence is derived from a gene which is capable of binding RNA polymerase and initiating transcription of a downstream (3'-direction) coding sequence. Transcription promoters can include "inducible promoters" (where expression of a polynucleotide sequence operably linked to the promoter is induced by an analyte, cofactor, regulatory protein, etc.), "repressible promoters" (where expression of a polynucleotide sequence operably linked to the promoter is induced by an analyte, cofactor, regulatory protein, etc.), and "constitutive promoters".

"Operably linked" refers to an arrangement of elements wherein the components so described are configured so as to perform their usual function. Thus, control sequences operably linked to a coding sequence are capable of effecting the expression of the coding sequence. The control sequences need not be contiguous with the coding sequence, so long as they function to direct the expression thereof. Thus, for example, intervening untranslated yet transcribed sequences can be present between a promoter sequence and the coding sequence and the promoter sequence can still be considered "operably linked" to the coding sequence.

The term "multimerization domain" as used in the context of the present invention, is meant to refer to the portion of the molecule to which the particular Flt-1 receptor is joined, either directly or through a "linker domain." The multimerization domain can be a polypeptide domain which facilitates the interaction of two or more multimerization domains and/or sFlt-1 receptor domains.

For example, a multimerization domain may be an immunoglobulin sequence, such as an immunoglobulin constant region, a leucine zipper, a hydrophobic region, a hydrophilic region, a polypeptide comprising a free thiol which forms an intermolecular disulfide bond between two or more multimerization domains or, for example a "protuberance-into-cavity" domain described in, for example, U.S. Pat. No. 5,731,168, incorporated herein by reference in its entirety. Protuberances are constructed by, e.g., replacing small amino acid side chains from the interface of a first polypeptide with a larger side chain (for example a tyrosine or tryptophan). Compensatory cavities of identical or similar size to the protuberances are optionally created on the interface of a second polypeptide by replacing large amino acid side chains with smaller ones (for example alanine or threonine).

Therefore, in aspects, the multimerization domain provides that portion of the molecule which promotes or allows the formation of dimers, trimers, and the like from monomeric domains. In aspects, multimerization domains are immunoglobulin constant region domains.

"Immunoglobulins" (Igs) are proteins, generally glycoproteins, that are antibodies or antibody-like molecules which lack antigen specificity. Immunoglobulins are usually heterotetrameric glycoproteins of about 150,000 Daltons, composed of two identical light (L) chains and two identical heavy (H) chains. Each light chain is linked to a heavy chain by one covalent disulfide bond, while the number of disulfide linkages varies between the heavy chains of different immunoglobulin isotypes. Each heavy and light chain also has regularly spaced intrachain disulfide bridges. Each heavy chain has an amino (N) terminal variable domain (VH) followed by carboxy (C) terminal constant domains. Each light chain has a variable N-terminal domain (VL) and a C-terminal constant domain; the constant domain of the light chain (CL) is aligned with the first constant domain (CH1) of the heavy chain, and the light chain variable domain is aligned with the variable domain of the heavy chain. According to the domain definition of immunoglobulin polypeptide chains, light (L) chains have two conformationally similar domains VL and CL; and heavy chains have four domains (VH, CH1, CH2, and CH3) each of which has one intrachain disulfide bridge.

Depending on the amino acid sequence of the constant (C) domain of the heavy chains, immunoglobulins can be assigned to different classes. There are five major classes of immunoglobulins: IgA, IgD, IgE, IgG, and IgM. The immunoglobulin class can be further divided into subclasses (isotypes), e.g., IgG1, IgG2, IgG3, IgG4, IgG5, IgA1, and IgA2. Each heavy chain has at one end a variable domain (VH) followed by a number of constant domains. The light chains of antibodies from any vertebrate species can be assigned to one of two distinct types called kappa (κ) or lambda (λ), based upon the amino acid sequence of their constant domains.

The term "Fc region" refers to the C-terminal (constant) region of an immunoglobulin heavy chain. The Fc region may be a native sequence Fc region or a variant Fc region. Although the boundaries of the Fc region of an immunoglobulin heavy chain may vary, the human IgG heavy chain Fc region may stretch from an amino acid residue at position Cys226, or from Pro230, to the carboxyl-terminus of a full-length human IgG1. The Fc region of an immunoglobulin generally comprises two constant domains, CH2 and CH3. The last residue, lysine, in the heavy chain of IgG1 can but need not be present as the terminal residue in the Fc in the mature protein. One human IgG1 heavy chain Fc region is defined in NCBI accession number P01857.

The "CH2 domain" of a human IgG1 Fc region (also referred to as "Cγ2" domain) usually extends from about amino acid 231 to about amino acid 340 of a full-length IgG, but from Pro111 to Lys223 of the human IgG heavy chain Fc region.

The "CH3 domain" comprises the residues C-terminal to a CH2 domain in a human IgG1 Fc region (i.e. from about amino acid residue 341 to about amino acid residue 447 of a full-length IgG, but from Gly224 to Lys330 of a human IgG heavy chain Fc region).

The "hinge region" is generally defined as stretching from Glu216 to Pro230 of a full-length human IgG1 (Burton, *Molec. immunol.* (1985) 22:161-206), but from Glu99 to Pro110 of a human IgG heavy chain Fc region. Hinge regions of other IgG isotypes may be aligned with the IgG1 sequence by placing the first and last cysteine residues forming inter-heavy chain S—S bonds in the same positions.

The "lower hinge region" of an Fc region is normally defined as the stretch of residues immediately C-terminal to the hinge region, i.e. residues 233 to 239 of a full-length human IgG1.

A "native Fc region sequence" comprises an amino acid sequence identical to the amino acid sequence of an Fc region found in nature. Native human Fc region sequences include but are not limited to the human IgG1 Fc region (non-A and A allotypes); the human IgG2 Fc region; the human IgG3 Fc region; and the human IgG4 Fc region as well as naturally occurring variants thereof. Native Fc regions from other species, such as murine Fc regions, are also well known.

A "functional Fc region" possesses an "effector function" of a native Fc region. Exemplary "effector functions" include C1q binding; complement-dependent cytotoxicity; Fc receptor binding; antibody-dependent cell-mediated cytotoxicity (ADCC); phagocytosis; down regulation of cell surface receptors (e.g., B cell receptor; BCR), etc. Such effector functions typically require the Fc region to be combined with a binding domain (i.e., a VEGF ligand herein) and can be assessed using various assays known in the art. The Fc region can be a human Fc region, e.g. a native sequence human Fc region such as a human IgG1 (A and non-A allotypes), IgG2, IgG3 or IgG4 Fc region. Such sequences are known. See, e.g., PCT Publication NO. WO01/02440, incorporated herein by reference in its entirety.

The term "transgene" refers to a polynucleotide that is introduced into a cell and is capable of being transcribed into RNA and optionally, translated and/or expressed under appropriate conditions. In aspects, it confers a desired property to a cell into which it was introduced, or otherwise leads to a desired therapeutic or diagnostic outcome (e.g., transcribed into a molecule that confers a desired therapeutic or diagnostic outcome).

The terms "genome particles (gp)," "genome equivalents," or "genome copies" as used in reference to a viral titer, refer to the number of virions containing the recombinant AAV DNA genome, regardless of infectivity or functionality. The number of genome particles in a particular vector preparation can be measured by procedures such as described in the Examples herein, or for example, in Clark et al. (1999) *Hum. Gene Ther.,* 10:1031-1039; Veldwijk et al. (2002) *Mol. Ther.,* 6:272-278.

The terms "infection unit (iu)," "infectious particle," or "replication unit," as used in reference to a viral titer, refer to the number of infectious and replication-competent recombinant AAV vector particles as measured by the infectious center assay, also known as replication center assay, as described, for example, in McLaughlin et al. (1988) *J. Virol.,* 62:1963-1973.

The term "transducing unit (tu)" as used in reference to a viral titer, refers to the number of infectious recombinant AAV vector particles that result in the production of a functional transgene product as measured in functional assays such as described in Examples herein, or for example, in Xiao et al. (1997) *Exp. Neurobiol.,* 144:113-124; or in Fisher el al. (1996) *J. Virol.,* 70:520-532 (LFU assay).

An "inverted terminal repeat" or "ITR" sequence is a term well understood in the art and refers to relatively short sequences found at the termini of viral genomes which are in opposite orientation.

An "AAV inverted terminal repeat (ITR)" sequence, a term well-understood in the art, is an approximately 145-nucleotide sequence that is present at both termini of the native single-stranded AAV genome. The outermost 125 nucleotides of the ITR can be present in either of two alternative orientations, leading to heterogeneity between different AAV genomes and between the two ends of a single AAV genome. The outermost 125 nucleotides also contains several shorter regions of self-complementarity (designated A, A', B, B', C, C' and D regions), allowing intrastrand base-pairing to occur within this portion of the ITR.

A "terminal resolution sequence" or "trs" is a sequence in the D region of the AAV ITR that is cleaved by AAV rep proteins during viral DNA replication. A mutant terminal resolution sequence is refractory to cleavage by AAV rep proteins.

A "helper virus" for AAV refers to a virus that allows AAV (which is a defective parvovirus) to be replicated and packaged by a host cell. A helper virus provides "helper functions" which allow for the replication of AAV. A number of such helper viruses have been identified, including adenoviruses, herpesviruses and poxviruses such as vaccinia. The adenoviruses encompass a number of different subgroups, although Adenovirus type 5 of subgroup C (Ad5) is most commonly used. Numerous adenoviruses of human, non-human mammalian and avian origin are known and are available from depositories such as the ATCC. Viruses of the herpes family, which are also available from depositories such as ATCC, include, for example, herpes simplex viruses (HSV), Epstein-Barr viruses (EBV), cytomegaloviruses (CMV) and pseudorabies viruses (PRV). Examples of adenovirus helper functions for the replication of AAV include E1A functions, E1B functions, E2A functions, VA functions and E4orf6 functions.

A preparation of rAAV is said to be "substantially free" of helper virus if the ratio of infectious AAV particles to infectious helper virus particles is at least about $10^2$:1; at least about $10^4$:1, at least about $10^6$:1; or at least about $10^8$:1. Preparations can also be free of equivalent amounts of helper virus proteins (i.e., proteins as would be present as a result of such a level of helper virus if the helper virus particle impurities noted above were present in disrupted form). Viral and/or cellular protein contamination can generally be observed as the presence of Coomassie staining bands on SDS gels (e.g., the appearance of bands other than those corresponding to the AAV capsid proteins VP1, VP2 and VP3).

The term "modulate" means to affect (e.g., either upregulate, downregulate or otherwise control) the level of a signaling pathway. Cellular processes under the control of signal transduction include, but are not limited to, transcription of specific genes, normal cellular functions, such as metabolism, proliferation, differentiation, adhesion, apoptosis and survival, as well as abnormal processes, such as transformation, blocking of differentiation and metastasis.

"Active" or "activity" for purposes of the present invention refers to forms of an Flt-1 receptor polypeptide which retain a biological activity (either inhibitory or stimulatory) of the corresponding native or naturally occurring polypeptide. The activity may be greater than, equal to, or less than that observed with the corresponding native or naturally occurring polypeptide. As explained above, an activity includes modulating the level of the VEGF signaling pathways in a subject suffering from macular degeneration.

By "isolated" when referring to a nucleotide sequence, is meant that the indicated molecule is present in the substantial absence of other biological macromolecules of the same type. Thus, an "isolated nucleic acid molecule which encodes a particular polypeptide" refers to a nucleic acid molecule which is substantially free of other nucleic acid molecules that do not encode the subject polypeptide; however, the molecule may include some additional bases or moieties which do not deleteriously affect the basic characteristics of the composition.

For the purpose of describing the relative position of nucleotide sequences in a particular nucleic acid molecule throughout the instant application, such as when a particular nucleotide sequence is described as being situated "upstream," "downstream," "3-prime (3')" or "5-prime (5')" relative to another sequence, it is to be understood that it is the position of the sequences in the "sense" or "coding" strand of a DNA molecule that is being referred to as is conventional in the art.

The term "purified" refers to isolation of a substance (compound, polynucleotide, protein, polypeptide, polypeptide composition) such that the substance of interest comprises the majority percent of the sample in which it resides. Typically in a sample a substantially purified component comprises 50%, 80%-85%, 90-99%, such as at least 90%, 91%, 92%, 93%, 94%, 95%, 96%, 97%, 98%, 99% of the sample. Techniques for purifying polynucleotides and polypeptides of interest are well-known in the art and include, for example, ion-exchange chromatography, affinity chromatography and sedimentation according to density.

The terms "subject", "individual" or "patient" are used interchangeably herein and refer to a vertebrate, e.g., a mammal. Mammals include, but are not limited to, murines, rodents, simians, humans, farm animals, sport animals and pets.

The terms "effective amount" or "therapeutically effective amount" of a composition or agent, as provided herein, refer to a sufficient amount of the composition or agent to provide the desired response, such as modulating VEGF in the eye, or reducing, preventing or retarding progression of the physical changes in the eye related to macular degeneration, or reducing, preventing or retarding progression of the symptoms manifested therefrom (e.g., accumulation of drusen, abnormal blood vessel growth in the eye, abnormal fluid, blood and protein leakage in the eye, and the like). The exact amount required will vary from subject to subject, depending on the species, age, and general condition of the subject, the severity of the condition being treated, and the particular macromolecule of interest, mode of administration, and the like. An appropriate "effective" amount in any individual case may be determined by one of ordinary skill in the art using routine experimentation. See, e.g., Lim, J. (2012) Age-Related Macular Degeneration, CRC Press, Boca Raton; Kanski et al. (2011) Clinical Ophthalmology: A Systematic Approach, Elsevier Saunders "Treatment" or "treating" macular degeneration includes: (1) preventing the disease, i.e., preventing the development of the disease or causing the disease to occur with less intensity in a subject that may be exposed to or predisposed to the disease but does not yet experience or display symptoms of the disease, (2) inhibiting the disease, i.e., arresting the development, preventing or retarding progression, or reversing the disease state (3) relieving symptoms of the disease i.e., decreasing the number of symptoms experienced by the subject, or (4) reducing, preventing or retarding progression of the physical changes in the eye related to macular degeneration. Treatment includes, but is not limited to, reduction in accumulation of drusen, abnormal blood vessel growth in the eye, abnormal fluid, blood and protein leakage in the eye, and the like. Treatment can be detected, for example, by monitoring the rate and amount of loss of photoreceptors (rods and cones) in the central part of the eye, by monitoring the rate of vision loss and the best corrected visual acuity (BCVA), by monitoring the rate and amount of atrophy of the retinal pigment epithelial layer (and the choriocapillaris) below the retina, by monitoring the amount of drusen (cellular debris) that accumulates between the retina and the choroid, by monitoring abnormal blood vessel growth in the eye, and monitoring the amount of abnormal fluid, blood and protein leakage in the eye.

Ranges provided herein are understood to be shorthand for all of the values within the range. For example, a range of 1 to 50 is understood to include any number, combination of numbers, or sub-range from the group consisting of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50.

Unless defined otherwise, all technical and scientific terms used herein have the same meanings as commonly understood by one of ordinary skill in the art to which this disclosure belongs. Although any methods and materials similar or equivalent to those described herein can be used in the practice or testing of the present invention, exemplary methods, devices, and materials are now described. All technical and patent publications cited herein are incorporated herein by reference in their entirety. Nothing herein is to be construed as an admission that the invention is not entitled to antedate such disclosure by virtue of prior invention.

It is to be understood, although not always explicitly stated that all numerical designations are preceded by the term "about." It also is to be understood, although not always explicitly stated, that the reagents described herein are merely exemplary and that equivalents of such are known in the art.

2. MODES OF CARRYING OUT THE INVENTION

Before describing the present invention in detail, it is to be understood that this invention is not limited to particular formulations or process parameters as such may, of course, vary. It is also to be understood that the terminology used herein is for the purpose of describing particular embodiments of the invention only, and is not intended to be limiting.

It should be appreciated that the invention should not be construed to be limited to the examples described herein. Methods and materials similar or equivalent to those described herein can be used in the practice of the present invention, and the invention should be construed to include any and all applications provided herein and all equivalent variations within the skill of the ordinary artisan.

Central to the present invention is the discovery that gene delivery to the human eye, using constructs encoding a soluble protein comprising at least one domain of VEGFR-1 (Flt-1) capable of modulating VEGF activity (also termed "a soluble Flt-1 protein" or "soluble Flt-1 receptor" herein), serves to modulate the corresponding signaling pathways, and significantly reduces symptoms of macular degeneration. In aspects, the invention involves administering doses lower than that previously reported as efficacious in non-human primates. See, e.g., Lukason et al., *Molecular Ther.* (2011) 19:260-265. Thus, administration of soluble Flt-1 proteins provides a useful technique for treating and preventing macular degeneration in humans. The methods described herein can be used alone or in combination with traditional therapies (e.g., PDGF antagonists, PDGF-R antagonists, complement pathway inhibitors).

In embodiments, the soluble protein used in the present methods is a fusion protein that includes at least one Flt-1 domain, or an active portion thereof, linked to a multimerization domain, either directly or via a linker, such as linked to an immunoglobulin constant region. In some embodiments, the soluble protein includes domain 2 or portions and/or extensions thereof, linked to a multimerization domain, either directly or via a linker. Linkers can include sequences of amino acids 5-25 residues in length. Representative multimerization domains include, but are not limited to, an IgG Fc region, or portions thereof, and an IgG CH3 region, or portions thereof.

The receptor can be present either upstream or downstream from the immunoglobulin region. Typically, the fusion protein is produced in multimeric form when expressed in vivo. The multimer can be a dimer, trimer, etc.

In order to further an understanding of the invention, a more detailed discussion is provided below regarding macular degeneration, Flt-1 receptors, receptor-immunoglobulin fusions, as well as various gene delivery methods for use with the present invention.

Macular Degeneration

As explained above, the present invention makes use of Flt-1 receptors in order to inhibit VEGF activity and thereby treat, prevent, alleviate, and/or prevent or retard progression of macular degeneration. In certain embodiments, an individual at risk of developing macular degeneration is administered an amount effective to delay or prevent the disease.

At least three forms of macular degeneration have been identified. (1) Atrophic, non-exudative-dry form of AMD, also known as central geographic atrophy, occurs in approximately 85 to 90% of patients with macular degeneration. The dry form of AMD typically results from atrophy of the retinal pigment epithelial layer (and presumably the choriocapillaris) below the retina and causes vision loss through loss of photoreceptors (rods and cones) in the central part of the eye. There can additionally be cellular debris (called drusen) accumulating between the retina and the choroid. (2) The wet form of AMD, also known as neovascular or exudative AMD, represents the more severe form of AMD. The wet form of AMD is typically characterized by abnormal blood vessel growth in the eye, wherein the faulty blood vessels leak fluids and blood. It may cause vision loss due to abnormal blood vessel growth from the choriocapillaries through Bruch's membrane into the subretinal space, ultimately leading to blood and protein leakage below the macula. Bleeding, leaking, and scarring from these blood vessels eventually causes irreversible damage to the photoreceptors, scar formation in the macula and relatively rapid vision loss if left untreated. (3) Pigment epithelial detachment associated (PED) ARMD occurs in less than 5% of patients and results in retinal detachment.

Flt-1 Molecules and Fusions

The present invention makes use of soluble forms of Flt-1 receptors to modulate VEGF activity and thereby treat, prevent, alleviate, and/or prevent or retard progression of macular degeneration. In aspects, Flt-1 receptor-immunoglobulin fusions are used in the present invention. The native molecule, as well as active fragments and analogs thereof that retain the ability to bind VEGF and modulate ligand activity, as measured in any of the known various assays and animal models including those described further herein, are suitable for use with the present invention. For example, VEGF binding assays are known and described in Pechan et al., Gene Ther (2009) 16:10-16) and U.S. Pat. No. 7,928,072, incorporated herein by reference in its entirety.

The amino acid sequence and nucleotide sequence encoding for a representative full-length human Flt-1 receptor is shown in FIGS. 9A-9B (SEQ ID NO: 18) and 10A-10E (SEQ ID NO: 19), respectively. The Flt-1 receptor protein has an extracellular portion found at positions 27-758 of FIGS. 10A-10E which comprises seven Ig-like domains. Amino acids 1-26 of FIGS. 10A-10E represent a signal sequence. The seven Ig-like domains are located at residue numbers 32-123, 151-214, 230-327, 335-421, 428-553, 556-654, and 661-747, respectively, of FIGS. 10A-10E. This Flt-1 protein is encoded by the DNA sequence shown at Genbank accession no. NM_002019 (FIGS. 9A-9B, SEQ ID NO: 18).

In embodiments, the Flt-1 molecules used in the present invention include an Flt-1 Ig-like domain 2. Any portion of the Flt-1 molecule can be used, so long as the molecule retains the ability to modulate VEGF activity; however, in some embodiments, the Flt-1 molecule can lack all or a portion of domains 1 and 3. Flt-1 domain 2 is found at positions 151-214 of FIGS. 10A-10E. However, the Flt-1 component of the present fusions can include, for example, any sequence of amino acids found between domains 1 and 2, domains 2 and 3, etc. of Flt-1, e.g., any sequence of amino acids corresponding to an amino acid sequence found between positions 124-229 of FIGS. 10A-10E, such as an amino acid sequence beginning at any one of positions 124, 125, 126, 127, 128, 129, 130, 131, 132, 133, 134, 135, 136, 136 . . . 140 . . . 145 . . . 150, 151, 152, 153, 154, 155 . . . 160 . . . 165 . . . 170, up to amino acid 210, 211, 212, 213, 214, 215, 216, 217, 218, 219, 220, 221, 222, 223, 224, 225, 226, 227, 228, 229, etc. of FIGS. 10A-10E. In embodiments, the Flt-1 component of the fusions described herein includes amino acids 132-226 of FIGS. 10A-10E. The Flt-1 component can also include portions of any of the other domains present in the extracellular region of the Flt-1 protein, including portions of domains 1 and 3, or even deletions of domain 2, so long as the desired activity is maintained. In certain embodiments, domains 1 and 3 are not present in their entireties.

Moreover, the soluble proteins of the invention can include additional polypeptide/moieties. For example, the soluble proteins of the invention can include all or portions of VEGFR2, such as any of the various domains of VEGFR2, including without limitation domains 1, 2 and/or 3 of VEGFR2, as well as constructs with one or more, or portions of these domains deleted. See, e.g. Holash et al., Proc. Natl. Acad. Sci. USA (2002) 99:11393-11398 and U.S. Pat. No. 7,378,095, incorporated herein by reference in its entirety, for descriptions of VEGFR2 fusions and hybrid fusions of domains from VEGFR2 with Flt-1 domains.

Particular fusions of the present invention include an Flt-1 Ig-like domain 2 with a sequence as represented at positions 24-118 of FIGS. 2A-2B, 6, 8 and 12, which corresponds to amino acids 132-226 of FIGS. 10A-10E, or a portion or variant of the sequence that retains the ability to modulate VEGF. In some embodiments, the fusion proteins also bind to placental growth factor.

A signal sequence may also be present and linked to the N-terminus of the soluble protein (e.g., Flt-1 Ig-like domain 2 sequence). The signal sequence may include all of a portion of the native signal sequence, such as all or part of the sequence found at positions 1-26 of FIGS. 10A-10E. In the fusions shown in FIGS. 2A-2B (SEQ ID NO: II), 6 (SEQ ID NO: 15), 8 (SEQ ID NO: 17) and 12 (SEQ ID NO:21), a signal sequence of 23 amino acids (amino acids 1-23 of FIGS. 2A-2B, 6, 8 and 12) is present. This sequence is homologous to the native signal sequence of the Flt-1 protein. Alternatively, a heterologous signal sequence can be present. Numerous such sequences are known in the art and will find use herein. Non-limiting examples of signal peptides include those present in secreted proteins such as human growth hormone, bovine growth hormone, bovine proalbumin, human proinsulin, human interferon-γ, human α-fibrinogen, human IgG heavy chain, rat amylase, murine α-fetoprotein, chicken lysozyme and Zea mays rein protein 22.1, brain derived neurotrophic factor, insulin growth factor 1 and β-glucoronidase.

As explained above, the Flt-1 portion of the fusion is linked to a multimerization domain either directly or via a linker moiety. A multimerization domain may be an immunoglobulin sequence, such as an immunoglobulin constant region, a leucine zipper, a hydrophobic region, a hydrophilic region, a polypeptide comprising a free thiol which forms an intermolecular disulfide bond between two or more multimerization domains or, for example a "protuberance-into-cavity" domain described in, for example, U.S. Pat. No. 5,731,168, incorporated herein by reference in its entirety. The multimerization domain provides that portion of the molecule which promotes or allows the formation of dimers, trimers, and the like from monomeric domains.

Multimerization domains will cause at least 5%, 10%, 20%, 30%, 40%, 50%, 60%, 75%, 80%, 85%, 90%, or 95% of the monomeric fusion proteins to migrate on a non-denaturing polyacrylamide gel at a rate appropriate for a multimer. Glycosylation can affect the migration of a protein in a gel. Although particular sequences are shown here, variants such as allelic variants can be used as well. Typically such variants will have at least 85%, 90%, 95%, 97%, 98%, or 99% identity with the disclosed sequence.

Multimerization can be assayed, for example, using reducing and non-reducing gels. Multimerization can also be assayed by detection of increased binding affinity of a protein for its ligand/receptor. BiaCore™ surface plasmon resonance assays can be used in this regard. These assays detect changes in mass by measuring changes in refractive index in an aqueous layer close to a sensor chip surface. Any method known in the art can be used to detect multimerization.

In aspects, multimerization domains are derived from immunoglobulin molecules, including but not limited to regions from the heavy chain, immunoglobulin constant region domains, Fc regions, and the like. Sequences of the Fc portion of IgG1 or IgG2 lambda heavy chain can be used, for example, CH3 alone, such as amino acids 371-477 of FIGS. 14A-14B, or portions or extensions of CH3, or both of CH2 and CH3 domains, such as amino acids 247-477 of FIG. 14A-14B, or portions or extensions thereof.

Methods for obtaining portions of immunoglobulin molecule are well known in the art. For example, the Fc portion of an immunoglobulin molecule can be obtained by cleavage of whole antibody molecules with the enzyme papain. Other means can also be used to obtain these portions. For the IgG1 lambda heavy chain protein sequence, see, e.g, Genbank accession no Y14737 and FIGS. 13 (SEQ ID NO:22) and 14A-14B (SEQ ID NO:23), showing the DNA and amino acid sequence, respectively. Other Fc regions can be used, for example, from other IgG types and from IgA, IgM, IgD, or IgE antibodies. The multimerization region of VEGF can also be used. A DNA sequence encoding VEGF is shown at Genbank accession no. NM003376 and FIG. 3 (SEQ ID NO:12). An amino acid sequence of VEGF is shown at Genbank accession no. CAC19513 and FIG. 4 (SEQ ID NO: 13). The multimerization region of VEGF, encoded by VEGF exon 3 (VEGF Ex3), is at about amino acid residues 75-88 of VEGF protein (FIG. 4) and includes the amino acid sequence Pro-Ser-Cys-Val-Pro-Leu-Met-Arg-Cys-Gly-Gly-Cys-Cys-Asn (SEQ ID NO:7).

Although many different linker moieties may be used and may be functionally equivalent, in aspects, a linker of 9 glycine residues is employed in the present invention. Other linkers can be comprised of for example 5-100 amino acid residues, 5-75 amino acid residues, 5-50 amino acid residues, 5-25 amino acid residues, 5-20 amino acid residues, 5-15 amino acid residues, 5-10 amino acid residues, or 5-9 amino acid residues. Examples of useful linkers include:

$gly_9$; (SEQ ID NO: 1)

$glu_9$; (SEQ ID NO: 2)

$ser_9$; (SEQ ID NO: 3)

$gly_5cyspro_2cys$; (SEQ ID NO: 4)

$(gly_4ser)_3$; (SEQ ID NO: 5)

SerCysValProLeuMetArgCysGlyGlyCysCysAsn; (SEQ ID NO: 6)

ProSerCysValProLeuMetArgCysGlyGlyCysCysAsn; (SEQ ID NO: 7)

GlyAspLeuIleTyrArgAsnGlnLys; (SEQ ID NO: 8)
and $Gly_9$ProSerCysValProLeuMetArgCysGlyGlyCysCysAsn. (SEQ ID NO: 9)

Other polypeptide linkers which can be used include a polyglycine of different lengths, including of 5, 7, or 30 residues. Additionally, other portions of Flt-1 can be used as a linker, for example domain 3 of Flt-1 or portions or extensions thereof, such as amino acids 235-336 of FIGS. 10A-10E.

Linker moieties can also be made from other polymers, such as polyethylene glycol. Such linkers can have from 10 to 1000, 10-500, 10-250, 10-100, or 10-50 ethylene glycol monomer units. Suitable polymers should be of a size similar to the size occupied by the appropriate range of amino acid residues. A typical sized polymer would provide a spacing of from about 10-25 angstroms.

Exemplary forms of the fusion protein used in the invention are shown in FIGS. 2A-2B (SEQ ID NO: 11), 6 (SEQ ID NO:15), 8 (SEQ ID NO:17) and 12 (SEQ ID NO:21), encoded by the polynucleotide sequences shown in FIGS. 1 (SEQ ID NO:10), 5 (SEQ ID NO: 14), 7 (SEQ ID NO:16) and 11 (SEQ ID NO:20), respectively. Such sequences are described in U.S. Pat. No. 7,928,072, incorporated herein by reference in its entirety.

The fusion shown in FIGS. 2A-2B (SEQ ID NO: 11), termed "sFLT01 protein" herein, includes in N-terminus to C-terminus order, a signal sequence found at positions 1-23 of FIGS. 2A-2B; an Flt-1 Ig-like domain 2 plus extensions of this domain, found at positions 24-118 of FIGS. 2A-2B (corresponding to amino acids 132-226 of FIGS. 10A-10E); a sequence of nine glycines, found at positions 119-127 of FIGS. 2A-2B; and IgG1-Fc CH2/CH3 residues at positions 128-358 of FIGS. 2A-2B.

The fusion shown in FIG. 6 (SEQ ID NO:15) includes in N-terminus to C-terminus order, a signal sequence found at positions 1-23 of FIG. 6; an Flt-1 Ig-like domain 2 plus extensions of this domain, found at positions 24-118 of FIG. 6 (corresponding to amino acids 132-226 of FIGS. 10A-10E); a sequence of nine glycines, found at positions 119-127 of FIG. 6; and the VEGF multimerization domain at positions 128-141 of FIG. 6.

FIG. 8 (SEQ ID NO: 17) includes in N-terminus to C-terminus order, a signal sequence found at positions 1-23 of FIG. 8; an Flt-1 Ig-like domain 2 plus extensions of this domain, found at positions 24-118 of FIG. 8 (corresponding to amino acids 132-226 of FIGS. 10A-10E); a sequence of nine glycines, found at positions 119-127 of FIG. 8; the VEGF multimerization domain at positions 128-141 of FIG. 8; and a sequence from the IgG CH2/CH3 region at positions 142-247 of FIG. 8.

FIG. 12 (SEQ ID NO:21) shows the fusion termed "sFLT02" herein which includes in N-terminus to C-terminus order, a signal sequence found at positions 1-23 of FIG. 12; an Flt-1 Ig-like domain 2 plus extensions of this domain, found at positions 24-118 of FIG. 12 (corresponding to amino acids 132-226 of FIGS. 10A-10E); a sequence of nine glycines, found at positions 119-127 of FIG. 12; and IgG CH2/CH3 residues found at positions 128-233 of FIG. 12.

Although particular sequences are discussed here, variants such as allelic variants can be used as well. Typically such variants will have at least 85%, 90%, 95%, 97%, 98%, or 99% identity with the disclosed sequence and retain the functions described herein, including multimerization and the ability to bind VEFG.

Polynucleotides encoding the Flt-1 receptors and fusions thereof for use with the present invention can be made using standard techniques of molecular biology. For example, polynucleotide sequences coding for the above-described molecules can be obtained using recombinant methods, such as by screening cDNA and genomic libraries from cells expressing the gene, or by deriving the gene from a vector known to include the same. The gene of interest can also be produced synthetically, rather than cloned, based on the known sequences. The molecules can be designed with appropriate codons for the particular sequence. The complete sequence is then assembled from overlapping oligonucleotides prepared by standard methods and assembled into a complete coding sequence. See, e.g., Edge, *Nature* (1981) 292:756; Nambair et al., *Science* (1984) 223:1299; and Jay et al., *J. Biol. Chem.* (1984) 259:6311.

Thus, particular nucleotide sequences can be obtained from vectors harboring the desired sequences or synthesized completely or in part using various oligonucleotide synthesis techniques known in the art, such as site-directed mutagenesis and polymerase chain reaction (PCR) techniques where appropriate. See, e.g., Sambrook, supra. One method of obtaining nucleotide sequences encoding the desired sequences is by annealing complementary sets of overlapping synthetic oligonucleotides produced in a conventional, automated polynucleotide synthesizer, followed by ligation with an appropriate DNA ligase and amplification of the ligated nucleotide sequence via PCR. See, e.g., Jayaraman et al., *Proc. Natl. Acad. Sci. USA* (1991) 88:4084-4088. Additionally, oligonucleotide-directed synthesis (Jones et al., *Nature* (1986) 54:75-82), oligonucleotide directed mutagenesis of preexisting nucleotide regions (Riechmann et al., *Nature* (1988) 332:323-327 and Verhoeyen et al., *Science* (1988) 239:1534-1536), and enzymatic filling-in of gapped oligonucleotides using $T_4$ DNA polymerase (Queen et al., *Proc. Natl. Acad. Sci. USA* (1989) 86:10029-10033) can be used to provide molecules for use in the subject methods.

Once obtained, the polynucleotide encoding the receptor can be linked to a multimerization domain either directly or via a linker moiety, as described above. The constructs can be delivered to a subject using recombinant viral vectors as described further below.

Gene Delivery Techniques

The sFlt-1 constructs, such as those described above, can be delivered to the subject in question using any of several gene-delivery techniques. Several methods for gene delivery are known in the art. Generally, recombinant vectors are formulated into pharmaceutical compositions as described below and introduced into the subject using either in vivo or ex vivo transduction techniques. If transduced ex vivo, the desired recipient cell will be removed from the subject, transduced with the recombinant vector and reintroduced into the subject. Alternatively, syngeneic or xenogeneic cells can be used where those cells will not generate an inappropriate immune response in the subject.

Suitable methods for the delivery and introduction of transduced cells into a subject have been described. For example, cells can be transduced in vitro by combining recombinant vectors with the subject's cells e.g., in appropriate media, and screening for those cells harboring the DNA of interest using conventional techniques such as Southern blots and/or PCR, or by using selectable markers.

A number of viral based systems have been developed for gene transfer into mammalian cells either in vivo or ex vivo. For example, retroviruses provide a convenient platform for gene delivery systems. A selected gene can be inserted into a vector and packaged in retroviral particles using techniques known in the art. The recombinant virus can then be isolated and delivered to cells of the subject either in vivo or ex vivo. A number of retroviral systems have been described. See, e.g., U.S. Pat. No. 5,219,740; Miller and Rosman, *BioTechniques* (1989) 7:980-990; Miller, A. D., *Human Gene Therapy* (1990) 1:5-14; Scarpa et al., *Virology* (1991) 180:849-852; Burns et al., *Proc. Natl. Acad. Sci. USA* (1993) 90:8033-8037; and Boris-Lawrie and Temin, *Cur. Opin. Genet. Develop.* (1993) 3:102-109. Replication-defective murine retroviral vectors are widely utilized gene transfer vectors. Murine leukemia retroviruses include a single strand RNA complexed with a nuclear core protein and polymerase (pol) enzymes encased by a protein core (gag) and surrounded by a glycoprotein envelope (env) that determines host range. The genomic structure of retroviruses include gag, pol, and env genes enclosed at the 5' and 3' long terminal repeats (LTRs). Retroviral vector systems exploit the fact that a minimal vector containing the 5' and 3' LTRs and the packaging signal are sufficient to allow vector packaging and infection and integration into target cells provided that the viral structural proteins are supplied in trans in the packaging cell line. Fundamental advantages of retroviral vectors for gene transfer include efficient infection and gene expression in most cell types, precise single copy vector integration into target cell chromosomal DNA and ease of manipulation of the retroviral genome.

A number of adenovirus vectors have also been described. Unlike retroviruses which integrate into the host genome, adenoviruses persist extrachromosomally thus minimizing the risks associated with insertional mutagenesis (Haj-Ahmad and Graham, *J. Virol.* (1986) 57:267-274; Bett et al., *J. Virol.* (1993) 67:5911-5921; Mittereder et al., *Human Gene Therapy* (1994) 5:717-729; Seth et al., *J. Virol.* (1994) 68:933-940; Barr et al., *Gene Therapy* (1994) 1:51-58; Berkner, K. L. *BioTechniques* (1988) 6:616-629; and Rich et al., *Human Gene Therapy* (1993) 4:461-476). Adenovirus vectors for use in the subject methods are described in more detail below.

Additionally, various adeno-associated virus (AAV) vector systems have been developed for gene delivery. AAV vectors can be readily constructed using techniques well known in the art. See, e.g., U.S. Pat. Nos. 5,173,414 and 5,139,941; International Publication Nos. WO 92/01070 (published 23 Jan. 1992) and WO 93/03769 (published 4 Mar. 1993); Lebkowski et al., *Molec. Cell. Biol.* (1988) 8:3988-3996; Vincent et al., *Vaccines* 90 (1990) (Cold Spring Harbor Laboratory Press); Carter, B. J. *Current Opinion in Biotechnology* (1992) 3:533-539; Muzyczka, N. *Current Topics in Microbiol. and Immunol.* (1992) 158:97-129; Kotin, R. M. *Human Gene Therapy* (1994) 5:793-801; Shelling and Smith, *Gene Therapy* (1994) 1:165-169; and Zhou et al., *J. Exp. Med.* (1994) 179:1867-1875. AAV vector systems are also described in further detail below.

Additional viral vectors which will find use for delivering the nucleic acid molecules of interest include those derived from the pox family of viruses, including vaccinia virus and avian poxvirus. By way of example, vaccinia virus recombinants expressing the genes can be constructed as follows. The DNA encoding the particular polypeptide is first inserted into an appropriate vector so that it is adjacent to a vaccinia promoter and flanking vaccinia DNA sequences, such as the sequence encoding thymidine kinase (TK). This vector is then used to transfect cells which are simultaneously infected with vaccinia. Homologous recombination serves to insert the vaccinia promoter plus the gene encoding the protein into the viral genome. The resulting TK-recombinant can be selected by culturing the cells in the presence of 5-bromodeoxyuridine and picking viral plaques resistant thereto.

Alternatively, avipoxviruses, such as the fowlpox and canarypox viruses, can also be used to deliver the genes. The use of an avipox vector is particularly desirable in human and other mammalian species since members of the avipox genus can only productively replicate in susceptible avian species and therefore are not infective in mammalian cells. Methods for producing recombinant avipoxviruses are known in the art and employ genetic recombination, as described above with respect to the production of vaccinia viruses. See, e.g., WO 91/12882; WO 89/03429; and WO 92/03545.

Molecular conjugate vectors, such as the adenovirus chimeric vectors described in Michael et al., *J. Biol. Chem.* (1993) 268:6866-6869 and Wagner et al., *Proc. Natl. Acad. Sci. USA* (1992) 89:6099-6103, can also be used for gene delivery.

Members of the Alphavirus genus, such as but not limited to vectors derived from the Sindbis and Semliki Forest viruses, will also find use as viral vectors for delivering the polynucleotide encoding the fusion. For a description of Sinbus-virus derived vectors useful for the practice of the instant methods, see, Dubensky et al., *J. Virol.* (1996) 70:508-519; and International Publication Nos. WO 95/07995 and WO 96/17072.

Alternatively, the Flt-1 constructs can be delivered without the use of viral vectors, such as by using plasmid-based nucleic acid delivery systems as described in U.S. Pat. Nos. 6,413,942; 6,214,804; 5,580,859; 5,589,466; 5,763,270; and 5,693,622, all incorporated herein by reference in their entireties. Plasmids will include the gene of interest operably linked to control elements that direct the expression of the protein product in vivo. Such control elements are well known in the art.

Adenovirus Gene Delivery Systems

In one embodiment of the subject invention, a nucleotide sequence encoding the Flt-1 receptor, such as the fusions described above, is inserted into an adenovirus-based expression vector. The adenovirus genome is a linear double-stranded DNA molecule of approximately 36,000 base pairs with the 55-kDa terminal protein covalently bound to the 5' terminus of each strand. Adenoviral ("Ad") DNA contains identical Inverted Terminal Repeats ("ITRs") of about 100 base pairs with the exact length depending on the serotype. The viral origins of replication are located within the ITRs exactly at the genome ends. DNA synthesis occurs in two stages. First, replication proceeds by strand displacement, generating a daughter duplex molecule and a parental displaced strand. The displaced strand is single-stranded and can form a "panhandle" intermediate, which allows replication initiation and generation of a daughter duplex molecule. Alternatively, replication can proceed from both ends of the genome simultaneously, obviating the requirement to form the panhandle structure.

During the productive infection cycle, the viral genes are expressed in two phases: the early phase, which is the period up to viral DNA replication, and the late phase, which coincides with the initiation of viral DNA replication. During the early phase only the early gene products, encoded by regions E1, E2, E3 and E4, are expressed, which carry out a number of functions that prepare the cell for synthesis of viral structural proteins. During the late phase, late viral gene products are expressed in addition to the early gene products and host cell DNA and protein synthesis are shut off. Consequently, the cell becomes dedicated to the production of viral DNA and of viral structural proteins.

The E1 region of adenovirus is the first region expressed after infection of the target cell. This region consists of two transcriptional units, the E1A and E1B genes. The main functions of the E1A gene products are to induce quiescent cells to enter the cell cycle and resume cellular DNA synthesis, and to transcriptionally activate the E1B gene and the other early regions (E2, E3, E4). Transfection of primary cells with the E1A gene alone can induce unlimited proliferation (immortalization), but does not result in complete transformation. However, expression of E1A in most cases results in induction of programmed cell death (apoptosis), and only occasionally immortalization. Coexpression of the E1B gene is required to prevent induction of apoptosis and for complete morphological transformation to occur. In established immortal cell lines, high level expression of E1A can cause complete transformation in the absence of E1B.

The E1B-encoded proteins assist E1A in redirecting the cellular functions to allow viral replication. The E1B 55 kD and E4 33 kD proteins, which form a complex that is essentially localized in the nucleus, function in inhibiting the synthesis of host proteins and in facilitating the expression of viral genes. Their main influence is to establish selective transport of viral mRNAs from the nucleus to the cytoplasm, concomitantly with the onset of the late phase of infection. The E1B 21 kD protein is important for correct temporal control of the productive infection cycle, thereby preventing premature death of the host cell before the virus life cycle has been completed.

Adenoviral-based vectors express gene product peptides at high levels. Adenoviral vectors have high efficiencies of infectivity, even with low titers of virus. Additionally, the virus is fully infective as a cell-free virion so injection of producer cell lines are not necessary. Adenoviral vectors achieve long-term expression of heterologous genes in vivo. Adenovirus is not associated with severe human pathology, the virus can infect a wide variety of cells and has a broad host-range, the virus can be produced in large quantities with relative ease, and the virus can be rendered replication defective by deletions in the early-region 1 ("E1") of the viral genome. Thus, vectors derived from human adenoviruses, in which at least the E1 region has been deleted and replaced by a gene of interest, have been used extensively for gene therapy experiments in the pre-clinical and clinical phase.

Adenoviral vectors for use with the present invention are derived from any of the various adenoviral serotypes, including, without limitation, any of the over 40 serotype strains of adenovirus, such as serotypes 2, 5, 12, 40, and 41. The adenoviral vectors used herein are replication-deficient and contain the gene of interest under the control of a suitable promoter, such as any of the promoters discussed below with reference to adeno-associated virus. For example, U.S. Pat. No. 6,048,551, incorporated herein by reference in its entirety, describes replication-deficient adenoviral vectors that include the human gene for the anti-inflammatory cytokine IL-10, as well as vectors that include the gene for the anti-inflammatory cytokine IL-1ra, under the control of the Rous Sarcoma Virus (RSV) promoter, termed Ad.RSVIL-10 and Ad.RSVIL-1ra, respectively.

Other recombinant adenoviruses, derived from any of the adenoviral serotypes, and with different promoter systems, can be used by those skilled in the art. For example, U.S. Pat. No. 6,306,652, incorporated herein by reference in its entirety, describes adenovirus vectors with E2A sequences, containing the hr mutation and the ts125 mutation, termed ts400, to prevent cell death by E2A overexpression, as well as vectors with E2A sequences, containing only the hr mutation, under the control of an inducible promoter, and vectors with E2A sequences, containing the hr mutation and the ts125 mutation (ts400), under the control of an inducible promoter.

Moreover, "minimal" adenovirus vectors as described in U.S. Pat. No. 6,306,652 will find use with the present invention. Such vectors retain at least a portion of the viral genome that is required for encapsidation of the genome into virus particles (the encapsidation signal), as well as at least one copy of at least a functional part or a derivative of the ITR. Packaging of the minimal adenovirus vector can be achieved by co-infection with a helper virus or, alternatively, with a packaging-deficient replicating helper system as described in U.S. Pat. No. 6,306,652.

Other useful adenovirus-based vectors for delivery of the gene of interest include the "gutless" (helper-dependent) adenovirus in which the vast majority of the viral genome has been removed (Wu et al., *Anesthes.* (2001) 94:1119-1132). Such "gutless" adenoviral vectors essentially create no viral proteins, thus allowing virally driven gene therapy to successfully ensue for over a year after a single administration (Parks, R. J., *Clin. Genet.* (2000) 58:1-11; Tsai et al., *Curr. Opin. Mol. Ther.* (2000) 2:515-523) and eliminates interference by the immune system. In addition, removal of the viral genome creates space for insertion of control sequences that provide expression regulation by systemically administered drugs (Burcin et al., *Proc. Natl. Acad. Sci. USA* (1999) 96:355-360), adding both safety and control of virally driven protein expression. These and other recombinant adenoviruses will find use with the present methods.

Adeno-Associated Virus Gene Delivery Systems

Adeno-associated virus (AAV) has been used with success to deliver genes for gene therapy. The AAV genome is a linear, single-stranded DNA molecule containing about 4681 nucleotides. The AAV genome generally comprises an internal, nonrepeating genome flanked on each end by inverted terminal repeats (ITRs). The ITRs are approximately 145 base pairs (bp) in length. The ITRs have multiple functions, including providing origins of DNA replication, and packaging signals for the viral genome. The internal nonrepeated portion of the genome includes two large open reading frames, known as the AAV replication (rep) and capsid (cap) genes. The rep and cap genes code for viral proteins that allow the virus to replicate and package into a virion. In particular, a family of at least four viral proteins are expressed from the AAV rep region, Rep 78, Rep 68, Rep 52, and Rep 40, named according to their apparent molecular weight. The AAV cap region encodes at least three proteins, VP1, VP2, and VP3.

AAV has been engineered to deliver genes of interest by deleting the internal nonrepeating portion of the AAV genome (i.e., the rep and cap genes) and inserting a heterologous gene (in this case, the gene encoding the Flt-1 receptor or fusion) between the ITRs. The heterologous gene is typically functionally linked to a heterologous promoter (constitutive, cell-specific, or inducible) capable of driving gene expression in the patient's target cells under appropriate conditions. Termination signals, such as polyadenylation sites, can also be included.

AAV is a helper-dependent virus; that is, it requires coinfection with a helper virus (e.g., adenovirus, herpesvirus or vaccinia), in order to form AAV virions. In the absence of coinfection with a helper virus, AAV establishes a latent state in which the viral genome inserts into a host cell chromosome, but infectious virions are not produced. Subsequent infection by a helper virus "rescues" the integrated genome, allowing it to replicate and package its genome into an infectious AAV virion. While AAV can infect cells from different species, the helper virus must be of the same species as the host cell. Thus, for example, human AAV will replicate in canine cells coinfected with a canine adenovirus.

Recombinant AAV virions comprising the gene of interest may be produced using a variety of art-recognized techniques described more fully below. Wild-type AAV and helper viruses may be used to provide the necessary replicative functions for producing rAAV virions (see, e.g., U.S. Pat. No. 5,139,941, incorporated herein by reference in its entirety). Alternatively, a plasmid, containing helper function genes, in combination with infection by one of the well-known helper viruses can be used as the source of replicative functions (see e.g., U.S. Pat. Nos. 5,622,856 and 5,139,941, both incorporated herein by reference in their entireties). Similarly, a plasmid, containing accessory function genes can be used in combination with infection by wild-type AAV, to provide the necessary replicative functions. These three approaches, when used in combination with a rAAV vector, are each sufficient to produce rAAV virions. Other approaches, well known in the art, can also be employed by the skilled artisan to produce rAAV virions.

In one embodiment of the present invention, a triple transfection method (described in detail in U.S. Pat. No. 6,001,650, incorporated by reference herein in its entirety) is used to produce rAAV virions because this method does not require the use of an infectious helper virus, enabling rAAV virions to be produced without any detectable helper virus present. This is accomplished by use of three vectors for rAAV virion production: an AAV helper function vector, an accessory function vector, and a rAAV expression vector. One of skill in the art will appreciate, however, that the nucleic acid sequences encoded by these vectors can be provided on two or more vectors in various combinations.

As explained herein, the AAV helper function vector encodes the "AAV helper function" sequences (i.e., rep and cap), which function in trans for productive AAV replication and encapsidation. The AAV helper function vector can support efficient AAV vector production without generating any detectable wt AAV virions (i.e., AAV virions containing functional rep and cap genes). An example of such a vector, pHLP19, is described in U.S. Pat. No. 6,001,650, incorporated herein by reference in its entirety. The rep and cap genes of the AAV helper function vector can be derived from any of the known AAV serotypes, as explained above. For example, the AAV helper function vector may have a rep gene derived from AAV-2 and a cap gene derived from AAV-6; one of skill in the art will recognize that other rep and cap gene combinations are possible, the defining feature being the ability to support rAAV virion production.

The accessory function vector encodes nucleotide sequences for non-AAV-derived viral and/or cellular functions upon which AAV is dependent for replication (i.e., "accessory functions"). The accessory functions include those functions required for AAV replication, including, without limitation, those moieties involved in activation of AAV gene transcription, stage specific AAV mRNA splicing, AAV DNA replication, synthesis of cap expression products, and AAV capsid assembly. Viral-based accessory functions can be derived from any of the well-known helper viruses such as adenovirus, herpesvirus (other than herpes simplex virus type-1), and vaccinia virus. In embodiments, the accessory function plasmid pLadeno5 is used (details regarding pLadeno5 are described in U.S. Pat. No. 6,004,797, incorporated herein by reference in its entirety). This plasmid provides a complete set of adenovirus accessory functions for AAV vector production, but lacks the components necessary to form replication-competent adenovirus.

In order to further an understanding of AAV, a more detailed discussion is provided below regarding recombinant AAV expression vectors and AAV helper and accessory functions Recombinant AAV Expression Vectors Recombinant AAV (rAAV) expression vectors are constructed using known techniques to at least provide as operatively linked components in the direction of transcription, control elements including a transcriptional initiation region, the polynucleotide of interest and a transcriptional termination region. The control elements are selected to be functional in the cell of interest, such as in a mammalian cell. The resulting construct which contains the operatively linked components is bounded (5' and 3') with functional AAV ITR sequences.

The nucleotide sequences of AAV ITR regions are known. See, e.g., Kotin, R. M. (1994) *Human Gene Therapy* 5:793-801; Berns, K. I. "Parvoviridae and their Replication" in *Fundamental Virology*, 2nd Edition, (B. N. Fields and D. M. Knipe, eds.) for the AAV-2 sequence. AAV ITRs used in the vectors of the invention need not have a wild-type nucleotide sequence, and may be altered, e.g., by the insertion, deletion or substitution of nucleotides. Additionally, AAV ITRs may be derived from any of several AAV serotypes, including without limitation, AAV1, AAV2, AAV3, AAV4, AAV5, AAV6, AAV7, AAV8, AAV9, AAVrh8, AAVrh8R, AAV10, AAVrh10, AAV11, AAV12, and the like. Furthermore, 5' and 3' ITRs which flank a selected nucleotide sequence in an AAV expression vector need not necessarily be identical or derived from the same AAV serotype or isolate, so long as they function as intended, i.e., to allow for excision and rescue of the sequence of interest from a host cell genome or vector, and to allow integration of the DNA molecule into the recipient cell genome when AAV Rep gene products are present in the cell.

Suitable polynucleotide molecules for use in AAV vectors will be less than about 5 kilobases (kb) in size. The selected polynucleotide sequence is operably linked to control elements that direct the transcription or expression thereof in the subject in vivo. Such control elements can comprise control sequences normally associated with the selected gene. Alternatively, heterologous control sequences can be employed. Useful heterologous control sequences generally include those derived from sequences encoding mammalian or viral genes. Examples include, but are not limited to, neuron-specific enolase promoter, a GFAP promoter, the SV40 early promoter, mouse mammary tumor virus LTR promoter; adenovirus major late promoter (Ad MLP); a herpes simplex virus (HSV) promoter, a cytomegalovirus (CMV) promoter such as the CMV immediate early promoter region (CMVIE), a rous sarcoma virus (RSV) promoter, synthetic promoters, hybrid promoters, and the like. In addition, sequences derived from nonviral genes, such as the murine metallothionein gene, will also find use herein. Such promoter sequences are commercially available from, e.g., Stratagene (San Diego, CA).

The AAV expression vector which harbors the polynucleotide molecule of interest bounded by AAV ITRs, can be constructed by directly inserting the selected sequence(s) into an AAV genome which has had the major AAV open reading frames ("ORFs") excised therefrom. Other portions of the AAV genome can also be deleted, so long as a sufficient portion of the ITRs remain to allow for replication and packaging functions. Such constructs can be designed using techniques well known in the art. See, e.g., U.S. Pat. Nos. 5,173,414 and 5,139,941; International Publication Nos. WO 92/01070 (published 23 Jan. 1992) and WO 93/03769 (published 4 Mar. 1993); Lebkowski et al. (1988) *Molec. Cell. Biol.* 8:3988-3996; Vincent et al. (1990) Vaccines 90 (Cold Spring Harbor Laboratory Press); Carter (1992) *Current Opinion in Biotechnology* 3:533-539; Muzyczka (1992) *Current Topics in Microbiol. and Immunol.* 158:97-129; Kotin (1994) *Human Gene Therapy* 5:793-801; Shelling and Smith (1994) *Gene Therapy* 1:165-169; and Zhou et al. (1994) *J. Exp. Med.* 179:1867-1875.

Alternatively, AAV ITRs can be excised from the viral genome or from an AAV vector containing the same and fused 5' and 3' of a selected nucleic acid construct that is present in another vector using standard ligation techniques, such as those described in Sambrook et al., supra. For example, ligations can be accomplished in 20 mM Tris-Cl pH 7.5, 10 mM MgCl2, 10 mM DTT, 33 µg/ml BSA, 10 mM-50 mM NaCl, and either 40 µM ATP, 0.01-0.02 (Weiss) units T4 DNA ligase at 0° C. (for "sticky end" ligation) or 1 mM ATP, 0.3-0.6 (Weiss) units T4 DNA ligase at 14° C. (for "blunt end" ligation). Intermolecular "sticky end" ligations are usually performed at 30-100 µg/ml total DNA concentrations (5-100 nM total end concentration). AAV vectors which contain ITRs have been described in, e.g., U.S. Pat. No. 5,139,941. In particular, several AAV vectors are described therein which are available from the American Type Culture Collection ("ATCC") under Accession Numbers 53222, 53223, 53224, 53225 and 53226.

For the purposes of the invention, suitable host cells for producing rAAV virions from the AAV expression vectors include microorganisms, yeast cells, insect cells, and mammalian cells, that can be, or have been, used as recipients of a heterologous DNA molecule and that are capable of growth in, for example, suspension culture, a bioreactor, or the like. The term includes the progeny of the original cell which has been transfected. Thus, a "host cell" as used herein generally refers to a cell which has been transfected with an exogenous DNA sequence. Cells from the stable human cell line, 293 (readily available through, e.g., the American Type Culture Collection under Accession Number ATCC CRL1573) can be used in the practice of the present invention. Particularly, the human cell line 293 is a human embryonic kidney cell line that has been transformed with adenovirus type-5 DNA fragments (Graham et al. (1977) *J. Gen. Virol.* 36:59), and expresses the adenoviral E1a and E1b genes (Aiello et al. (1979) *Virology* 94:460). The 293 cell line is readily transfected, and provides a particularly convenient platform in which to produce rAAV virions.

AAV Helper Functions

Host cells containing the above-described AAV expression vectors must be rendered capable of providing AAV helper functions in order to replicate and encapsidate the nucleotide sequences flanked by the AAV ITRs to produce rAAV virions. AAV helper functions are generally AAV-derived coding sequences which can be expressed to provide AAV gene products that, in turn, function in trans for productive AAV replication. AAV helper functions are used herein to complement necessary AAV functions that are missing from the AAV expression vectors. Thus, AAV helper functions include one, or both of the major AAV ORFs, namely the rep and cap coding regions, or functional homologues thereof.

By "AAV rep coding region" is meant the art-recognized region of the AAV genome which encodes the replication proteins Rep 78, Rep 68, Rep 52 and Rep 40. These Rep expression products have been shown to possess many functions, including recognition, binding and nicking of the AAV origin of DNA replication, DNA helicase activity and modulation of transcription from AAV (or other heterologous) promoters. The Rep expression products are collectively required for replicating the AAV genome. For a description of the AAV rep coding region, see, e.g., Muzyczka, N. (1992) *Current Topics in Microbiol. and Immunol.* 158:97-129; and Kotin, R. M. (1994) *Human Gene Therapy* 5:793-801. Suitable homologues of the AAV rep coding region include the human herpesvirus 6 (HHV-6) rep gene which is also known to mediate AAV-2 DNA replication (Thomson et al. (1994) *Virology* 204:304-311).

By "AAV cap coding region" is meant the art-recognized region of the AAV genome which encodes the capsid proteins VP1, VP2, and VP3, or functional homologues thereof. These Cap expression products supply the packaging functions which are collectively required for packaging the viral genome. For a description of the AAV cap coding region, see, e.g., Muzyczka, N. and Kotin, R. M. (supra).

AAV helper functions are introduced into the host cell by transfecting the host cell with an AAV helper construct either prior to, or concurrently with, the transfection of the AAV expression vector. AAV helper constructs are thus used to provide at least transient expression of AAV rep and/or cap genes to complement missing AAV functions that are necessary for productive AAV infection. AAV helper constructs lack AAV ITRs and can neither replicate nor package themselves.

These constructs can be in the form of a plasmid, phage, transposon, cosmid, virus, or virion. A number of AAV helper constructs have been described, such as the commonly used plasmids pAAV/Ad and pIM29+45 which encode both Rep and Cap expression products. See, e.g., Samulski et al. (1989) *J. Virol.* 63:3822-3828; and McCarty et al. (1991) *J. Virol.* 65:2936-2945. A number of other vectors have been described which encode Rep and/or Cap expression products. See, e.g., U.S. Pat. No. 5,139,941.

AAV Accessory Functions

The host cell (or packaging cell) must also be rendered capable of providing nonAAV-derived functions, or "accessory functions," in order to produce rAAV virions. Accessory functions are nonAAV-derived viral and/or cellular functions upon which AAV is dependent for its replication. Thus, accessory functions include at least those nonAAV proteins and RNAs that are required in AAV replication, including those involved in activation of AAV gene transcription, stage specific AAV mRNA splicing, AAV DNA replication, synthesis of Cap expression products and AAV capsid assembly. Viral-based accessory functions can be derived from any of the known helper viruses.

In particular, accessory functions can be introduced into and then expressed in host cells using methods known to those of skill in the art. Typically, accessory functions are provided by infection of the host cells with an unrelated helper virus. A number of suitable helper viruses are known, including adenoviruses; herpesviruses such as herpes simplex virus types 1 and 2; and vaccinia viruses. Nonviral accessory functions will also find use herein, such as those provided by cell synchronization using any of various known agents. See, e.g., Buller et al. (1981) *J. Virol.* 40:241-247; McPherson et al. (1985) *Virology* 147:217-222; Schlehofer et al. (1986) *Virology* 152:110-117.

Alternatively, accessory functions can be provided using an accessory function vector as defined above. See, e.g., U.S. Pat. No. 6,004,797 and International Publication No. WO 01/83797, incorporated herein by reference in their entireties. Nucleic acid sequences providing the accessory functions can be obtained from natural sources, such as from the genome of an adenovirus particle, or constructed using recombinant or synthetic methods known in the art. As explained above, it has been demonstrated that the full-complement of adenovirus genes are not required for accessory helper functions. In particular, adenovirus mutants incapable of DNA replication and late gene synthesis have been shown to be permissive for AAV replication. Ito et al., (1970) *J Gen. Virol.* 2:243; Ishibashi et al, (1971) *Virology* 45:317. Similarly, mutants within the E2B and E3 regions have been shown to support AAV replication, indicating that the E2B and E3 regions are probably not involved in providing accessory functions. Carter et al., (1983) *Virology* 126:505. However, adenoviruses defective in the E1 region, or having a deleted E4 region, are unable to support AAV replication. Thus, E1A and E4 regions are likely required for AAV replication, either directly or indirectly. Laughlin et al., (1982) *J. Virol.* 41:868; Janik et al., (1981) *Proc. Natl. Acad. Sci. USA* 78:1925; Carter et al., (1983) *Virology* 126:505. Other characterized Ad mutants include: E1B (Laughlin et al. (1982), supra; Janik et al. (1981), supra; Ostrove et al., (1980) *Virology* 104:502); E2A (Handa et al., (1975) *J. Gen. Virol.* 29:239; Strauss et al., (1976) *J. Virol.* 17:140; Myers et al., (1980) *J. Virol.* 35:665; Jay et al., (1981) *Proc. Natl. Acad. Sci. USA* 78:2927; Myers et al., (1981) *J. Biol. Chem.* 256:567); E2B (Carter, *Adeno-Associated Virus Helper Functions, in I CRC Handbook of Parvoviruses* (P. Tijssen ed., 1990)); E3 (Carter et al. (1983), supra); and E4 (Carter et al. (1983), supra; Carter (1995)). Although studies of the accessory functions provided by adenoviruses having mutations in the E1B coding region have produced conflicting results, Samulski et al., (1988) *J. Virol.* 62:206-210, has reported that E1B55k is required for AAV virion production, while E1B19k is not. In addition, International Publication WO 97/17458 and Matshushita et al., (1998) *Gene Therapy* 5:938-945, describe accessory function vectors encoding various Ad genes. Accessory function vectors can comprise an adenovirus VA RNA coding region, an adenovirus E4 ORF6 coding region, an adenovirus E2A 72 kD coding region, an adenovirus E1A coding region, and an adenovirus E1B region lacking an intact E1B55k coding region. Such vectors are described in International Publication No. WO 01/83797.

As a consequence of the infection of the host cell with a helper virus, or transfection of the host cell with an accessory function vector, accessory functions are expressed which transactivate the AAV helper construct to produce AAV Rep and/or Cap proteins. The Rep expression products excise the recombinant DNA (including the DNA of interest) from the AAV expression vector. The Rep proteins also serve to duplicate the AAV genome. The expressed Cap proteins assemble into capsids, and the recombinant AAV genome is packaged into the capsids. Thus, productive AAV replication ensues, and the DNA is packaged into rAAV virions. A "recombinant AAV virion," or "rAAV virion" is defined herein as an infectious, replication-defective virus including an AAV protein shell, encapsidating a heterologous nucleotide sequence of interest which is flanked on both sides by AAV ITRs.

Following recombinant AAV replication, rAAV virions can be purified from the host cell using a variety of conventional purification methods, such as column chromatography, CsCl gradients, and the like. For example, a plurality of column purification steps can be used, such as purification over an anion exchange column, an affinity column and/or a cation exchange column. See, for example, International Publication No. WO 02/12455. Further, if infection is employed to express the accessory functions, residual helper virus can be inactivated, using known methods. For example, adenovirus can be inactivated by heating to temperatures of approximately 60° C. for, e.g., 20 minutes or more. This treatment effectively inactivates only the helper virus since AAV is extremely heat stable while the helper adenovirus is heat labile.

The resulting rAAV virions containing the nucleotide sequence of interest can then be used for gene delivery using the techniques described below.

rAAV Particles

In some embodiments, the viral particle is a recombinant AAV particle comprising a nucleic acid comprising a transgene flanked by one or two ITRs. The nucleic acid is encapsidated in the AAV particle. The AAV particle also comprises capsid proteins. In some embodiments, the nucleic acid comprises the protein coding sequence(s) of interest (e.g., a therapeutic transgene) operatively linked components in the direction of transcription, control sequences including transcription initiation and termination sequences, thereby forming an expression cassette. The expression cassette is flanked on the 5' and 3' end by at least one functional AAV ITR sequences. By "functional AAV ITR sequences" it is meant that the ITR sequences function as intended for the rescue, replication and packaging of the AAV virion. See Davidson et al., *PNAS*, 2000, 97(7)3428-32; Passini el al., *J. Virol.*, 2003, 77(12):7034-40; and Pechan et al., *Gene Ther.*, 2009, 16:10-16, all of which are incorporated herein in their entirety by reference. For practicing some aspects of the invention, the recombinant vectors comprise at least all of the sequences of AAV essential for encapsidation and the physical structures for infection by the rAAV. AAV ITRs for use in the vectors of the invention need not have a wild-type nucleotide sequence (e.g., as described in Kotin, *Hum. Gene Ther.*, 1994, 5:793-801), and may be altered by the insertion, deletion or substitution of nucleotides or the AAV ITRs may be derived from any of several AAV serotypes. More than 40 serotypes of AAV are currently known, and new serotypes and variants of existing serotypes continue to be identified. See Gao et al., *PNAS*, 2002, 99(18): 11854-6; Gao et al., *PNAS*, 2003, 100(10): 6081-6; and Bossis et al., *J. Virol.*, 2003, 77(12):6799-810. Use of any AAV serotype is considered within the scope of the present invention. In some embodiments, a rAAV vector is a vector derived from an AAV serotype, including without limitation, AAV1, AAV2, AAV3, AAV4, AAV5, AA6, AAV7, AAV8, AAV9, AAVrh.8, AAVrh.10, AAV11, AAV12, or the like. In some embodiments, the nucleic acid in the AAV comprises an ITR of AAV1, AAV2, AAV3, AAV4, AAV5, AA6, AAV7, AAV8, AAV9, AAVrh.8, AAVrh10, AAV11, AAV12 or the like. In further embodiments, the rAAV particle comprises capsid proteins of AAV1, AAV2, AAV3, AAV4, AAV5, AA6, AAV7, AAV8, AAV9, AAVrh.8, AAVrh.10, AAV11, AAV12 or the like. In further embodiments, the rAAV particle comprises capsid proteins of an AAV serotype from Clades A-F (Gao, et al. *J. Virol.* 2004, 78(12):6381).

Different AAV serotypes are used to optimize transduction of particular target cells or to target specific cell types within a particular target tissue (e.g., a diseased tissue). A rAAV particle can comprise viral proteins and viral nucleic acids of the same serotype or a mixed serotype. Any combination of AAV serotypes for production of a rAAV particle is provided herein as if each combination had been expressly stated herein.

Self-Complementary AAV Viral Genomes

In some aspects, the invention provides viral particles comprising a recombinant self-complementing genome. AAV viral particles with self-complementing genomes and methods of use of self-complementing AAV genomes are described in U.S. Pat. Nos. 6,596,535; 7,125,717; 7,765,583; 7,785,888; 7,790,154; 7,846,729; 8,093,054; and 8,361,457; and Wang Z., et al., (2003) Gene Ther 10:2105-2111, each of which are incorporated herein by reference in its entirety. A rAAV comprising a self-complementing genome will quickly form a double stranded DNA molecule by virtue of its partially complementing sequences (e.g., complementing coding and non-coding strands of a transgene). In some embodiments, the invention provides an AAV viral particle comprising an AAV genome, wherein the rAAV genome comprises a first heterologous polynucleotide sequence (e.g., a therapeutic transgene coding strand) and a second heterologous polynucleotide sequence (e.g., the non-coding or antisense strand of the therapeutic transgene) wherein the first heterologous polynucleotide sequence can form intrastrand base pairs with the second polynucleotide sequence along most or all of its length. In some embodiments, the first heterologous polynucleotide sequence and a second heterologous polynucleotide sequence are linked by a sequence that facilitates intrastrand basepairing; e.g., a hairpin DNA structure. Hairpin structures are known in the art, for example in siRNA molecules. In some embodiments, the first heterologous polynucleotide sequence and a second heterologous polynucleotide sequence are linked by a mutated ITR (e.g., the right ITR). The mutated ITR comprises a deletion of the D region comprising the terminal resolution sequence. As a result, on replicating an AAV viral genome, the rep proteins will not cleave the viral genome at the mutated ITR and as such, a recombinant viral genome comprising the following in 5' to 3' order will be packaged in a viral capsid: an AAV ITR, the first heterologous polynucleotide sequence including regulatory sequences, the mutated AAV ITR, the second heterologous polynucleotide in reverse orientation to the first heterologous polynucleotide and a third AAV ITR.

Production of rAAV Vectors

Numerous methods are known in the art for production of rAAV vectors, including transfection, stable cell line production, and infectious hybrid virus production systems which include adenovirus-AAV hybrids, herpesvirus-AAV hybrids and baculovirus-AAV hybrids. rAAV production cultures for the production of rAAV virus particles all require; 1) suitable host cells, including, for example, human-derived cell lines such as HeLa, A549, or 293 cells, or insect-derived cell lines such as SF-9, in the case of baculovirus production systems; 2) suitable helper virus function, provided by wild-type or mutant adenovirus (such as temperature sensitive adenovirus), herpes virus, baculovirus, or a plasmid construct providing helper functions; 3) AAV rep and cap genes and gene products; 4) a transgene (such as a therapeutic transgene) flanked by at least one AAV ITR sequences; and 5) suitable media and media components to support rAAV production. Suitable media known in the art may be used for the production of rAAV vectors. These media include, without limitation, media produced by Hyclone Laboratories and JRH including Modified Eagle Medium (MEM), Dulbecco's Modified Eagle Medium (DMEM), custom formulations such as those described in U.S. Pat. No. 6,566,118, and Sf-900 II SFM media as described in U.S. Pat. No. 6,723,551, each of which is incorporated herein by reference in its entirety, particularly with respect to custom media formulations for use in production of recombinant AAV vectors.

Suitable rAAV production culture media of the present invention may be supplemented with serum or serum-derived recombinant proteins at a level of 0.5%-20% (v/v or w/v). Alternatively, as is known in the art, rAAV vectors may be produced in serum-free conditions which may also be referred to as media with no animal-derived products. One of ordinary skill in the art may appreciate that commercial or custom media designed to support production of rAAV vectors may also be supplemented with one or more cell culture components know in the art, including without limitation glucose, vitamins, amino acids, and or growth factors, in order to increase the titer of rAAV in production cultures.

rAAV production cultures can be grown under a variety of conditions (over a wide temperature range, for varying lengths of time, and the like) suitable to the particular host cell being utilized. As is known in the art, rAAV production cultures include attachment-dependent cultures which can be cultured in suitable attachment-dependent vessels such as, for example, roller bottles, hollow fiber filters, micro-carriers, and packed-bed or fluidized-bed bioreactors. rAAV vector production cultures may also include suspension-adapted host cells such as HeLa, 293, and SF-9 cells which can be cultured in a variety of ways including, for example, spinner flasks, stirred tank bioreactors, and disposable systems such as the Wave bag system.

rAAV vector particles of the invention may be harvested from rAAV production cultures by lysis of the host cells of the production culture or by harvest of the spent media from the production culture, provided the cells are cultured under conditions known in the art to cause release of rAAV particles into the media from intact cells, as described more fully in U.S. Pat. No. 6,566,118). Suitable methods of lysing cells are also known in the art and include for example multiple freeze/thaw cycles, sonication, microfluidization, and treatment with chemicals, such as detergents and/or proteases.

Purification of rAAV Vectors

At harvest, rAAV production cultures of the present invention may contain one or more of the following: (1) host cell proteins; (2) host cell DNA; (3) plasmid DNA; (4) helper virus; (5) helper virus proteins; (6) helper virus DNA; and (7) media components including, for example, serum proteins, amino acids, transferrins and other low molecular weight proteins. In addition, rAAV production cultures further include rAAV particles having an AAV capsid serotype selected from the group consisting of AAV1, AAV2, AAV3, AAV4, AAV5, AAV6, AAV7, AAV8, AAVrh8, AAV9, AAV10, AAVrh0, AAV11, AAV12, or the like.

Thus, in some embodiments, the rAAV production culture harvest is clarified to remove host cell debris. In some embodiments, the production culture harvest is clarified by filtration through a series of depth filters including, for example, a grade DOHC Millipore Millistak+ HC Pod Filter, a grade A1HC Millipore Millistak+ HC Pod Filter, and a 0.2 μm Filter Opticap XLIO Millipore Express SHC Hydrophilic Membrane filter. Clarification can also be achieved by a variety of other standard techniques known in the art, such as, centrifugation or filtration through any cellulose acetate filter of 0.2 μm or greater pore size known in the art.

In some embodiments, the rAAV production culture harvest is further treated with Benzonase® to digest any high molecular weight DNA present in the production culture. In some embodiments, the Benzonase® digestion is performed under standard conditions known in the art including, for example, a final concentration of 1-2.5 units/ml of Benzonase® at a temperature ranging from ambient to 37° C. for a period of 30 minutes to several hours.

rAAV particles may be isolated or purified using one or more of the following purification steps: centrifugation, flow-through anionic exchange filtration, tangential flow filtration (TFF) for concentrating the rAAV particles, rAAV capture by apatite chromatography, heat inactivation of helper virus, rAAV capture by hydrophobic interaction chromatography, buffer exchange by size exclusion chromatography (SEC), nanofiltration, and rAAV capture by anionic exchange chromatography. These steps may be used alone, in various combinations, or in different orders. In some embodiments, the method comprises all the steps in the order as described below. Methods to purify rAAV particles are found, for example, in U.S. Pat. Nos. 6,989,264 and 8,137,948 and WO 2010/148143.

Compositions and Delivery

Once produced, the sFlt-1 receptor, or vectors (or virions) encoding the same, such as the fusions described above, will be formulated into compositions suitable for direct delivery to the eye in order to treat macular degeneration. If gene therapy is desired, compositions will comprise sufficient genetic material to produce a therapeutically effective amount of the Flt-1 of interest, e.g., an amount sufficient to bind to and mediate the effects of the corresponding signal pathway, or to reduce or ameliorate symptoms of the disease state in question, or an amount sufficient to confer the desired benefit. Appropriate doses will also depend on the condition of the subject being treated, age, the severity of the condition being treated, the mode of administration, among other factors. An appropriate effective amount can be readily determined by one of skill in the art.

Thus, a "therapeutically effective amount" will fall in a relatively broad range that can be determined through clinical trials. For example, for in vivo injection of rAAV virions, a therapeutically effective dose will be on the order of from about $10^6$ to $10^{15}$ vector genomes (vg) of the recombinant virus, such as $10^8$ to $10^{14}$ vg, for example $10^8$ to $10^{12}$ vg, such as $10^8$ to $10^{10}$ vg, $10^8$ to $10^9$ vg, or any integer in between, such as $0.5 \times 10^8$ vg . . . $1 \times 10^8$ vg . . . $1.5 \times 10^8$ vg . . . $2 \times 10^8$ vg . . . $5 \times 10^8$ vg . . . $1 \times 10^9$ vg . . . $2 \times 10^9$ vg . . . $3 \times 10^9$ vg . . . $5 \times 10^9$ vg . . . $6 \times 10^9$ vg . . . $1 \times 10^{10}$ vg . . . $2 \times 10^{10}$ vg . . . $5 \times 10^{10}$ vg . . . $1 \times 10^{11}$ vg . . . $5 \times 10^{11}$ vg . . . $1 \times 10^{12}$ vg . . . $5 \times 10^{12}$ vg, etc.

In aspects, the compositions will also contain ophthalmologically acceptable excipients. The compositions can be formulated as solutions, gels, ointments, suspensions, a dry powder to be reconstituted with a vehicle before use, or as other suitable and well-tolerated ophthalmic delivery systems. Such excipients include any pharmaceutical agent suitable for direct delivery to the eye which may be administered without undue toxicity. Pharmaceutically acceptable excipients include, but are not limited to, sorbitol, any of the various TWEEN compounds, and liquids such as water, saline, glycerol and ethanol. Pharmaceutically acceptable salts can be included therein, for example, mineral acid salts such as hydrochlorides, hydrobromides, phosphates, sulfates, and the like; and the salts of organic acids such as acetates, propionates, malonates, benzoates, and the like. Additionally, auxiliary substances, such as wetting or emulsifying agents, pH buffering substances, and the like, may be present in such vehicles. A thorough discussion of pharmaceutically acceptable excipients is available in REMINGTON'S PHARMACEUTICAL SCIENCES (Mack Pub. Co., N.J. 1991).

Administration can be effected in one dose, continuously or intermittently throughout the course of treatment. Methods of determining the most effective means of administration are well known to those of skill in the art and will vary with the vector, the composition of the therapy, the target cells, and the subject being treated. Single and multiple administrations can be carried out with the dose level and pattern being selected by the treating physician.

If multiple doses are administered, the first formulation administered can be the same or different than the subsequent formulations. Thus, for example, the first administration can be in the form of an AAV virion and the second administration in the form of an adenovirus vector, plasmid DNA, an AAV virion, a subunit vaccine composition, or the like. Moreover, subsequent delivery can also be the same or different than the second mode of delivery.

It should be understood that more than one transgene can be expressed by the delivered recombinant vector. Alternatively, separate vectors, each expressing one or more different transgenes, can also be delivered to the subject as described herein. Thus, multiple transgenes can be delivered concurrently or sequentially. Furthermore, it is also intended that the vectors delivered by the methods of the present invention be combined with other suitable compositions and therapies. For instance, other compounds for treating macular degeneration can be present.

As explained above, for delivery of the sFlt-1 receptor constructs to the eye (whether via gene therapy or protein therapy), administration will typically be local. This has the advantage of limiting the amount of material (protein or DNA) that needs to be administered and limiting systemic side-effects. Many possible modes of delivery can be used, including, but not limited to: topical administration on the cornea by a gene gun; subconjunctival injection, intracameral injection, via eye drops to the cornea, injection into the anterior chamber via the temporal limbus, intrastromal injection, corneal application combined with electrical pulses, intracorneal injection, subretinal injection, intravitreal injection (e.g., front, mid or back vitreal injection), and intraocular injection. Alternatively cells can be transfected or transduced ex vivo and delivered by intraocular implantation. See, Auricchio, *Mol. Ther.* (2002) 6:490-494; Bennett, *Nature Med.* (1996) 2:649-654, 1996; Borras, *Experimental Eye Research* (2003) 76:643-652; Chaum, *Survey of Ophthalmology* (2002) 47:449-469; Campochiaro, *Expert Opinions in Biological Therapy* (2002) 2:537-544; Lai, *Gene Therapy* (2002) 9:804 813; Pleyer, *Progress in Retinal and Eye Research* (2003) 22:277-293.

Thus, the ophthalmic formulations are administered in any form suitable for ocular drug administration, e.g., dosage forms suitable for topical administration, a solution or suspension for administration as eye drops, eye washes, or injection, ointment, gel, liposomal dispersion, colloidal microparticle suspension, or the like, or in an ocular insert, e.g., in an optionally biodegradable controlled release polymeric matrix. The ocular insert is implanted in the conjunctiva, sclera, pars plana, anterior segment, or posterior segment of the eye. Implants provide for controlled release of the formulation to the ocular surface, typically sustained release over an extended time period. Additionally, in embodiments, the formulation is entirely composed of components that are naturally occurring and/or as GRAS ("Generally Regarded as Safe") by the U.S. Food and Drug Administration.

Combinations of protein and nucleic acid treatments can be used. For example, a fusion protein according to the invention can be administered to a patient. If a favorable response is observed, then a nucleic acid molecule encoding the fusion protein can be administered for a long term effect. Alternatively, the protein and nucleic acid can be administered simultaneously or approximately simultaneously.

Dosage treatment may be a single dose schedule or a multiple dose schedule. Moreover, the subject may be administered as many doses as appropriate. One of skill in the art can readily determine an appropriate number of doses.

In aspects, the compositions described herein are used in any of the methods described herein.

Kits of the Invention

The invention also provides kits. In certain embodiments, the kits of the invention comprise one or more containers comprising a purified sFlt-1 receptor, fusions comprising the same, recombinant vectors encoding the same, or AAV virions/rAAV vectors encoding the same. In embodiments, the kits contain an ophthalmologically acceptable excipients. The kits can also comprise delivery devices suitable for ocular delivery. The kits may further comprise a suitable set of instructions, generally written instructions, relating to the use of the kit and its contents for any of the methods described herein.

The kits may comprise the components in any convenient, appropriate packaging. For example, if the nucleic acid, protein, vector, or virion are provided as a dry formulation (e.g., freeze dried or a dry powder), a vial with a resilient stopper can be used, so that the vectors may be resuspended by injecting fluid through the resilient stopper. Ampules with non-resilient, removable closures (e.g., sealed glass) or resilient stoppers can be used for liquid formulations. Also contemplated are packages for use in combination with a specific device (e.g., a syringe).

The instructions generally include information as to dosage, dosing schedule, and route of administration for the intended method of use. The containers may be unit doses, bulk packages (e.g., multi-dose packages) or sub-unit doses. Instructions supplied in the kits of the invention are typically written instructions on a label or package insert (e.g., a paper sheet included in the kit), but machine-readable instructions (e.g., instructions carried on a magnetic or optical storage disk) are also contemplated.

2. EXPERIMENTAL

Below are examples of specific embodiments for carrying out the present invention. The examples are offered for illustrative purposes only, and are not intended to limit the scope of the present invention in any way.

Efforts have been made to ensure accuracy with respect to numbers used (e.g., amounts, temperatures, etc.), but some experimental error and deviation should, of course, be allowed for.

Materials and Methods

Soluble Vector Construction.

FIGS. 1 (SEQ ID NO: 10) and 2A-2B (SEQ ID NO:11) show the DNA and protein sequences of the fusion protein termed "sFLT01". This construct includes in N-terminus to C-terminus order, a signal sequence found at positions 1-23 of FIGS. 2A-2B; an Flt-1 Ig-like domain 2 plus extensions of this domain, found at positions 24-118 of FIGS. 2A-2B; a sequence of nine glycines, found at positions 119-127 of FIGS. 2A-2B; and IgG1-Fc CH2/CH3 residues at positions 128-358 of FIGS. 2A-2B.

DNA was cloned into plasmid pCBA(2)-int-BGH, which contains a hybrid chicken β-actin (CBA) promoter and a bovine growth hormone polyadenylation signal sequence (BGH poly A). Xu et al., *Hum. Gene. Ther.* (2001) 12:563-573.

The whole sFLT01 expression cassette was then cloned into a previral plasmid vector pAAVSP70 containing AAV2 inverted terminal repeats (ITRs). Ziegler et al, *Mol. Ther.* (2004) 9:231-240. The total size of the resulting AAV genome in plasmid sp70.BR/sFLT01 including the region flanked by the ITRs was 4.6 kb.

The recombinant vector AAV2-sFLT01 was produced by triple transfection of 293 cells using helper plasmids p5rep-Δ-CMVcap and pHelper (Stratagene, La Jolla, CA, USA), and purified according to the protocol using an iodixanol step gradient and a HiTrap Heparin column (GE Healthcare Life Sciences, Piscataway, NJ, USA) on an ÅKTA FPLC system (GE Healthcare Life Sciences, Piscataway, NJ). Vincent et al, *J. Virol.* (1997) 71:1897-1905; Zolotukhin et al., *Methods* (2002) 28:158-167.

Viral titers were determined using a real-time TaqMan PCR assay (ABI Prism 7700; Applied Biosystems, Foster City, CA, USA) with primers that were specific for the BGH poly A sequence.

Intravitreal Injection.

For example 1, female cynomolgus monkeys (*Macaca fascicularis*) 2.1-2.8 kg were sedated with ketamine and diazepam. Prior to dose administration, the eye was cleaned with a povidone-iodine topical antiseptic and rinsed with sterile saline. A mydriatic (1% tropicamide) and a topical anesthetic (proparacaine) were instilled into each injected eye. A lid speculum was inserted to keep the lids open during the procedure and the globe was retracted. The 27 gauge needle of the dose syringe was inserted through the sclera and pars plana approximately 4 mm posterior to the limbus. The needle was directed posterior to the lens into one of three locations: the anterior vitreous adjacent to the peripheral retina, the mid-vitreous or the posterior vitreous adjacent to the macula. The AAV vector was injected in a total volume of 50 µl or 100 µl.

Induction of Choroidal Neovascularization (CNV).

CNV was induced in the primates after the administration of the test article to allow sufficient time for the transgene to reach peak expression. A diode laser with a 532 nm wavelength (Iridex Corp., Mountain View, CA) and a slit lamp adapter was used to rupture Bruch's membrane to induce CNV. Nine burns were placed on the macular region in a 3×3 grid pattern using the same type laser operated with a spot size of 75 microns at 500-700 mW for 100-200 milliseconds.

CNV Evaluation.

Leakage from the CNV lesions in monkeys was evaluated 2, 3 and 4 weeks following laser induction by fluorescein angiography. Sedated animals were injected with a fluorescein dye (10% fluorescein sodium, approximately 0.1 mL/kg) and the fundus was imaged at several time points following dye injection to monitor the arterial and venous phases. Funduscopic images were collected and analyzed for the presence of leaking CNV at each burn site.

Example 1

Efficacy of AAV2-sFLT01 in Non-Human Primates

Two studies were conducted in non-human primates (NHP) to determine the efficacy of intravitreally administered AAV2-sFLT01. In the first study (Study A), cynomolgus monkeys were treated intravitreally with $2 \times 10^8$ or $2 \times 10^9$ vg of AAV2-sFLT01. The contralateral control eye was treated with the same dose of an AAV2 vector that did not code for a transgene (AAV2-Null). Laser CNV induction occurred 6 weeks following vector administration. The degree of CNV was found to be maximal at the 3 week fluorescein angiography, therefore this was the time point used to evaluate the efficacy of treatment. The number of leaking lesions was compared between the AAV2-sFLT01 treated and the contralateral control eye (Table 1). None of the sFLT01 treatment groups demonstrated a statistically significant reduction in leaking CNV lesions compared to the AAV2-Null control eyes.

In the second study (Study B), $2 \times 10^{10}$ vg of AAV2-sFLT01 or AAV2-Null was delivered intravitreally while the contralateral eyes were kept naive to treatment. Laser CNV induction in both eyes occurred 22 weeks following vector administration. All six of the AAV2-sFLT01 treated eyes demonstrated a significant reduction in the amount of CNV leakage compared to the naive contralateral control eyes with only 7% of the AAV2-sFLT01 treated burns exhibiting leaking CNV while 56% of the burns in the control eye were leaking. This difference was statistically significant ($p<0.0001$) as determined by Fisher's exact test. Eyes treated with the AAV2-Null control vector did not demonstrate a reduction in CNV compared to the untreated control eyes.

TABLE 1

Results from two NHP efficacy studies.

| Study | Dose (vg)/ Injection Placement | Laser Induction (weeks post administration) | Average sFLT01 Expression (ng/mL) | Percentage of Leaking Lesions | | Number of Animals |
|---|---|---|---|---|---|---|
| | | | | Treated Eye | Control Eye | |
| A | $2 \times 10^8$ | 6 | 26 | 28% | 50% | 2 |
| | $2 \times 10^9$ | 6 | 190 | 67% | 67% | 4 |

TABLE 1-continued

Results from two NHP efficacy studies.

| Study | Dose (vg)/ Injection Placement | Laser Induction (weeks post administration) | Average sFLT01 Expression (ng/mL) | Percentage of Leaking Lesions | | Number of Animals |
|---|---|---|---|---|---|---|
| | | | | Treated Eye | Control Eye | |
| B | $2 \times 10^{10}$ | 22 | 1,833 | 7% | 56% | 6 |
| | $2 \times 10^{10}$/ Central VH Null Vector | 22 | n/a | 63% | 48% | 3 |

The ipsilateral eye from Study A received AAV2-sFLT01 vector while the contralateral control eye received AAV2-Null vector six weeks prior to laser induction of CNV. In Study B, the ipsilateral eye received AAV2-sFLT01 vector while the contralateral eye remained naive to treatment six weeks prior to laser induction of CNV in both eyes. The average sFLT01 expression level at the time of laser induction is presented in the table.

In sum, intravitreal administration of an AAV2 gene therapy vector encoding for a soluble receptor to VEGF resulted in transduction of retinal cells with dose dependent expression of the transgene product in the non-human primate eye. Expression was first measured as early as three weeks following administration and was found to be relatively stable to the last time point measured (23 weeks).

Efficacy was observed in the NHP model for seven out of eight animals whose sFLT01 expression levels were above 100 ng/mL in aqueous humor suggesting that there may be a threshold value of sFLT01 that must be achieved to effect a change in neovascularization in this model. All six of the animals treated with $2 \times 10^{10}$ vg that were lasered 22 weeks following vector administration had reduced CNV compared to the control eyes.

Example 2

Efficacy of AAV2-sFLT01 in Humans

Dose escalation studies were conducted in humans to evaluate the safety, tolerability and efficacy of a single intravitreal injection of AAV2-sFLT01. AAV2-sFLT01 was produced as described above. Patients used in the study were end-stage neovascular AMD patients. Criteria for qualifying for the study included the following:

Choroidal neovascular membrane (CNV) secondary to AMD, as confirmed by the patient's medical history and a documented diagnosis of CNV.
Distance best corrected visual acuity (BCVA) of 20/100 or worse in the study eye.
The fellow eye must have distance BCVA of 20/400 or better.
The study eye, i.e., the eye that received AAV2-sFLT01, had the worst CVA (as compared to the fellow eye).
Subfoveal disciform scarring in the study eye for the dose-escalation part of the study. Patients may or may not have macular scarring in the study eye for the second part of the study (maximum tolerated dose (MTD) phase). In addition, patients enrolled in the second part of the study must have demonstrated responsiveness to an anti-VEGF therapy within 12 months prior to screening and after the patient's most recent treatment of anti-VEGF therapy.
Noted presence of intra- or subretinal fluid.
Adequate dilation of pupils to permit thorough ocular examination and testing.

Exclusion criteria were as follows:
CNV in the study eye due to any reason other than AMD.
History of conditions in the study eye during Screening which might alter visual acuity or interfere with study testing.
Active uncontrolled glaucoma.
Had any intraocular surgeries in the study eye within 3 months of enrollment or are known or likely candidates for intraocular surgery (including cataract surgery) in the study eye within 1 year of treatment.
Acute or chronic infection in the study eye.
History of inflammation in the study eye or ongoing inflammation in either eye.
Any contraindication to intravitreal injection.
Received Photo Dynamic Therapy in the study eye within 60 days, or laser photocoagulation within 14 days prior to Screening.
Currently using or have used ranibizumab (Lucentis®), bevacizumab (Avastin™), or pegaptanib sodium (Macugen®) within 1 month prior to Screening.
Currently using or have used Aflibercept (Eylea®) within 4 months prior to Screening.
Currently using any periocular (study eye), intravitreal (study eye), or systemic (oral or intravenous) steroids within 3 months prior to Screening.
Any active herpetic infection, in particular active lesions in the eye or on the face.
Any significant poorly controlled illness that would preclude study compliance and follow-up.
Current or prior use of any medication known to be toxic to the retina or optic nerve.
Previous treatment with any ocular or systemic gene transfer product.
Received any investigational product within 120 days prior to Screening.

In the first part of the study, four separate groups of patients were administered a fixed volume of 100 µL of different doses of AAV2-sFLT01 as follows. (1) Group 1 received a single intravitreal injection in one eye of $2 \times 10^8$ vg; (2) Group 2 received a single intravitreal injection in one eye of $2 \times 10^9$ vg; (3) Group 3 received a single intravitreal injection in one eye of $6 \times 10^9$ vg; (4) Group 4 received a single intravitreal injection in one eye of $2 \times 10^{10}$ vg.

These doses were determined to be safe and well tolerated. In particular, no dose-limiting toxicity (DLT) was observed and MTD was not reached.

In order to determine the efficacy of AAV2-sFLT01, changes from baseline in the amount of subretinal and intraretinal fluid was measured by optical coherence tomography (OCT). Additionally BCVA was measured as were sFLT01 protein levels in the aqueous fluid via anterior chamber taps.

Surprisingly, a patient that received a single intravitreal injection of $2\times10^8$ vg displayed a significant reduction of subretinal and intraretinal fluid as measured by OCT. See, FIGS. 15A and 15B.

In the second part of the study, a single intravitreal injection of the highest dose used in the first study ($2\times10^{10}$ vg) was given to different patients. This dose also resulted in a significant reduction of subretinal and intraretinal fluid as measured by OCT two months after injection. See, FIGS. 16A and 16B.

Table 2 shows the number of expected responders and non-responders. An expected responder was characterized as a patient that was expected to show a response to anti-VEGF treatments based upon their baseline characteristics. Expected responders were then characterized as follows: Full responders: Patients that showed robust response, dry retina, and return of normal retinal anatomy with no additional treatments needed. Partial responder: Patients that showed some decrease of fluid. Non responder: No effect seen.

TABLE 2

| | Biological Activity | |
|---|---|---|
| N = 19[a] | EXPECTED RESPONDER (N = 11) | EXPECTED NON RESPONDER (N = 7) |
| Responder | 4[b] | 0 |
| Partial Responder | 2 | 0 |
| Non Responder | 5 | 7 |

[a]One patient was unassessable.
[b]Among four total responders: one out three years, one out two years, one out one year and one out 18 weeks.

As shown in Table 2, six of eleven expected responders showed at least a partial response to treatment.

Thus, methods for treating macular degeneration, as well as compositions comprising sFlt-1 receptors and fusions thereof, are described. Although embodiments of the subject invention have been described in some detail, it is understood that obvious variations can be made without departing from the spirit and the scope of the invention as defined herein.

The invention claimed is:

1. A method of treating macular degeneration in a human subject, comprising administering intravitreally to the diseased eye of the subject a composition comprising (i) from more than $6\times10^{10}$ to $1\times10^{12}$ vector genomes (VG) of a recombinant adeno-associated virus (rAAV) virion comprising a polynucleotide encoding a soluble protein comprising Ig-like domain 2 of VEGFR-1 (Flt-1) capable of modulating VEGF activity, and (ii) an ophthalmologically acceptable vehicle.

2. A method of treating macular edema in a human subject, comprising administering intravitreally to the diseased eye of the subject a composition comprising (i) from more than $6\times10^{10}$ to $1\times10^{12}$ vector genomes (VG) of a recombinant adeno-associated virus (rAAV) virion comprising a polynucleotide encoding a soluble protein comprising Ig-like domain 2 of VEGFR-1 (Flt-1) capable of modulating VEGF activity, and (ii) an ophthalmologically acceptable vehicle.

3. The method of claim 1, wherein a single intravitreal injection of rAAV is administered to the eye.

4. The method of claim 1, wherein the soluble protein comprises:
 (a) a multimerization domain derived from an immunoglobulin heavy chain; and
 (b) a linker of 5-25 amino acid residues in length linking the Ig-like domain 2 to the multimerization domain, wherein when the soluble protein is expressed, a multimer of the soluble protein is produced.

5. The method of claim 4, wherein the multimer is a homodimer.

6. The method of claim 4, wherein the multimerization domain comprises the Fc region of an IgG, or an active fragment thereof.

7. The method of claim 4, wherein the multimerization domain comprises the CH3 domain of an IgG, or a functional fragment thereof.

8. The method of claim 4, wherein the multimerization domain is from a human IgG1, an IgG2, an IgG3 or an IgG4.

9. The method of claim 8, wherein the multimerization domain is from the constant region of an IgG1 heavy chain.

10. The method of claim 4, wherein the linker is selected from the group consisting of:

```
                                           (SEQ ID NO: 1)
gly9;

(SEQ ID NO: 2)
glu9;

(SEQ ID NO: 3)
ser9;

(SEQ ID NO: 4)
gly5cyspro2cys;

(SEQ ID NO: 5)
(gly4ser)3;

(SEQ ID NO: 6)
SerCysValProLeuMetArgCysGlyGlyCysCysAsn;

(SEQ ID NO: 7)
ProSerCysValProLeuMetArgCysGlyGlyCysCysAsn;

(SEQ ID NO: 8)
GlyAspLeuIleTyrArgAsnGlnLys;
and (SEQ ID NO: 9)
Gly9ProSerCysValProLeuMetArgCysGlyGlyCysCysAsn.
```

11. The method of claim 4, wherein the soluble protein has the formula X—Y—Z, wherein X comprises the IgG-like domain 2 of Flt-1, wherein Y is Gly9, and wherein Z is an IgG Fc region or an IgG CH3 region.

12. The method of claim 4, wherein the soluble protein comprises an amino acid sequence selected from the group consisting of (a) the amino acid sequence depicted in SEQ ID NO:11; (b) the amino acid sequence depicted in SEQ ID NO:15; (c) the amino acid sequence depicted in SEQ ID NO:17; (d) the amino acid depicted in (SEQ ID NO:21; and (e) an active variant of (a), (b), (c) or (d) having at least 90% sequence identity thereto.

13. The method of claim 1, wherein the macular degeneration is age-related macular degeneration (AMD).

14. The method of claim 13, wherein the macular degeneration is wet AMD.

15. The method of claim 1, wherein the rAAV virion is derived from an AAV serotype selected from AAV1, AAV2, AAV3, AAV4, AAV5, AAV6, AAV7, AAV8, AAV9, AAVrh8, AAVrh8R, AAV10, AAVrh10, AAV11 or AAV12.

16. The method of claim 15, wherein the rAAV virion is derived from AAV2.

17. The method of claim 16, wherein the polynucleotide sequence encodes SEQ ID NO:11.

18. The method of claim 17, wherein the amino acid sequence of the soluble protein consists of amino acids 24-358 of SEQ ID NO:11.

19. The method of claim 18, wherein the polynucleotide encoding the soluble protein is operably linked to a hybrid chicken β-actin promoter.

20. The method of claim 19, wherein the rAAV further comprises AAV2 inverted terminal repeats (ITRs).

21. The method of claim 20, wherein the subject has choroidal neovascularization (CNV) secondary to AMD.

22. A method of treating macular degeneration or macular edema in a human subject, comprising administering intravitreally to the diseased eye of the subject a composition comprising
 (i) from more than $6\times10^{10}$ to $1\times10^{12}$ vector genomes of a recombinant adeno-associated virus (rAAV) virion comprising a polynucleotide encoding a soluble protein comprising amino acids 24-358 of SEQ ID NO: 11, wherein the polynucleotide encoding the soluble protein is operably linked to a hybrid chicken β-actin promoter, and the rAAV further comprises AAV2 inverted terminal repeats (ITRs), and
(ii) an ophthalmologically acceptable vehicle are intravitreally delivered to the eye.

* * * * *